(12) United States Patent
Tsunashima et al.

(10) Patent No.: US 7,166,354 B2
(45) Date of Patent: Jan. 23, 2007

(54) METAL COATED FIBER AND ELECTROCONDUCTIVE COMPOSITION COMPRISING THE SAME AND METHOD FOR PRODUCTION THEREOF AND USE THEREOF

(75) Inventors: Makoto Tsunashima, Tokyo (JP); Yuusuke Maeda, Tokyo (JP); Nobuo Furuya, Mishima (JP)

(73) Assignees: Mitsubishi Materials Corporation, Tokyo (JP); Japan Electric Metals Corporation, Limited, Akita (JP)

( * ) Notice: Subject to any disclaimer, the term of this patent is extended or adjusted under 35 U.S.C. 154(b) by 32 days.

(21) Appl. No.: 10/450,833

(22) PCT Filed: Oct. 26, 2001

(86) PCT No.: PCT/JP01/09456

§ 371 (c)(1),
(2), (4) Date: Jun. 25, 2003

(87) PCT Pub. No.: WO02/052098

PCT Pub. Date: Jul. 4, 2002

(65) Prior Publication Data

US 2004/0053049 A1 Mar. 18, 2004

(30) Foreign Application Priority Data

Dec. 26, 2000 (JP) ............................. 2000-394572
Feb. 28, 2001 (JP) ............................. 2001-054114
Mar. 29, 2001 (JP) ............................. 2001-096793
Oct. 22, 2001 (JP) ............................. 2001-324176
Oct. 25, 2001 (JP) ............................. 2001-327803

(51) Int. Cl.
*B32B 9/00* (2006.01)
*B05D 5/12* (2006.01)

(52) U.S. Cl. ...................... 428/389; 428/364; 428/379; 427/123; 427/124; 427/125; 427/383.1; 523/200; 523/204

(58) Field of Classification Search ................ 428/379, 428/389, 359, 367, 364, 395; 427/123, 124, 427/125, 372.2, 374.1, 379, 383.1; 523/200, 523/204
See application file for complete search history.

(56) References Cited

U.S. PATENT DOCUMENTS 4,042,737 A * 8/1977 Forsgren et al. .............. 428/96

(Continued)

FOREIGN PATENT DOCUMENTS

EP 860834 8/1998

(Continued)

*Primary Examiner*—Jill Gray
(74) *Attorney, Agent, or Firm*—Oblon, Spivak, McClelland, Maier & Neustadt, P.C.

(57) ABSTRACT

The present invention provides a metal coated fiber with excellent coating strength and corrosion resistance, and a conductive resin composition with excellent conductivity. A feature of a metal coated fiber of the present invention is that following provision of a metal coating on the surface of the fiber, heat treatment is conducted at a temperature greater than the crystallization temperature but less than the melting temperature of the fiber. Gradual cooling is preferably performed following the heat treatment. Furthermore, a conductive metal coating may be provided as the metal coating, and an additional corrosion resistant metal coating then laminated onto the surface of the conductive metal coating. In addition, a feature of a conductive resin composition of the present invention is that metal coated short fibers, formed by providing a conductive metal coating on the surface of a substrate fiber formed from a synthetic resin and then conducting heat treatment, are mixed into a substrate resin.

44 Claims, 3 Drawing Sheets

U.S. PATENT DOCUMENTS

| | | | |
|---|---|---|---|
| 4,566,990 A * | 1/1986 | Liu et al. | 252/503 |
| 4,596,670 A * | 6/1986 | Liu | 252/511 |
| 4,900,618 A * | 2/1990 | O'Connor et al. | 428/328 |
| 5,366,664 A * | 11/1994 | Varadan et al. | 252/512 |
| 5,533,158 A * | 7/1996 | Han et al. | 385/88 |
| 6,399,737 B1 * | 6/2002 | Elkovitch | 528/196 |
| 6,703,123 B1 * | 3/2004 | Shibuta et al. | 428/375 |
| 2002/0108699 A1 * | 8/2002 | Cofer et al. | 156/176 |
| 2004/0053049 A1 * | 3/2004 | Tsunashima et al. | 428/375 |

FOREIGN PATENT DOCUMENTS

| | | | |
|---|---|---|---|
| EP | 1369525 A1 * | 12/2003 | |
| GB | 2005310 | 4/1979 | |
| JP | 61-102478 | 5/1986 | |
| JP | 62143848 A * | 6/1987 | |
| JP | 3-260168 | 11/1991 | |
| JP | 6-294070 | 10/1994 | |
| JP | 11-329078 | 11/1999 | |
| JP | 2002266237 A * | 9/2002 | |
| JP | 2003183980 A * | 7/2003 | |
| WO | WO 02/052098 A1 * | 7/2002 | |

* cited by examiner

METAL COATED FIBER AND ELECTROCONDUCTIVE COMPOSITION COMPRISING THE SAME AND METHOD FOR PRODUCTION THEREOF AND USE THEREOF

BACKGROUND OF THE INVENTION

1. Field of the Invention

The present invention relates to a metal coated fiber with excellent adhesion of the metal coating provided on the fiber and excellent durability under heating, as well as applications of, and a method of producing such a metal coated fiber. Specifically, the present invention relates to a metal coated fiber comprising a metal coating provided on the surface of either one, or two or more synthetic fibers such as nylon based fibers, polyester fibers, polyphenylene sulfide based fibers or polycarbonate based fibers, or natural fibers, wherein the adhesion of the metal coating is excellent, and the durability relative to external forces under heating, and the durability relative to oxygen, sulfur and chlorine and the like is also excellent, as well as applications of, and a method of producing such a metal coated fiber. Furthermore, the present invention also relates to a conductive resin composition wherein conductivity is imparted by mixing short fibers provided with a metal coating, into a substrate resin.

2. Description of the Related Art

Conductive fibers and conductive yarn formed by coating the surface of a synthetic fiber formed from a polymer material such as a nylon fiber or a polyester fiber with a thin metal film are already known. In addition, a variety of methods have been tested for improving the adhesion of the metal coating to the surface of the fiber. Examples include a method in which, in the case of a copper sulfide coating, a polymer material is pretreated using a dye containing copper ion capturing groups, and following bonding of the copper ions, the material is subjected to sulfidization (Japanese Examined Patent Application, Second Publication No. Hei 01-37513), and a method in which copper ion capturing groups are bonded to the surface of a fiber that has undergone surface roughening through treatment with alkali, and copper sulfide is then bonded to these copper ion capturing groups (Japanese Unexamined Patent Application, First Publication No. Hei 06-298973). Furthermore, in the case of materials such as aramid fiber for which metal plating is difficult, other methods such as a method in which metal ions are bonded to the surface using polyvinyl pyrrolidone (PVP), and these are then reduced to form a metal plating (Published Japanese Translation No. Hei 06-506267 of PCT) are also known.

However, the plating method using PVP described above is restricted in terms of the type of fibers, and is consequently not a general method. Furthermore, in the coating methods in which copper ion capturing groups are introduced, the metal coating is restricted to either cooper or compounds thereof, and in addition, the strength of the metal coating is not always entirely satisfactory. By treating the fiber with alkali and roughening the surface, the bonding strength of the metal coating can generally be improved, although if the degree of surface roughness and the state of the metal coating are not ideal, then a satisfactory effect may not be achievable. Moreover, in those cases in which the metal coated fiber is used for clothing and the like, the fiber must be capable of withstanding severe usage conditions including washing and abrasion In addition, from the viewpoint of conductivity, even a partial separation of the metal coating invites a disconnection, and consequently the metal coating requires an adhesive strength with a high level of reliability.

In addition, recently conductive resin compositions are being produced by mixing conductive fillers into a resin which acts as a substrate. Examples of the materials used as these conductive fillers include powders and fibers formed from conductive compounds such as conductive metals or alloys thereof, or metal oxides. However, in materials utilizing conductive powders or metal particles, relatively large quantities must be used to ensure that these powders or particles mutually contact within the resin, and consequently the weight of the resin composition increases. Moreover, the contact surface area of powders or particulate matter is not particularly large, and consequently even if large quantities are used, achieving a high level of conductivity is difficult. In contrast, metal fibers mutually intertwine, maintaining a state of good contact, and consequently the quantities used can be less than in the case of metal powders, although the metal fibers themselves are heavier than the resin, and consequently the weight of a resin composition containing such metal fibers increases. Furthermore, metal fibers do not possess the flexibility of resin fibers and consequently if the quantity of metal fiber is increased, then the flexibility and durability of the resin composition suffers. A different technique involves the use of metal whiskers (needle like crystals), although there is a possibility that fine metal fibers, metal whiskers, or needle like metal oxides and the like can be sucked into the respiratory organs and cause damage, and as such they are almost never used these days.

Furthermore, resin fibers with metal coatings do not display satisfactory coating strength, and if subjected to mix spinning with a typical single fiber, then problems can arise such as separation of the metal coating during processing, or separation of the metal coating some time after completion of the mix spinning, resulting in a reduction in conductivity, and consequently such fibers offer only limited practicality. In addition, the production costs associated with long fibers with a uniform metal coating are high.

The present invention aims to resolve these types of problems associated with conventional metal coated fibers and conductive resin compositions, and has an object of providing a metal coated fiber with excellent coating strength and corrosion resistance. Furthermore, another object of the present invention is to provide a conductive resin composition with excellent conductivity, wherein the conductivity can be maintained with good stability over an extended period.

DISCLOSURE OF INVENTION

The inventors of the present invention discovered that by subjecting a fiber with a metal coating to heat treatment and arranging the structure of the fiber, more specifically, by subjecting the fiber to heat treatment and crystallizing the fiber, the coating strength of the metal coating improves dramatically. Furthermore, the inventors also discovered that by raising and cooling the temperature gradually during this heat treatment, the strength of the metal coating improved even further, the durability could be increased, and the expansion ratio of the fiber could be reduced considerably.

The present invention is based on the application of these findings to metal coated fibers.

That is, a first aspect of the present invention relates to (1) a metal coated fiber with a metal coating provided on the surface, wherein following metal coating, heat treatment is conducted at a temperature greater than the crystallization temperature but less than the melting temperature of the fiber.

This metal coated fiber includes (2) a metal coated fiber which is cooled gradually following heat treatment, (3) a metal coated fiber wherein in a coating adhesion test, the metal coating has a standardized strength of at least grade 4, (4) a metal coated fiber wherein the expansion ratio at a temperature greater than the crystallization temperature but less than the melting temperature of the fiber, or at room temperature, is no more than ±4%, (5) a metal coated fiber wherein at a temperature greater than the crystallization temperature but less than the melting temperature of the fiber or at room temperature, the expansion ratio under a g load equivalent to 1/100th of the denier value for the fiber is no more than ±2%, (6) a metal coated fiber wherein the metal coating is a conductive metal formed from silver, gold, platinum, copper, nickel, tin, zinc, palladium, or a mixture or alloy thereof, (7) a metal coated fiber wherein for 1 cm of fiber, the electrical resistance per 1 denier is no more than 1000 Ω/cm·denier, (8) a metal coated fiber wherein the fiber is a composite fiber formed from either one, or two or more types of synthetic single fiber such as polyester fiber, nylon fiber or acrylic fiber, (9) a metal coated fiber wherein the surface of the metal coating has an orange peel texture, and (10) a metal coated fiber wherein the metal coating has been subjected to surface treatment.

In addition, the present invention also incorporates (11) a mixed fiber wherein at least one type of the fibers described above is subjected to mix spinning with a synthetic fiber, a natural fiber, or a mixed fiber of a synthetic fiber and a natural fiber, (12) a mixed fiber wherein a synthetic fiber or natural fiber mixed with the fiber comprises one, or two or more types of fiber, (13) a mixed fiber wherein the quantity of fiber is within a range from 0.1 to 50%, (14) a mixed fiber wherein for 1 cm of fiber, the electrical resistance per 1 denier is no more than 10,000 Ω/cm·denier, (15) a metal coated fiber wherein the fibers are short fibers, long fibers, or any of a variety of yarns formed from such fibers, and (16) a woven fabric or a nonwoven fabric comprising any of the metal coated fibers described above.

Furthermore, the present invention also relates to (17) a method of producing a metal coated fiber by heat treating a fiber with a metal coating provided on the surface at a temperature greater than the crystallization temperature but less than the melting temperature of the fiber.

This method of producing a metal coated fiber also includes (18) a method of producing a metal coated fiber wherein following provision of the metal coating on the fiber, the aforementioned heat treatment is conducted at a temperature of 170 to 240° C. for a polyester metal coated fiber, a temperature of 110 to 180° C. for a nylon metal coated fiber, or a temperature of 150 to 200° C. for an acrylic metal coated fiber, (19) a method of producing a metal coated fiber wherein the rate of temperature increase during the heat treatment is within a range from 0.1 to 10° C. per minute, (20) a method of producing a metal coated fiber wherein the heating temperature is maintained for at least 5 minutes, (21) a method of producing a metal coated fiber wherein the time for which the heating temperature is maintained is at least 5 minutes but no more than 200 minutes, (22) a method of producing a metal coated fiber wherein following the heat treatment, the fiber is cooled gradually, (23) a method of producing a metal coated fiber wherein the fiber is cooled gradually to room temperature at a rate of 0.1 to 10° C. per minute, (24) a method of producing a metal coated fiber wherein the rate of cooling is within a range from 0.2 to 2° C. per minute, (25) a method of producing a metal coated fiber wherein heat treatment is conducted under pressurized steam, or in an electric furnace, (26) a method of producing a metal coated fiber wherein the heating and gradual cooling is performed in an inert atmosphere such as nitrogen gas or argon gas, (27) a method of producing a metal coated fiber which uses a fiber comprising short fibers, long fibers, or a variety of yarns formed from such fibers, with a metal coating provided thereon, and (28) a method of producing a mixed fiber wherein a metal coated fiber produced by any of the above methods is subjected to mix spinning with a synthetic fiber or a natural fiber.

A second aspect of the present invention is (29) a metal coated fiber in which following provision of a metal coating on the surface of the fiber, heat treatment is conducted at a temperature greater than the crystallization temperature but less than the melting temperature of the fiber, wherein the fiber is formed from either one, or two or more high strength nylon based fibers, polyphenylene sulfide based fibers, polycarbonate based fibers or aramid fibers.

This metal coated fiber also includes (30) a metal coated fiber wherein the expansion ratio at a temperature greater than the crystallization temperature but less than the melting temperature of the fiber, or at room temperature, is no more than ±4%, (31) a metal coated fiber wherein at a temperature greater than the crystallization temperature but less than the melting temperature of the fiber, or at room temperature, the expansion ratio under a g load equivalent to 1/100th of the fiber diameter (denier value) is no more than ±2%, (32) a metal coated fiber wherein for 1 cm of fiber, the electrical resistance per 1 denier is no more than 1000 Ω/cm·denier, (33) a metal coated fiber wherein in a coating adhesion test, the metal coating has a standardized strength of at least grade 4, (34) a metal coated fiber wherein the fibers are short fibers, long fibers, or any of a variety of yarns formed from such fibers, (35) a metal coated fiber wherein the metal coating is a conductive metal formed from silver, gold, platinum, copper, nickel, tin, zinc, palladium, or a mixture or alloy thereof, (36) a mixed fiber wherein at least one type of the metal coated fibers described above is subjected to mix splining with a synthetic fiber, a natural fiber, or a mixed fiber of a synthetic fiber and a natural fiber, and (37) a woven fabric or a nonwoven fabric comprising any of the metal coated fibers described above.

Furthermore, the present invention also relates to (38) a method of producing a metal coated fiber, by providing a metal coating on a fiber formed from either one, or two or more fibers selected from a group consisting of high strength nylon based fibers, polyphenylene sulfide based fibers, polycarbonate based fibers or avoid fibers, and subjecting the metal coated fiber to heat treatment within a temperature range from 100° C. to 700° C., at a temperature greater than the crystallization temperature but less than the melting temperature of the fiber.

This method of producing a metal coated fiber includes (39) a method of producing a metal coated fiber herein following provision of the metal coating, heat treatment is conducted at a temperature of 200 to 500° C. for a high strength nylon based fiber, a temperature of 200 to 300° C. for a polyphenylene sulfide based fiber, a temperature of 200 to 300° C. for a polycarbonate based fiber, or a temperature of 250 to 350° C. for an aramid fiber, (40) a method of producing a metal coated fiber wherein following maintenance of a raised temperature, the fiber is cooled gradually to room temperature at a rate of 0.1 to 10° C. per minute, and (41) a method of producing a metal coated fiber wherein the heating and gradual cooling treatment is performed under pressurized steam or in an electric furnace, in an inert atmosphere such as nitrogen gas or argon gas.

Furthermore in the present invention, in a fiber with a metal coating on the surface, by using the conductive metal coating provided on the surface of the fiber as a substrate, and then providing an additional corrosion resistant metal coating on the surface of this substrate, a fiber with both conductivity and improved corrosion resistance is provided, and by preferably conducting heat treatment within a predetermined temperature range following provision of the metal coating, a fiber is provided in which the bonding strength of the metal coating (the coating strength) is improved significantly and the expansion ratio of the fiber is reduced markedly.

That is, a third aspect of the present invention relates to a metal coated fiber wherein a conductive metal coating is provided on the surface of the fiber, and an additional corrosion resistant metal coating is then laminated onto the surface of the conductive metal coating.

This metal coated fiber includes (42) a metal coated fiber wherein a plurality of layers of the conductive metal coating and/or the corrosion resistant metal coating are formed, (43) a metal coated fiber wherein following provision of at least one of the conductive metal coating and the corrosion resistant metal coating, heat treatment is conducted at a temperature greater than the crystallization temperature but less than the melting temperature of the fiber, (44) a metal coated fiber wherein the conductive metal coating is at least one of silver, copper, nickel, tin, zinc, or a mixture or alloy thereof, and the corrosion resistant metal coating is at least one of gold, platinum, palladium, osmium and rhodium, (45) a metal coated fiber wherein the metal coating has an orange peel texture, (46) a metal coated fiber wherein the thickness of the corrosion resistant metal coating is from 1 nm to 500 nm, (47) a metal coated fiber wherein a paraffin layer or a wax layer is provided on the surface of the corrosion resistant metal coating, and (48) a metal coated fiber wherein the fiber is a synthetic single fiber such as polyester fiber, nylon fiber or acrylic fiber, or a composite fiber formed from two or more synthetic fiber components.

Furthermore in the present invention, in a conductive resin composition, by using short fibers with a metal coating of a high coating strength, and kneading or mixing these fibers into a substrate resin, a high level of conductivity can be maintained with good stability over an extended period.

That is, a fourth aspect of the present invention relates to (49) a conductive resin composition in which short fibers with a metal coating are mixed into a resin to impart conductivity, wherein the metal coated short fibers are formed by providing a metal coating on the surface of a substrate fiber, and then conducting heat treatment at a temperature greater than the crystallization temperature but less than the melting temperature of the substrate fiber.

This conductive resin composition includes (50) a conductive resin composition wherein the quantity of the metal coated short fibers is within a range from 1 mass % to 50 mass %, (51) a conductive resin composition wherein the metal coated short fibers are mixed within the resin composition so as to retain mutual contact, (52) a conductive resin composition formed by mixing metal coated short fibers into a resin, wherein the metal coated short fibers utilize an acrylic based fiber, a nylon based fiber or a polyester based fiber as the substrate fiber, and are formed by providing a metal coating on the surface of this substrate fiber, and then conducting heat treatment at a temperature within a range from 120° C. to 250° C. in accordance with the type of substrate fiber, (53) a conductive resin composition formed by mixing metal coated short fibers into a resin, wherein the metal coated short fibers utilize a high strength nylon based fiber, a polyphenylene sulfide based fiber, a polycarbonate based fiber or an aramid fiber as the substrate fiber, and are formed by providing a metal coating on the surface of this substrate fiber, and then conducting heat treatment at a temperature of 200 to 500° C. for a high strength nylon based fiber, a temperature of 200 to 300° C. for a polyphenylene sulfide based fiber, a temperature of 200 to 300° C. for a polycarbonate based fiber, or a temperature of 250 to 350° C. for an aramid fiber, (54) a conductive resin composition wherein the aforementioned metal coated short fibers are formed either by processing long fibers on which a metal coating has been provided and which have undergone heat treatment, to generate short fibers, or alternatively by first forming the short fibers and then providing the metal coating and conducting the heat treatment, (55) a conductive resin composition wherein the length of the aforementioned metal coated short fibers is from 0.1 mm to 10 cm, (56) a conductive resin composition wherein an additive is added as well as the metal coated short fibers, and (57) a conductive resin composition wherein the metal coated short fibers have a coating layer of a silicon compound or a titanium compound on the surface of the metal coating.

In addition, the present invention also includes (58) a conductive fiber, a conductive paint film, a conductive film, a conductive net, a conductive case, or a conductive molded product produced using a conductive resin composition according to any one of (49) to (57) described above.

Furthermore, the present invention also relates to (59) a method of producing a conductive resin composition wherein following the provision of a metal coating on the surface of a substrate fiber, heat treatment is conducted at a temperature greater than the crystallization temperature but less than the melting temperature of the substrate fiber, and in the case of a substrate fiber of long fibers, the fibers are cut to generate metal coated short fibers, or alternatively in the case of a substrate fiber of short fibers, the metal coated short fibers are generated by the above metal coating formation and subsequent heat treatment, and these metal coated short fibers are then kneaded into a substrate resin.

This method of producing a conductive resin composition includes (60) a method of producing a resin composition wherein the conductive resin composition produced by kneading the metal coated short fibers into a substrate resin is formed in the shape of a fiber, a film, a net, a case, or another shape.

BEST MODE FOR CARRYING OUT THE INVENTION

Figure 1:
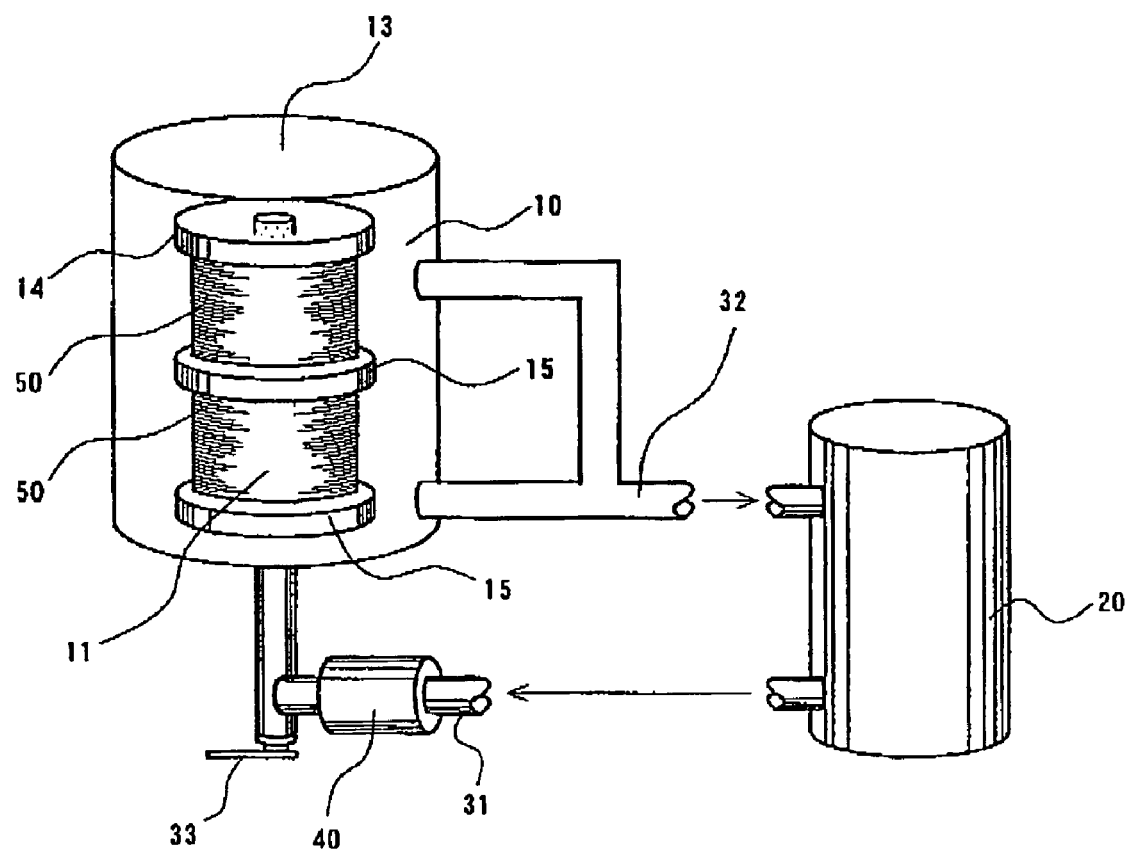
FIG. 1 is a schematic illustration showing an outline of a plating apparatus applicable to the present invention.

As follows is a detailed description of the present invention based on a series of embodiments.

Embodiment 1

[Metal Coated Fiber]

A feature of this metal coated fiber is that a fiber provided with a metal coating is subjected to heat treatment at a temperature greater than the crystallization temperature but less than the melting temperature of the fiber, and is preferably cooled gradually following this heat treatment. In the description below, the term fiber is used to broadly include short fibers (staples), long fibers (filaments) and a variety of processed yarn formed therefrom (such as filament yarn or spun yarn).

In general, it is known that if a synthetic fiber is heated beyond the crystallization temperature, then in the case of both fibers and processed yarn, the length of the fiber contracts by as much as 10% as a result of recrystallization of the fiber. By providing a metal coating on the surface of the fiber, this contraction of the fiber arising from heating can be suppressed to a certain extent, although if the treatment following the metal coating is inappropriate, then this heat contraction suppression effect is not satisfactory.

In the metal coated fibers of this embodiment, by conducting the heat treatment within a temperature range which is greater than the crystallization temperature but less than the melting temperature of the fiber, and preferably gradually cooling the fiber at a predetermined rate following the heat treatment, the structure of the fiber can be arranged. Specifically, by promoting the recrystallization of the fiber, for example, the coating strength of the metal coating can be increased markedly, while the contraction arising from the heating is reduced significantly.

Generally, if a synthetic fiber such as polyester, nylon, or polyacryl is heated, then the state of the fiber changes gradually in accordance with the heating temperature, from glass transition to crystallization and then to melting (fusion), and in many cases, the fiber softens as a result of glass transition and subsequently contracts significantly during the crystallization stage. The present embodiment utilizes this phenomenon to increase the bonding strength of the metal coating. Specifically, if a metal coated fiber is heated beyond the crystallization temperature of the fiber so that the surface of the fiber is softened, then the softened surface of the fiber will flow into the minute irregularities at the contact surface with the metal coating, increasing the adhesion between the metal coating and the fiber through an anchoring effect. To achieve such an effect, a polyester fiber is preferably heated at 170 to 240° C., a nylon fiber at 110 to 180° C., and an acrylic fiber at 150 to 200° C. In this heat treatment, the raised temperature is preferably maintained for 5 to 200 minutes to ensure satisfactory softening of the fiber. If the heating temperature exceeds the melting temperature of the fiber then the entire fiber melts, the crystallinity deteriorates, and the fiber can break and become incapable of supporting the metal coating, which is undesirable.

During the cooling process following the softening of the fiber, the structure of the fiber is arranged. At this time, the heating causes an alignment of the molecular orientation of the fibers and crystallization, and the fibers then Contract while bound tightly to the metal coating, and during the gradual cooling process, the metal coating contracts while maintaining its integration with the fiber, causing an improvement in the coating strength. In this gradual cooling process, if the cooling rate of the metal coated fiber is not appropriate, then a satisfactory coating strength is not achieved. In other words, a synthetic fiber has a larger coefficient of linear expansion than metals, so that, for example, the coefficient of linear expansion for a polyester fiber or an acrylic fiber or the like is approximately twice that of silver or copper, and so the degree of contraction on cooling is larger. As a result, if the cooling rate is fast, then the contraction of the metal coating is unable to keep up with the contraction of the fiber, and the contact surface between the fiber and the metal coating which had been tightly bound as a result of the heat treatment can partially separate, meaning the coating strength may not improve.

In the present embodiment, by preferably conducting the cooling following the heat treatment at a gradual rate, within a constant temperature rate, the adhesive (coating) strength of the metal coating is further improved. In other words, by gradually cooling the metal coated fiber following the heat treatment, any separation at the contact surface between the fiber and the metal coating can be prevented, and the fiber and the metal coating are cooled as an integrated unit, with the adhesion between the metal coating and the fiber maintained at a high level. Furthermore, by conducting an appropriate gradual cooling, any subsequent heating causes essentially no contraction, and the expansion ratio can be reduced considerably.

Specific examples of suitable cooling rates include rates of 0.1 to 10° C. per minute, and preferably from 0.1 to 5° C. per minute, and even more preferably from 0.2 to 2° C. per minute. If the cooling rate is less than 0.1° C. per minute then the treatment time becomes overly long, whereas if the rate exceeds 10° C. per minute, the cooling rate is too fast, and the recrystallization of the fiber is unsatisfactory.

The heat treatment can be conducted in a heating furnace, a hot blast furnace, or may involve heating by infrared radiation. Furthermore, heat treatment using pressurized steam within a plating tank is also suitable. The heat treatment atmosphere may be air, although in order to prevent discoloration of the metal coating arising from oxidation, the heat treatment is preferably conducted under an atmosphere of an inert gas such as nitrogen or argon.

As described above, a metal coated fiber of this embodiment is produced by heating at, for example, 170 to 240° C. for a polyester fiber, 110 to 180° C. for a nylon fiber, or 150 to 200° C. for an acrylic fiber, preferably subsequently maintaining the raised temperature for 5 to 200 minutes, and then gradually cooling at a rate of 0.2 to 2° C. per minute.

In the present embodiment, during a first stage, by heating the metal coated fiber to a temperature greater than the crystallization temperature of the fiber to promote the recrystallization of the fiber, and then maintaining this temperature for a fixed period of time, the softened fiber can flow completely into any irregularities in the contact surface between the surface of the fiber and the metal coating, removing any gaps at the contact surface and improving the adhesion. Subsequently, in a second stage, by cooling the metal coated fiber from the set temperature to room temperature at a satisfactorily gradual rate, any localized separation between the recrystallized fiber and the metal coating during cooling contraction can be prevented, the coating strength of the metal coating relative to the fiber can be increased, and the expansion ratio of the fiber can be suppressed markedly.

As a result of this type of heating and cooling treatment, a metal coated fiber of the present embodiment combines excellent coating strength and non-expansion. In other words, as described above, generally if a synthetic fiber is heated beyond the crystallization temperature, the crystal structure alters, and consequently heat contraction of more than 10% can occur, but a fiber with a metal coating which has undergone heat treatment and had the crystal structure of the fiber arranged is unlikely to undergo further crystal structure changes even if heated, and displays almost no heat contraction. In fact, in some cases, such fibers may display a tendency to expand very slightly.

Specifically for example, metal coated fibers can be produced for which the expansion ratio at a temperature greater than the crystallization temperature but less than the melting temperature of the fiber, in the case of no applied load, is no more than ±4%, and preferably no more than ±3%. Furthermore, even under loaded heating, metal coated fibers can be produced for which, at a temperature greater than the crystallization temperature but less than the melting temperature of the fiber for example, the expansion ratio when a g-load equivalent to 1/100th of the denier value for the fiber is applied is no more than ±2%, and preferably no more than ±1.5%, and even more preferably no more than ±1%. The "g-load equivalent to 1/100th of the denier value for the fiber" refers to applying, for example, a 1 g load to a 100 denier fiber.

In this manner, with a metal coated fiber of the present embodiment, expansion and contraction of the fiber can be suppressed substantially. To a case in which the heat contraction for a fiber with no metal coating (a raw yarn), when a load equivalent to 1/100th of the denier value for the fiber is applied at a temperature greater than the crystallization temperature but less than the melting temperature of the fiber, is approximately 10 to 15%, by providing a metal coating of the present embodiment and conducting the type of heat treatment described above, this heat contraction does not occur, and in fact a metal coated fiber which displays an expansion of approximately 0.3% is produced.

In addition, by conducting the heating and cooling treatment described above, a metal coated fiber of the present embodiment can develop an adhesive strength of at least grade 4 (referred to as simply a strength of at least grade 4) in an adhesive strength test based on standards (Japan Industrial Standards, JIS L 0849). This standard test (JIS L 0849) is a test for color fastness of fibers or fabric, and comprises laying a white fabric on a dyed fabric, and then judging the adhesion of the dye based on the degree of contamination of the white fabric when the fabrics are rubbed together for a prescribed number of repetitions under a predetermined loading. Standards are defined from grade 1 to grade 5 in order of the degree of contamination (in order of increasing adhesion), so that grade 5 displays the lowest degree of contamination, and consequently the highest level of adhesion. For the heat treated metal coated fibers described above, the degree of contamination of the white fabric in this adhesion test can be used to determine the adhesive strength (coating strength) of the metal coating in a similar manner to that described above. By conducting the heating and cooling of the present embodiment on a metal coated fiber with a coating strength prior to the heat treatment of no more than grade 3, a high coating strength of at least grade 4 can be achieved.

Examples of the fibers which can be used in this embodiment of the present invention include synthetic fibers comprising as their main component a polymer material such as polyester, polyamide, acryl, polyolefin or nylon, natural fibers such as cotton, cellulose based fibers such as rayon, and in addition to these organic fibers, inorganic fibers such as glass fiber, or composite fibers of the above fibers. Fibers formed by mix spinning of two or more of these fibers are also suitable, as are fibers formed by mix spinning of synthetic fibers and natural fibers. Of these, the present invention is particularly useful for fibers utilizing synthetic fibers such as polyester fibers, acrylic fibers and nylon fibers.

Performing metal coating of long fibers of polyester has been difficult with conventional techniques, but according to the present invention, a metal coated fiber with a powerful adhesive strength can be formed. Single fibers with a thickness of 0.1 to 15 d (deniers) are particularly suitable. If the diameter of the fiber is narrower than 0.1 d, then the strength of the fiber is undesirably low, whereas if the diameter exceeds 15 d, the fiber hardens when the metal coating is provided, and flexibility is lost, which is also undesirable.

There are no restrictions on the type of metal used as a coating on the surface of the fiber. For example, silver, gold, platinum, copper, nickel, tin, zinc, palladium, as well as mixtures or alloys thereof can be used. There are also no particular restrictions on the coating method or technique. The present invention can be widely applied to fibers with metal coatings formed by electroplating, chemical plating, or vacuum deposition. Furthermore, provided treatment is conducted within the specified range for the heating and cooling treatment, there are no particular restrictions on the other conditions.

According to the present invention, the coating strength of a metal coated fiber with an orange peel texture (a rough or satin finish surface like the peel of an orange, with a surface roughness of approximately 0.01 to 1 μm) on the surface of the metal coating can be improved even further. By providing a metal coating so that the surface of the metal coating has an orange peel texture, a metal coating of high coating strength can be achieved, although conducting a heat treatment of the present invention enables the coating strength to be improved even further.

In addition, according to the present embodiment, a metal coated fiber with excellent conductivity can be obtained. Specifically for example, conductive fibers can be produced in which for 1 cm of fiber, the electrical resistance per 1 denier is no more than 10,000 Ω/cm·denier, and preferably no more than 1000 Ω/cm·denier, and even more preferably no more than 100 Ω/cm·denier. By reducing the quantity of metal coating, a fiber with an electrical resistance of at least 10,000 Ω/cm·denier can also be obtained. Furthermore, particularly in those cases in which white gloss metals such as silver, platinum, nickel or tin are used as the coating, a bright conductive fiber with a whiteness (L value) of at least 50 can be obtained. The whiteness is measured by the Lab method based on the Hunter formula.

By conducting a surface treatment on a metal coated fiber according to the present embodiment, following the heating and cooling treatment, the effects of the present invention can be further enhanced. Examples of this surface treatment include rustproofing treatments or oil treatments (oiling) using reactive surface treatment agents, surfactants with an affinity for th metal surface, or paraffin or wax. This type of rustproofing treatment prevents deterioration in the whiteness over time, and deterioration in the adhesion (adhesive strength). Furthermore, by conducting oiling, the slipperiness of the fiber surface can be improved. This oiling improves the sliding of the fiber during processing using a loom or a knitting machine, and consequently also functions to protect the adhesion of the metal coating. When the metal coated fiber is used in a practical situation, the fiber is exposed to physical forces such as friction, shearing and bending and the like, and depending on the strength and frequency of these physical forces, separation or detachment of the metal coating can occur. The degree of such separation is based directly on the adhesive strength between the metal coating and the fiber, although by conducting a surface treatment as described above, friction and shearing forces can be buffered, and as a result, separation of the metal coating is prevented. Furthermore, because a metal surface is generally partially oxidized and comprises hydroxyl groups, surface treatment is preferably used to prevent such oxidation and rust. The quantity of surface treatment agent used varies depending on the type of metal and the conditions employed in the heating and cooling treatment, although quantities within a range from 0.1 to 20 wt % are effective.

A metal coated fiber of the present embodiment can be used as short fibers, long fibers, or as a variety of other yarns such as mix spun yarn and processed yarn. Furthermore, the metal coated fiber can be used alone, or can be used as a mixed fiber in which the metal coated fiber undergoes mix spinning with a synthetic fiber, a natural fiber, or a mixed fiber of a synthetic fiber and a natural fiber. The content of the metal coated fiber within such a mixed fiber varies depending on the intended use, although typically a content between 0.1 to more than 50% is suitable, and depending on the quantity used, a mixed conductive fiber for which the electrical resistance per 1 denier, for a 1 cm mixed fiber, is no more than 10,000 $\Omega$/cm·denier, and preferably no more than 1000 $\Omega$/cm$\Omega$denier, can be obtained.

In addition, a metal coated fiber of the present embodiment can also be used for textile materials such as woven or nonwoven fabric, or as a knitting material, In such cases, metal coated fibers using silver, tin or nickel or the like offer a high level of whiteness, and consequently offer excellent coloring when dyed, and are suited to fabrics such as textiles and clothing. In addition, fibers with coatings of silver or the like can also be used as antibacterial fibers and in antibacterial clothing. Specific applications include antibacterial socks, underwear, jackets, white sanitary clothing, bedding, suits, napkins, gloves, shirts, trousers, carpets, mats or working clothes.

Furthermore, a metal coated fiber of the present embodiment is not restricted to textile materials, and the conductivity of the fiber can be utilized in applications such as electromagnetic shielding materials, static prevention materials such as dust free garments, gloves, shoes, covers and work clothing, or as substitute materials aimed at lightening electrodes or electric wiring. In addition, the fiber can also be used in composite conductive materials with a surface coating provided on a conductive organic material, or for conductive reinforcing agents for fiber reinforced plastics.

[Production Method]

A metal coated fiber of the present embodiment is produced by providing a metal coating on the surface of a fiber (raw yarn) such as the organic fibers described above using electroplating or chemical plating or the like, conducting heat treatment within the temperature range described above, and then cooling the fiber During the provision of the metal coating, if the fiber surface is pretreated by etching with an alkali or the like to roughen the surface, then the plating metal applied flows into the irregularities on this rough fiber surface, exhibiting an anchoring effect, which is even more desirable.

Figure 2:
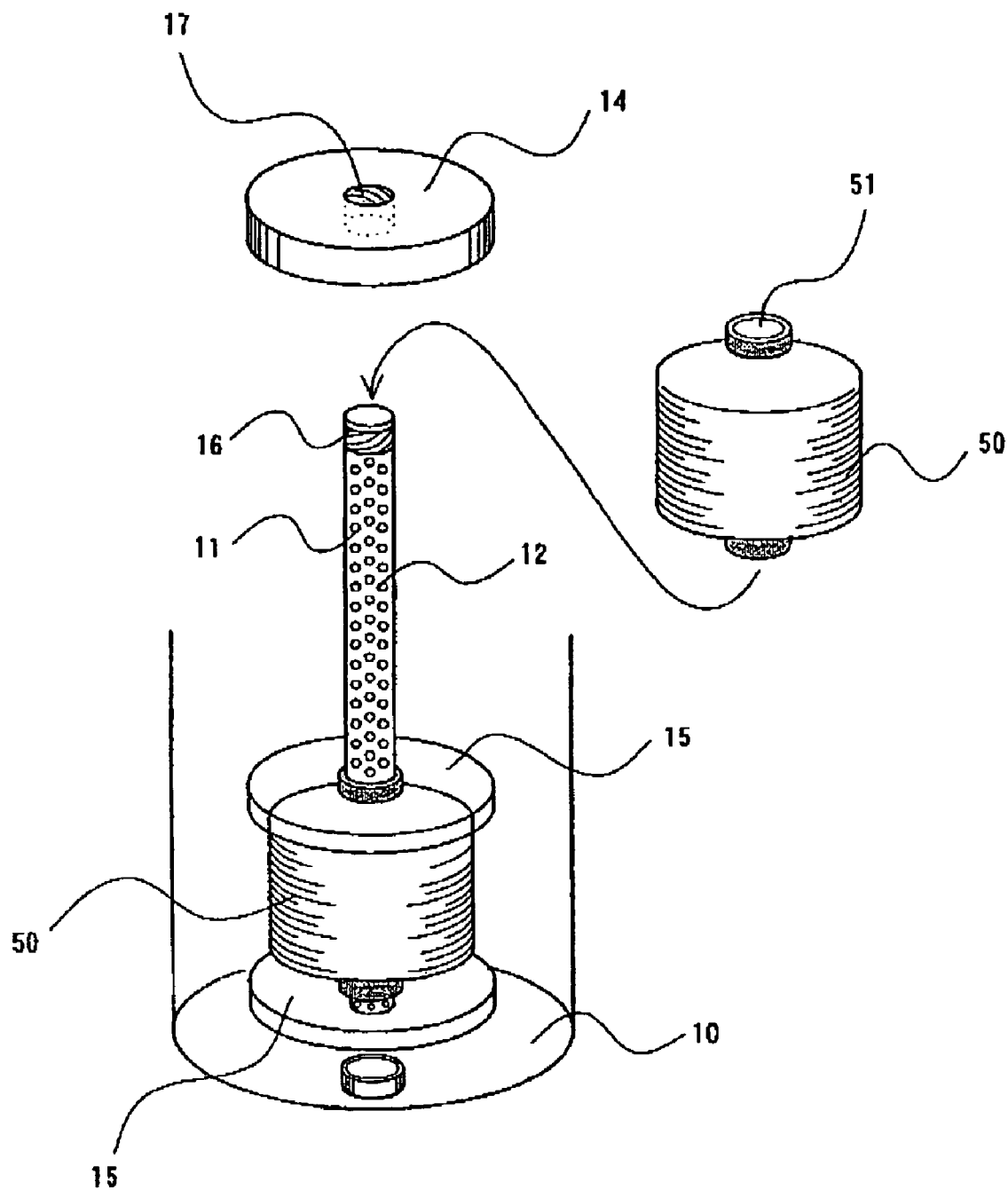
FIG. 2 is an explanatory diagram showing a wound state of a wound body of a plating apparatus.

When providing the metal coating on the fiber (raw yarn), a production (plating) apparatus such as that shown in FIG. 1 and FIG. 2 can be used. As shown in the figures, this production apparatus comprises a plating tank 10, a plating liquid storage tank 20, pipelines 31 and 32 for connecting the plating tank 10 and the plating liquid storage tank 20, and a liquid pump 40 placed within the pipeline. The top surface of the plating tank 10 is closed with a lid 13. A fixed shaft 11 on which is mounted a wound body 50 comprising the raw yarn wound in a cheese winding state is provided inside the plating tank 10. The fixed shaft 11 is formed from a hollow pipe member, and a plurality of liquid through holes 12 are provided in the wall of the pipe. The fixed shaft 11 is fixed to the bottom of the plating tank 10, and the top of the shaft is sealed with a plug 16. In order to ensure that the wound body 50 can be readily mounted on the fixed shaft 11, and to enable the apparatus to cope with wound bodies 50 with different diameters for the core 51, the fixed shaft 11 can be detached from the bottom of the tank. The pipeline 31 for supplying liquid is connected to the fixed shaft 11. The plating liquid is fed from the plating liquid storage tank 20, through the pipeline 31, and supplied to the fixed shaft 11 through the action of the liquid pump 40, and the plating liquid then passes through the plurality of liquid through holes 12 provided in the side wall of the shaft and is supplied into the tank. In addition, pipelines 32 for drainage which feed into the plating liquid storage tank 20 are connected to the side of the plating tank 10 towards the top and the bottom of the tank, and a circuit for the plating liquid is formed by these pipelines 31, 32. A valve 33 is provided at a suitable position along these pipelines 31, 32.

The raw yarn is wound around the permeable, hollow core 51 in a cheese winding state to form the wound body 50, and by placing the core 51 onto the fixed shaft 11, the wound body 50 is mounted inside the plating tank 10. If required, the wound body 50 can be mounted in a plurality of vertical stages. Once the wound body 50 is mounted, a fixed plate 14 is provided at the top of the fixed shaft 11, and by screwing this fixed plate 14 onto the top of the fixed shaft 11, the wound body 50 is pressured from both above and below thereby removing any gaps below the fixed plate 14 or within the wound body, and preventing the plating liquid from leaking out through such gaps. In addition, a specer 15 is provided between the upper and lower wound bodies 50, and between the lower wound body 50 and the bottom of the plating tank, thereby preventing liquid leakage from these sections.

In this apparatus, the wound body 50 is installed by insertion over the fixed shaft 11 of the plating tank 10, and plating liquid is introduced into the fixed shaft 11 via the pipeline 31. The plating liquid flows from the fixed shaft 11 through the liquid through holes 12 towards the wound body 50, and then passes through the permeable core 51, penetrates into the interior of the wound body, and passes through the interior of the wound body and flows out into the plating tank 10. Electroless plating occurs under this liquid flow. In this case, the plating liquid is circulated so that the quantity of liquid flowing out from the plating tank 10 matches the quantity of liquid being supplied to the plating tank. Specifically for example, the wound body 50 is inserted into the plating tank 10, a degreasing liquid is circulated to remove any grease from the surface of the fiber, the fiber is washed with water, and then an etching treatment is conducted with an alkali solution before the fiber is again washed with water. Subsequently, following neutralization by passing through a liquid of concentrated hydrochloric acid or sulfuric acid, an activation treatment is conducted using a mixed solution of one, or two or more tin or palladium based compounds. Subsequently, a plating liquid of silver or the like is passed through the system to perform the electroless plating, and following the plating, the fiber is washed with water. Treatment with stannous chloride or the like may be used instead of the alkali treatment.

In this type of production apparatus and production method, the plating liquid passes through the fixed shaft and is supplied from the inside of the wound body, and flows towards the outside of the wound body, and consequently, the spacing between fibers is pushed outward and expanded by the pressure of the plating liquid, meaning the plating liquid is able to penetrate even the tightest sections between fibers. As a result, the metal plating is formed evenly across the surface of the fiber, even with the fiber in a Cheese winding state.

Following the metal coating (plating) process, the fiber is dried, and then the heating and cooling treatment described above is conducted within the aforementioned temperature range. The heat treatment may also be conducted inside the plating tank using pressurized steam. Alternatively, the wound body may also be removed from the plating tank and transferred to an electric fee or the like to conduct the heat treatment, The heat treatment atmosphere may be air, although in order to prevent discoloration of the metal coating arising from oxidation, the heat treatment is preferably conducted under an atmosphere of an inert gas such as nitrogen or argon.

EXAMPLE 1

As follows is a more specific description of the present invention using a series of examples.

Using the plating apparatus shown in FIG. 1 and FIG. 2, fibers formed from the polymer materials shown in Table 1 were each wound onto a take-up shaft to form a cheese wound body, and this body was then inserted in a plating tank, and following completion of (a) degreasing treatment, (b) alkali treatment and neutralization, and (c) activation treatment, each of which is described below, (d) electroless plating was performed using the metals shown in Table 1, and then (e) heat treatment was conducted. Each treatment was conducted by pressurized circulation of the appropriate chemicals.
(a) Degreasing Treatment: A 5 wt % solution of a degreasing liquid (brand name: Ace Clean A-220, manufactured by Okuno Chemical Industries Co., Ltd.) was circulated through the plating tank for 5 minutes at 55° C., and then ion exchange water was passed through the system to thoroughly wash the fibers.
(b) Alkali Treatment: Following the degreasing treatment, a 20 wt % solution of sodium hydroxide was circulated through the plating tank for 20 minutes at 70° C., ion exchange water was then passed through the system to thoroughly wash the fibers, and then a 5 wt % concentrated hydrochloric acid solution was circulated through the plating tank for 2 minutes at room temperature.
(c) Activation Treatment: Following the alkali treatment, a mixed solution of concentrated hydrochloric acid and palladium chloride (brand name: Catalyst C, manufactured by Okuno Chemical Industries Co., Ltd.) was circulated through the plating tank for 3 minutes at room temperature, and then ion exchange water was passed through the system to thoroughly wash the fibers. Subsequently, a 10 wt % sulfuric acid solution was circulated through the plating tank for 3 minutes at 45° C., thereby achieving activation.
(d) Plating Process: Having bonded a catalyst to the fiber surface via the pretreatment steps described above, a metal coating was formed by circulating a plating liquid of the gold, silver and nickel composition shown in Table 1 through the plating tank.
(e) Heat Treatment: A wound body with a metal coating formed thereon was placed in an electric furnace and subjected to a heating and cooling treatment under the temperature conditions shown in Table 1.

The adhesive (peel) strength of the coating for each of these metal coated fibers was measured. The adhesive strength was measured based on an adhesive strength test performed in accordance with JIS L 0849 used to measure the color fastness of fibers or fabric. Specifically, a white fabric was layered on a bundle of a metal coated fiber test sample, a load of 200 g was applied, and 100 repetitions of a back and forwards friction movement were conducted at a rate of 30 repetitions per minute, and then an adhesive strength from grade 1 to grade 5 in order of the degree of contamination (in order of increasing adhesion) was assigned based On the degree of contamination adhered to the white fabric. Furthermore, the conductivity of each metal coated fiber was also measured. Specifically, the electrical resistance along a 10 cm length of the central section of the fiber was measured, and the resistance per 1 denier for 1 cm of a 150 denier fiber ($\Omega$/cm·denier) was determined.

These results are shown in Table 1. Furthermore, the same tests were conducted on metal coated fibers which had not been subjected to heat treatment, and these results are also shown in Table 1 as comparative examples As can be seen from Table 1, the samples of the present invention in which the metal coated fibers were subjected to heat treatment (A1, A2, A3) all displayed an adhesive strength of at least grade 4, and provided a markedly higher adhesion of the metal coating than the comparative samples which did not undergo heat treatment. Furthermore, the conductivity values were also close to the theoretical values.

EXAMPLE 2

Using an electroless plating method, an acrylic fiber with a coating of 20 wt % of nickel provided on the surface was heated to 150° C. over a period of 30 minutes, this temperature was maintained for 1 hour, and the fiber was then cooled to room temperature (25° C.) over a period of 150 minutes, yielding a metal coated fiber of the present invention (No. A20). In addition, a heated comparative sample (No. B21) was prepared by conducting the same heat treatment, and then cooling the fiber to room temperature over a period of 30 minutes. Furthermore, an unheated comparative sample (No. B22) was prepared by not conducting any heat treatment following the plating treatment. The adhesive strength and the conductivity of the metal coating of each of these metal coated fibers were measured in the same manner as the example 1. The results are shown in Table 2.

As shown in Table 2, the unheated comparative sample (No. B22) displayed considerable separation of the metal coating after only 3 friction repetitions, and the electrical resistance per 1 cm of fiber increased enormously from an initial value of 15 $\Omega$ to more than 1 M$\Omega$. Furthermore, in the case of the heated comparative sample (No. B21), partial separation of the metal coating was caused after 50 friction repetitions, and the electrical resistance increased from an initial value of 15 $\Omega$ to more than 1 M$\Omega$. In contrast, in the metal coated fiber of the present invention (No. A20), even 150 friction repetitions only caused an increase in the electrical resistance from an initial value of 15 $\Omega$ to 1000 $\Omega$, and the adhesion of the metal coating was maintained. In addition, when this heated and gradually cooled fiber was subjected to oiling, (using 15 wt % MK oil, manufactured by Nikka Chemical Co., Ltd.), the electrical resistance following 300 friction repetitions was 150 $\Omega$ and yielding a marked reduction in the resistance increase, and ensuring a considerable reduction in separation of the metal coating.

EXAMPLE 3

Using an electroless plating method, a polyester fiber with a coating of 20 wt % of silver provided on the surface was heated to 200° C. over a period of 60 minutes, this temperature was maintained for 2 hours, and the fiber was then cooled to room temperature (25° C.) over a period of 300 minutes, yielding a metal coated fiber of the present invention (No. A30). In addition, a heated comparative sample (No. B31) was prepared by conducting the same heat treatment, and then cooling the fiber to room temperature over a period of 30 minutes. Furthermore, an unheated comparative sample (No. B32) was prepared by not conducting any heat treatment following the plating treatment. The adhesive strength of the metal coating of each of these metal coated fibers was measured in the same manner as the example 1. The results are shown in Table 2.

As shown in Table 2, the unheated comparative sample (No. B32) displayed considerable separation of the metal coating after only 5 friction repetitions, and the electrical resistance increased enormously from an initial value of 1 $\Omega$ to more than 1 M$\Omega$. Furthermore, in the case of the heated comparative sample (No. B31), partial separation of the metal coating was caused after 100 friction repetitions, and the electrical resistance increased from an initial value of 1 $\Omega$ to 180 $\Omega$. In contrast, in the metal coated fiber of the present invention (No. A30), even 300 friction repetitions only caused an increase in the electrical resistance from an initial value of 1 $\Omega$ to 25 $\Omega$ and the adhesion of the metal coating was maintained. In addition, when this heated and gradually cooled fiber was subjected to oiling, (using 15 wt % MK oil, manufactured by Nikka Chemical Co., Ltd.), the electrical resistance following 300 friction repetitions was 90 and yielding a marked reduction in the resistance increase, and ensuring a considerable reduction in separation of the metal coating.

EXAMPLE 4

Figure 3:
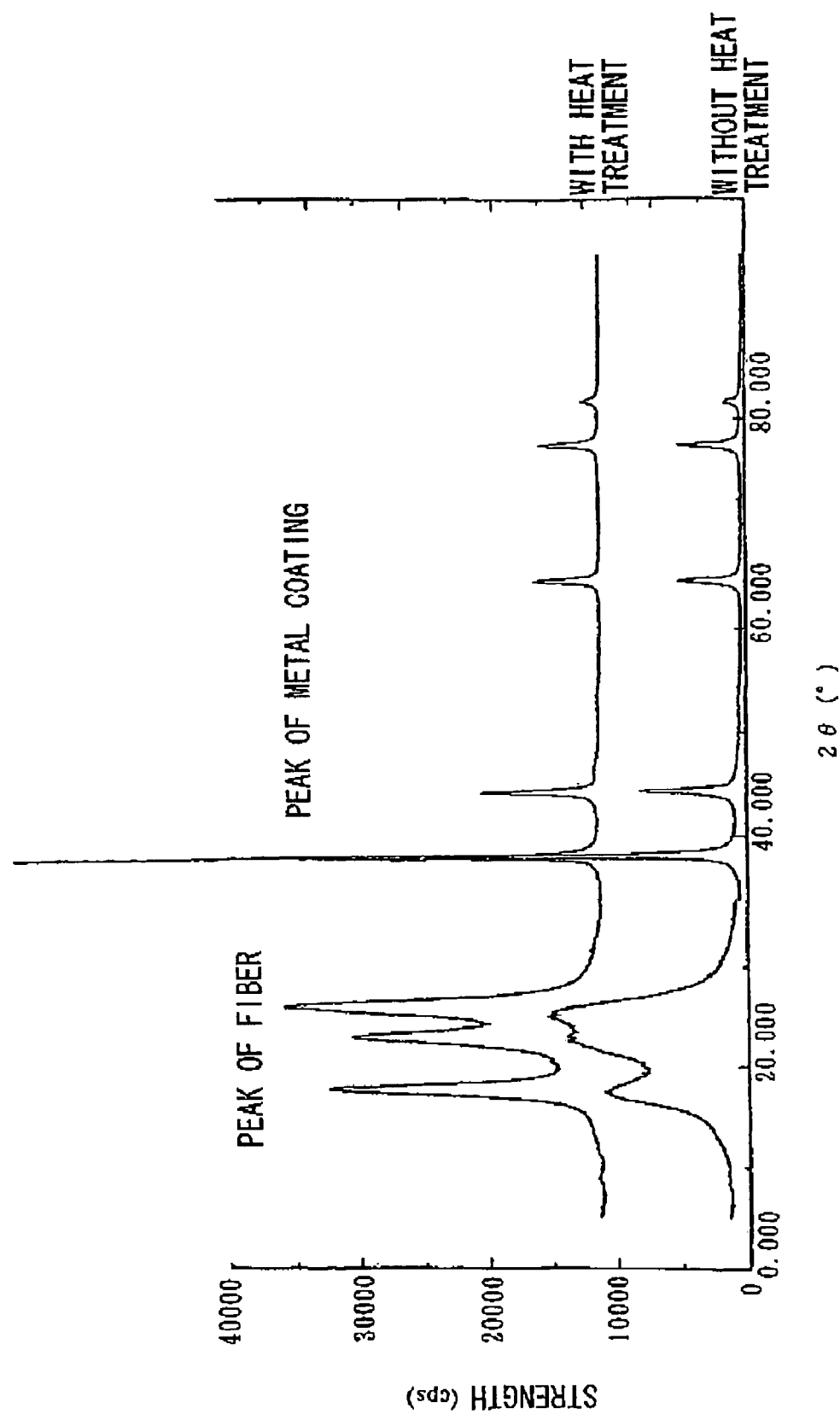
FIG. 3 is an X-ray diffraction graph of an example 4 of the present invention.

The crystallization of the sample of the present invention (No. A30) and the unheated comparative sample (No. B32) from the example 3 were measured using X-ray diffraction. These diffraction graphs are contrasted in FIG. 3. As shown in these graphs, the comparative sample which has undergone no beat treatment has a lower diffraction strength and a smaller degree of crystallization, whereas the heated and gradually cooled sample of the present invention displays strong diffraction strength and a greater degree of crystallization.

EXAMPLE 5

Using fiber samples of length 15 mm of samples from the examples 2 and 3 (No. A20, No. B22, No. A30, No. B32), a 1.5 g load was applied, and the expansion ratio of each fiber at 200° C. was measured. The results are shown in Table 2. The expansion ratio values are percentage values relative to the length of the fiber at room temperature. In addition, the expansion ratio for a raw yarn with no metal coating and which has undergone no heat treatment is also shown in Table 2 for contrast.

As shown in Table 2, both the raw yarns (No. B23, No. B33) displayed a heat contraction of at least 10%. Furthermore, even the fibers which were provided with a metal coating but had not undergone heat treatment (No. B22, No. B32) displayed a contraction in the order of 3%. In contrast, the fibers which had undergone heat treatment and gradual cooling following the metal coating (No. A20, No. A30) displayed no contraction on beating, but rather showed a small expansion of 0.3%, yielding an expansion ratio of no more than 0.5% in both cases.

Embodiment 2

[Metal Coated Fiber]

This metal coated fiber is a fiber in which after a metal coating is provided on the surface of the fiber, the metal coated fiber is subjected to heat treatment at a temperature greater than the crystallization temperature but less than the melting temperature of the fiber, wherein the fiber is formed from either one, or two or more high strength nylon based fibers, polyphenylene sulfide based fibers or polycarbonate based fibers. The high strength nylon based fiber is a fiber such as the high polymerization nylon fiber marketed under the brand name "Zylon". Fibers formed from other engineered plastics can also be used.

As described above, if a synthetic fiber such as polyester, nylon, or polyacryl is heated, then the state of the fiber changes gradually in accordance with the heating temperature, from glass transition to crystallization and then to melting (fusion), and in many cases, the fiber softens as a result of glass transition and then contracts significantly during the subsequent crystallization stage. The present embodiment is a fiber in which the adhesive strength of the metal coating is increased by conducting this type of heat treatment on a metal coated fiber which utilizes either one, or two or more high strength nylon based fibers, polyphenylene, sulfide based fibers or polycarbonate based fibers as the fiber.

In other words, the metal coated fiber is heated to a temperature within a range from 100 to 700° C. which is greater than the crystallization temperature of the fiber, and the fiber surface is softened. The softened surface of the fiber then flows into the minute irregularities at the contact surface with the metal coating, increasing the adhesion between the metal coating and the fiber through an anchoring effect.

In the present embodiment, high strength nylon based fibers, polyphenylene sulfide based fibers or polycarbonate based fibers are used as the fiber. These fibers have a higher level of heat resistance than other synthetic fibers, with a melting temperature which is typically slightly below 700° C., and also display good strength, and consequently can be used under high temperature conditions of approximately 500 to 600° C. At heating temperatures of less than 100° C., a satisfactory heat treatment effect cannot be achieved, whereas if the heating temperature exceeds 700° C. then the fiber melts which is also undesirable.

Specifically, following provision of the metal coating, heat treatment is preferably conducted at a temperature of 200 to 500° C. for a high strength nylon bas d fiber, a temperature of 200 to 300° C. for a polyphenylene sulfide based fiber, a temperature of 200 to 300° C. for a polycarbonate based fiber, or a temperature of 250 to 350° C. for an aramid fiber.

During this heat treatment, the rate of temperature increase is preferably within a range from 0.1 to 10° C. per minute, and the raised temperature is preferably maintained for 5 to 200 minutes. If the rate of temperature increase is less than 0.1° C. per minute then the treatment time becomes overly long, whereas if the rate exceeds 10° C. per minute, the metal coating is more susceptible to separation from the fiber which is also undesirable. If the heating temperature exceeds the melting temperature of the fiber then the entire fiber melts, the crystallinity deteriorates, and the fiber can break and become incapable of supporting the metal coating.

In a similar manner to the embodiment 1, in the present embodiment, by gradually cooling the fiber to room temperature at a constant rate following the heat treatment, the adhesive (coating) strength of the metal coating can be further increased and the expansion ratio can be reduced significantly, although details of this process are the same as the embodiment 1 and are consequently omitted here. The gradual cooling rate is typically within a range from 0.1 to 10° C. per minute, and preferably from 0.1 to 5° C. per minute, and even more preferably from 0.2 to 2° C. per minute.

Furthermore, in a similar manner to the embodiment 1, the heat treatment can utilize heating in a heating furnace, a hot blast furnace or heating by infrared radiation, or a heat treatment using pressurized steam within a plating tank is also suitable. The beat treatment atmosphere may be air, although in order to prevent discoloration of the metal coating arising from oxidation, the heat treatment is preferably conducted under an atmosphere of an inert gas such as nitrogen or argon.

In a similar manner to the embodiment 1 described above, in a metal coated fiber of the present embodiment, during a first stage, by heating the metal coated fiber to a temperature greater than the crystallization temperature of the fiber to promote the recrystallization of the fiber, and then maintaining this temperature for a fixed period of time, the softened fiber can flow completely into any irregularities in the contact surface between the surface of the fiber and the metal coating, removing any gaps at the contact surface and improving the adhesion. Subsequently, in a second stage, by preferably cooling the metal coated fiber from the set temperature to room temperature at a satisfactorily gradual rate, any localized separation between the recrystallized fiber and the metal coating during cooling contraction can be prevented, the coating strength of the metal coating relative to the fiber can be increased significantly, and the expansion ratio of the fiber can be suppressed markedly.

As a result of this type of heating and cooling treatment, a metal coated fiber of the present embodiment combines excellent coating strength and non-expansion in the same manner as the embodiment 1. In other words, as described above, generally if a synthetic fiber is heated beyond the crystallization temperature, the crystal structure alters, and consequently heat contraction of more than 10% can occur, but a fiber with a metal coating which has undergone heat treatment and had the crystal structure of the fiber arranged is unlikely to undergo further crystal structure changes even if heated, and displays almost no heat contraction. In fact, in some cases, such fibers may display a tendency to expand very slightly.

Specifically for example, metal coated fibers can be produced for which the expansion ratio at a temperature greater than the crystallization temperature but less than the melting temperature of the fiber, in the case of no applied load, is no more than ±4%, and preferably no more than ±3%. Furthermore, even under loaded heating, metal coated fibers can be produced for which, at a temperature greater than the crystallization temperature but less than the melting temperature of the fiber for example, the expansion ratio when a g-load equivalent to 1/100th of the diameter (denier value) for the fiber is applied is no more than ±2%, and preferably no more than ±1.5%, and even more preferably no more than ±1%.

In addition, by conducting the heating and cooling treatment described above, a metal coated fiber of the present embodiment can develop an adhesive strength of at least grade 4 in an adhesive strength test based on Japan Industrial Standards JIS L 0849.

The fiber used in the present embodiment is a high strength nylon based fiber, a polyphenylene sulfide based fiber, or a polycarbonate based fiber, although either a single such fiber or a mixture of two or more fibers can be used. Furthermore, fibers formed by mix spinning of these synthetic fibers and a natural fiber can also be used.

There are no restrictions on the type of metal used as a coating on the surface of the fiber. For example, silver, gold, platinum, copper, nickel, tin, zinc, palladium, as well as mixtures or alloys thereof can be used. There are also no particular restrictions on the coating method or technique. The present invention can be widely applied to fibers with metal coatings formed by electroplating, chemical plating, or vacuum deposition. Furthermore, provided treatment is conducted within the specified range for the heating and cooling treatment, there are no particular restrictions on the other conditions.

A metal coated fiber of the present embodiment has excellent conductivity Specifically for example, conductive fibers can be produced in which for 1 cm of fiber, the electrical resistance per 1 denier is no more than 10,000 $\Omega/cm \cdot denier$, and preferably no more than 1000 $\Omega/cm \neq denier$, and even more preferably no more than 100 $\Omega/cm \cdot denier$. By reducing the quantity of metal coating, a fiber with an electrical resistance of at least 100,000 $\Omega/cm \cdot denier$ can also be obtained. Furthermore, particularly in those cases in which white gloss metals such as silver, platinum, nickel or tin are used as the coating, a bright conductive fiber with a whiteness (L value) of at least 50 can be obtained.

An additional surface treatment may also be performed on a metal coated fiber according to the present embodiment, following the heating and gradual cooling treatment. Details of, and the effects of this type of surface treatment are the same as described for the embodiment 1 and are consequently omitted here.

In a similar manner to the embodiment 1, a metal coated fiber of the present embodiment can be used as short fibers, long fibers, or as a variety of other yarns such as mix spun yarn and processed yarn. Furthermore, the metal coated fiber can be used alone, or can be used as a mixed fiber in which the metal coated fiber undergoes mix spinning with a synthetic fiber, a natural fiber, or a mixed fiber of a synthetic fiber and a natural fiber. The content of the metal coated fiber within such a mixed fiber varies depending on the intended use, although typically a content between 0.1 to more than 50% is suitable, and depending on the quantity used, a mixed conductive fiber for which the electrical resistance per 1 denier, for a 1 cm mixed fiber, is no more than 10,000 $\Omega/cm \cdot denier$, and preferably no more than 1000 $\Omega/cm \cdot denier$, can be obtained.

In addition, a metal coated fiber of the present embodiment can also be used for textile materials or knitting materials in the same manner as the embodiment 1. In such cases, metal coated fibers using silver, tin or nickel or the like offer a high level of whiteness, and consequently offer excellent coloring when dyed, and are suited to fabrics such as textiles and clothing. In addition, in the same manner as the embodiment 1, fibers with coatings of silver or the like can also be used as antibacterial fibers and in antibacterial clothing. Furthermore, in a similar manner to the embodiment 1, a metal coated fiber of the present embodiment can also be utilized in applications such as electromagnetic shielding materials, static prevention materials, substitute materials aimed at lightening electrodes or electric wiring, composite conductive materials, or conductive reinforcing agents for fiber reinforced plastics.

[Production Method]

A metal coated fiber of the present embodiment is produced by providing a metal coating on the surface of a high strength nylon based fiber, a polyphenylene sulfide based fiber, or a polycarbonate based fiber (raw yarn) using electroplating or chemical plating or the like, conducting heat treatment within the temperature range described above, and then cooling the fiber. In a similar manner to the embodiment 1, if during the provision of the metal coating, the fiber surface is pretreated by etching with an alkali or the like to roughen the surface, then the plating metal applied flows into the irregularities on this rough fiber surface, exhibiting an anchoring effect, which is even more desirable. Furthermore in the same manner as the example 1, a plating apparatus shown in FIG. 1 and FIG. 2 is preferably used to form the metal coating on the fiber (raw yarn).

Following the metal coating (plating) process, the fiber is dried, and then the heating and cooling treatment is conducted within the aforementioned temperature range. In the same manner as the embodiment 1, the heat treatment may also be conducted inside the plating tank using pressured steam. Alternatively, the wound body may also be removed from the plating tank and transferred to an electric furnace or the like to conduct the heat treatment. The heat treatment atmosphere may be air, although in order to prevent discoloration of the metal coating arising from oxidation, the heat treatment is preferably conducted under an atmosphere of an inert gas such as nitrogen or argon.

EXAMPLE 6

As follows is a more specific description of the present invention using an example.

Using the plating apparatus shown in FIG. 1 and FIG. 2, fibers formed from the polymer materials (high strength nylon based fibers, polyphenylene sulfide based fibers, polycarbonate based fibers and aramid fibers) shown in Table 3 were each inserted in the plating tank, and following completion of (a) degreasing treatment, (b) alkali treatment and neutralization, and (c) activation treatment in a similar mariner to the example 1, (d) electroless plating was conducted, followed by (e) heat treatment.

The adhesive (peel) strength of the coating for each of these metal coated fibers was measured. In a similar manner to the example 1, the adhesive strength was measured based on an adhesive strength test performed in accordance with JIS L 0849. Furthermore, the conductivity of each metal coated fiber was also measured in a similar manner to the example 1. Specifically, the initial electrical resistance and the electrical resistance following 100 friction repetitions were measured. In addition, the contraction ratio (expansion ratio) was also measured. This contraction ratio refers to the expansion length when a 1.5 g load is applied to the fiber at 200° C.

These results ate shown in Table 3. Furthermore, the same tests were conducted on metal coated fibers which had not been subjected to heat treatment, and these results are also shown in Table 3 as comparative examples.

As can be seen from Table 3, the samples of the present invention in which the metal coated fibers were subjected to heat treatment (A1, A2, A3, A4) all displayed an adhesive strength of at least grade 4, whereas the comparative samples which did not undergo heat treatment (B1, B2, B3) were no more than grade 3, so that the present invention samples displayed excellent adhesion with markedly higher coating (peel) strength values. Furthermore, the samples of the present embodiment displayed excellent conductivity with electrical resistance values following friction, for fibers which displayed identical initial electrical resistance, that were markedly lower than those of the comparative samples. In addition, the contraction ratio for the comparative samples displayed a contraction of −1% to −2%, whereas the contraction ratios for the fibers of the present invention were all less than 0% and were extremely stable with almost no contraction.

Embodiment 3

[Metal Coated Fiber]

A feature of this metal coated fiber is that both a conductive metal coating and a corrosion resistant metal coating are layered on a fiber. By using the conductive metal coating as a substrate, and then providing an additional metal coating which displays good durability relative to corrosion by chlorine, sulfur and oxygen on the surface of this substrate, a fiber with both a high level of conductivity and excellent corrosion resistance can be produced.

In a similar manner to the embodiment 1, examples of the fibers which can be used in this embodiment of the present invention include synthetic fibers comprising as their main component a polymer material such as polyester, polyamide, acryl, polyolefin or nylon, natural fibers such as cotton, cellulose based fibers such as rayon, and in addition to these organic fibers, inorganic fibers such as glass fiber, or composite fibers of the above fibers. Fibers formed by mix spinning of two or more of these fibers are also suitable, as are fibers formed by mix spinning of synthetic fibers and natural fibers. Of these, the present invention is particularly useful for fibers utilizing synthetic fibers such as polyester fibers, acrylic fibers and nylon fibers.

Moreover, as described above, performing metal coating of long fibers of polyester has been difficult with conventional techniques, but according to the present invention, a metal coated fiber with a powerful adhesive strength can be formed. Single fibers with a thickness of 0.1 to 15 d (deniers) are particularly suitable. If the diameter of the fiber is narrower than 0.1 d, then the strength of the fiber is undesirably low, whereas if the diameter exceeds 15 d, the fiber hardens when the metal coating is provided, and flexibility is lost, which is also undesirable.

Of the metal coatings provided on the surface of the fiber, the conductive metal coating which acts as the substrate can utilize at least one of silver, copper, nickel, tin and zinc, as well as mixtures or alloys thereof. There are also no particular restrictions on the coating method or technique. Electroplating, chemical plating (electroless plating) or vacuum deposition can be used.

The corrosion resistant metal coating provided on the surface of the conductive metal coating can utilize at least one of gold, platinum, palladium, osmium and rhodium. By providing this type of precious metal on the surface, extremely good durability relative to corrosion by chlorine, sulfur and oxygen can be achieved. The thickness of the corrosion resistant metal coating is typically from 1 nm to 500 nm. If the coating is thinner than this range then the corrosion resistance deteriorates. Furthermore, in those cases in which the conductive metal coating of the substrate is a white gloss metal such as silver, nickel or tin, then when gold is used as the corrosion resistant metal coating, if the thickness of the outer coating exceeds 500 nm, the yellow color strengthens causing a reduction in the whiteness produced by the substrate. Provided the thickness of gold is less than 500 nm, a conductive fiber with a whiteness (L value) of at least 50 can be obtained Platinum, palladium and osmium do not generate yellowing and may consequently be thicker than 500 nm. Palladium and osmium are expensive and so from an economic viewpoint, gold or platinum are preferred.

A plurality of layers of the conductive metal coating and/or the corrosion resistant metal coating can also be formed using different metal elements. Specifically for example, by providing a thin nickel substrate layer on the surface of the fiber and then providing silver plating on the surface of this substrate, a conductive metal coating with a two layered structure is formed, and a corrosion resistant metal coating layer of gold or platinum can then be formed on the surface of this conductive metal coating. This corrosion resistant metal coating layer may also comprise a double layer of gold and platinum. By forming a plurality of conductive metal coatings and/or corrosion resistant metal coatings in this manner, the corrosion resistance relative to conductive metal coatings such as silver, nickel and copper can be improved, thereby improving the chemical stability of the fiber. As a result, the reliability of the fiber when used over extended periods, which is a requirement for electronic materials, can be improved.

In a metal coated fiber of the present embodiment, by also ensuring that the surface of the metal coating has an orange peel texture (as described above), a fiber with excellent adhesive strength can be produced. Because the thickness of the conductive metal coating and the corrosion resistant metal coating is typically only several hundred nanometers (nm), metal coatings with an orange peel texture have a rough surface right through to the underside of the coating. As a result, the surface of the fiber flows into the irregularities on the underside of the conductive metal coating, exhibiting an anchoring effect, and thereby increasing the adhesive strength of the metal coating.

A metal coated fiber of the present embodiment is preferably subjected to heat treatment at a temperature greater than the crystallization temperature but less than the melting temperature of the fiber. Conducting this heat treatment enables the structure of the fiber to be arranged, or more specifically promotes recrystallization of the fiber, enabling the adhesive strength of the metal coating to be improved considerably, and the contraction on heating to be suppressed substantially The heat treatment is preferably conducted after at least one of the conductive metal coating and the corrosion resistant metal coating have been provided.

As described above, if a synthetic fiber such as polyester, nylon, or polyacryl is heated, then the state of the fiber changes gradually in accordance with the heating temperature, from glass transition to crystallization and then to melting (fusion), and in many cases, the fiber softens as a result of glass transition and then contracts significantly during the subsequent crystallization stage. In a similar manner to that described above, in the present embodiment, by heating the metal coated fiber beyond the crystallization temperature of the fiber so that the surface of the fiber is softened, the softened surface of the fiber will flow into the minute irregularities at the contact surface between the fiber and the metal coating, increasing the adhesion between the metal coating and the fiber through an anchoring effect, and producing a large coating strength.

Specific heating temperatures are as described for the embodiment 1, namely a temperature of 170 to 240° C. for a polyester fiber, a temperature of 110 to 180° C. for a nylon fiber, and a temperature of 150 to 200° C. for an acrylic fiber. In this heat treatment, the raised temperature is preferably maintained for 5 to 200 minutes to ensure satisfactory softening of the fiber.

Furthermore, in a similar manner to the embodiment 1, in the cooling process following the softening of the fiber, the structure of the fiber is arranged For example, the heating causes an alignment of the molecular orientation of the fibers and crystallization, and the fibers then contract while bound tightly to the metal coating, and during the gradual cooling process, the metal coating contracts while maintaining its integration with the fiber, causing an improvement in the coating strength. In this cooling process, if the cooling rate of the metal coated fiber is not appropriate, then a satisfactory coating strength is not achieved. In other words, a synthetic fiber has a larger coefficient of linear expansion than metals, so that, for example, the coefficient of linear expansion for a polyester fiber or an acrylic fiber or the like is approximately twice that of silver or copper, and so the degree of contraction on cooling is larger. As a result, if the cooling rate is too fast, then the contraction of the metal coating is unable to keep up with the contraction of the fiber, and the contact surface between the fiber and the metal coating can partially separate, and consequently gradual cooling following the beat treatment is preferred.

In addition, in a similar manner to the embodiment 1, the heat treatment can be conducted in a beating furnace, a hot blast furnace, or may involve heating by infrared radiation. Furthermore, heat treatment using pressurized steam within a plating tank is also suitable. The heat treatment atmosphere may be air, although in order to prevent discoloration of the metal coating arising from oxidation, the heat treatment is preferably conducted under an atmosphere of an inert gas such as nitrogen or argon.

As a result of this type of heating and gradual cooling treatment, a metal coated fiber of the present embodiment combines excellent coating strength and non-expansion, in the same manner as the embodiment 1. In other words, as described above, generally if a synthetic fiber is heated beyond the crystallization temperature, the crystal structure alters, and consequently heat contraction of more than 10% can occur, but a metal coated fiber of the present embodiment has undergone heat treatment and had the crystal structure of the fiber arranged, and is consequently unlikely to undergo further crystal structure changes even if heated, and displays almost no heat contraction. In fact, in some cases, such fibers may display a tendency to expand very slightly.

Specifically for example, metal coated fibers can be produced for which the expansion ratio at a temperature greater than the crystallization temperature but less than the melting temperature of the fiber, in the case of no applied load, is no more than ±4%, and preferably no more than ±3%. Furthermore, even under loaded heating, metal coated fibers can be produced for which, in the temperature range described above, the expansion ratio when a g-load equivalent to 1/100th of the denier value for the fiber is applied is no more than ±2%, and preferably no more than ±1.5%, and even more preferably no more than ±1%.

In addition, by conducting the heating and cooling treatment described above, a metal coated fiber of the present embodiment can develop an adhesive strength of at least grade 4 in an adhesive strength test based on Japan Industrial Standards, JIS L 0849.

In addition, according to the present embodiment, a metal coated fiber with excellent conductivity can be obtained. Specifically for example, conductive fibers can be produced in which for 1 cm of fiber, the electrical resistance per 1 denier is no more than 10,000 Ω/cm·denier, and preferably no more than 10,000 Ω/cm·-denier, and even more preferably no more than 100 Ω/cm·denier. By reducing the quantity of metal coating, a fiber with an electrical resistance of at least 10,000 Ω/cm·denier can also be obtained A metal coated fiber of the present embodiment also includes fibers in which an additional surface treatment is conducted on the surface of the corrosion resistant metal coating. The details and effects of this treatment are the same as those described for the embodiment 1 and are consequently omitted here.

In the same manner as the embodiment 1, a metal coated fiber of the present embodiment can be used as short fibers, long fibers, br as a variety of other yarns such as mix spun yarn and processed yarn. Furthermore, the metal coated fiber can be used alone, or can be used as a mixed fiber in which the metal coated fiber undergoes mix spinning with a synthetic fiber, a natural fiber, or a mixed fiber of a synthetic fiber and a natural fiber. The content of the metal coated fiber within such a mixed fiber varies depending on the intended use, although typically a content between 0.1 to more than 50% is suitable, and depending on the quantity used, a mixed conductive fiber for which the electrical resistance per 1 denier, for a 1 cm mixed fiber, is no more than 10,0000 Ω/cm·denier, and preferably no more than 1000 Ω/cm·denier, can be obtained.

In addition, a metal coated fiber of the present embodiment can also be used for textile materials or knitting materials in the same manner as the embodiment 1. In such cases, metal coated fibers using silver, tin or nickel or the like offer a high level of whiteness, and consequently offer excellent coloring when dyed, and are suited to fabrics such as textiles and clothing. In addition, in the same manner as the embodiment 1, fibers with coatings of silver or the like can also be used as antibacterial fibers and in antibacterial clothing. Furthermore, in a similar manner to the embodiment 1, a metal coated fiber of the present embodiment can also be utilized in applications such as electromagnetic shielding materials, substitute materials aimed at tightening electrodes or electric wiring, composite conductive materials, or conductive reinforcing agents for fiber reinforced plastics.

[Production Method]

A metal coated fiber of the present embodiment is produced by providing a metal coating on the surface of a fiber (raw yarn) such as the organic fibers described above using electroplating or chemical plating or the like, conducting heat treatment within the temperature range described above, and then cooling the fiber. In a similar manner to the embodiment 1, if during the provision of the metal coating, the fiber surface is pretreated by etching with an alkali or the like to roughen the surface, then the plating metal applied flows into the irregularities on this rough fiber surface, exhibiting an anchoring effect, which is even more desirable. Furthermore in the same manner as the example 1, a plating apparatus shown in FIG. 1 and FIG. 2 is preferably used to form the metal coating on the fiber (raw yarn).

Following the metal coating (plating) process, the fiber is dried, and then the heating and cooling treatment is conducted within the aforementioned temperature range. In the same manner as the embodiment 1, the heat treatment may also be conducted inside the plating tank using pressurized steam. Alternatively, the wound body may also be removed from the plating tar and transferred to an electric furnace or the like to conduct the heat treatment. The heat treatment atmosphere may be air, although in order to prevent discoloration of the metal coating arising from oxidation, the heat treatment is preferably conducted under an atmosphere of an inert gas such as nitrogen or argon.

EXAMPLE 7

As follows is a more specific description of the present invention using an example.

Using the plating apparatus shown in FIG. 1 and FIG. 2, fibers formed from the polymer materials (fineness 150 denier) shown in Table 4 were each inserted in the plating tank, and following completion of (a) degreasing treatment, (b) alkali treatment and neutralization, and (c) activation treatment in a similar manner to the example 1, electroless plating of a first layer metal (a conductive metal coating) shown in Table 4 was performed, and then a second layer metal (corrosion resistant metal coating) was layered onto the surface of the first layer metal using electroless plating. In addition, each fiber was subjected to heat treatment at a temperature greater than the crystallization temperature but less than he melting temperature of the fiber. Bach treatment was conducted by pressurized circulation of the appropriate chemicals. The sequence of the aforementioned plating treatment and heat treatment are described below in (d 1) and (e 1) respectively.

(d1) Plating Treatment. Having bonded a catalyst to the fiber surface via the pretreatment steps described above, a metal coating was formed by circulating a plating liquid of the gold, silver and nickel composition shown in Table 3 through the plating tank.

(e1) Heat Treatment: A metal coated fiber was placed in an electric furnace and subjected to a beating and cooling treatment under the temperature conditions shown in Table 4.

The adhesive (peel) strength of the coating for each of these metal coated fibers was measured. In a similar manner to the example 1, this adhesive strength was measured based on an adhesive strength test performed in accordance with JIS L 0849. Furthermore, the conductivity of each metal coated fiber was also measured in a similar manner to the example 1. The fibers in this example were 15 deniers, but the thickness of the fibers is not restricted to this value.

The whiteness of each metal coated fiber was also measured, and in addition, a chlorine bleaching test was also conducted, and the presence of any corrosion noted. The chlorine bleaching test was conducted by immersing a metal coated fiber sample into 100 cc of a chlorine aqueous solution (a 50% aqueous solution of the brand name Hiter, manufactured by Kao Corporation) for 10 minutes at room temperature, observing any generation of bubbles, and then evaluating the fiber on a 3 grade scale.

These results are shown in Table 4. Furthermore, the same tests were conducted on metal coated fibers which had not been subjected to heat treatment, and these results are also shown in Table 4 as comparative examples.

EXAMPLE 8

With the exception of altering the plating method for the metal coating to electroplating, metal coated fibers were produced in a similar manner to the example 7. These metal coated fibers were subjected to the same tests as the fibers of the example 7. The results are shown in Table 5.

EXAMPLE 9

With the exception of altering the plating method for the metal coating to a sol gel method, metal coated fibers were produced in a similar manner to the example 7. These metal coated fibers were subjected to the same tests as the fibers of the example 7. The results are shown in Table 6.

As can be seen from Table 4 through Table 6, metal coated fibers which fall within the preferred scope of the present invention all display excellent corrosion resistance to chlorine corrosion, and also have excellent conductivity with low electrical resistance. In addition, the coating strength is high, and the silver and nickel coatings also display a high level of whiteness.

Embodiment 4

A conductive resin composition according to the present invention is a resin composition in which short fibers with a metal coating are mixed into a resin to impart conductivity, wherein the metal coated short fibers are formed by providing a metal coating on the surface of a substrate fiber, and then conducting heat treatment at a temperature greater than the crystallization temperature but less than the melting temperature of the substrate fiber. The metal coated short fibers are preferably mixed into the resin composition so as to retain mutual contact. In the following description, unless otherwise stated, the units % refer to mass %.

Examples of the fiber which acts as the substrate for the metal coated short fibers (hereafter termed the substrate fiber) include synthetic fibers comprising as their main component a polymer material such as polyester, polyamide, acryl, polyolefin or nylon, natural fibers such as cotton, cellulose based fibers such as rayon, as well as composite fibers of the above fibers. Of these, fibers in which a metal coating is provided on a synthetic fiber such as a polyester fiber, an acrylic fiber or a nylon fiber display markedly higher coating strength values than conventional fibers.

In addition, the present invention also includes fibers which utilize a high strength nylon based fiber (such as the commercial product Zylon), a polyphenylene sulfide based fiber or a polycarbonate based fiber as the substrate fiber. These fibers are high polymers with a high melting temperature and excellent heat resistance, and a conductive resin containing a metal coated fiber using this type of substrate resin is suitable for use in high temperature environments. Fibers formed from other engineered plastics can also be used.

Examples of suitable metal coatings for provision on the surface of the substrate fiber include conductive metals formed from either one, or two or more metals selected from amongst gold, silver, copper, nickel, tin, zinc, platinum, osmium, palladium, and alloys thereof. Furthermore, the metal coating may also comprise layers of two or more different metals. There are no restrictions on the coating method or technique. Electroplating, chemical plating (electroless plating) or vacuum deposition can be used. An aforementioned metal coating is preferably provided on the surface of the substrate fiber using electroplating or chemical plating or the like. In a similar manner to the embodiment 1, if during the provision of the metal coating, the fiber surface is pretreated by etching with an alkali or the like to roughen the surface, then the plating metal applied flows into the irregularities on this rough fiber surface, exhibiting an anchoring effect, which is desirable.

A metal coating as described above preferably has an orange peel texture on the surface. Because the thickness of the metal coating is typically no more than several hundred nanometers (nm), metal coatings with an orange peel texture have a rough surface right through to the underside of the coating. As a result, the surface of the fiber flows into the irregularities on the underside of the conductive metal coating, exhibiting an anchoring effect, and thereby increasing the adhesive strength between the substrate fiber and the metal coating. In addition, when this fiber is mixed into the substrate resin, an anchoring effect develops between the surface of the metal coated short fibers and the substrate resin, improving the adhesion relative to the substrate resin.

Following provision of the metal coating, by preferably subjecting the metal coated fiber to heat treatment at a temperature greater than the crystallization temperature but less than the melting temperature of the substrate fiber, the structure of the fiber can be arranged, or more specifically recrystallization of the substrate fiber can be promoted, enabling the coating strength of the metal coating to be improved considerably, and the contraction on heating to be suppressed substantially.

As described above, if a synthetic fiber such as polyester, nylon, or polyacryl is heated, then the state of the fiber changes gradually in accordance with the heating temperature, from glass transition to crystallization and then to melting (fusion), and in many cases, the fiber softens as a result of glass transition and then contracts significantly during the subsequent crystallization stage. In a similar manner to that described above, in the present embodiment, by heating the metal coated fiber beyond the crystallization temperature of the fiber so that the fiber softens, the softened surface of the fiber will flow into the minute irregularities at the contact surface between the fiber and the metal coating, increasing the adhesion between the metal coating and the fiber through an anchoring effect and producing a large coating strength.

As described in the embodiment 1, specific heating temperatures in the case of polyester, nylon or polyacryl or the like are within a range from 120° C. to 250° C. Specifically, a polyester fiber is preferably heated at 170 to 240° C., a nylon fiber at 110 to 180° C., and an acrylic fiber at 150 to 200° C.

As described above, high strength nylon fibers, polyphenylene sulfide based fibers and polycarbonate based fibers are all heat resistant fibers with high melting temperatures, and consequently heat treatment is preferably conducted at a temperature of 200 to 500° C. for a high strength nylon based fiber, a temperature of 200 to 300° C. for a polyphenylene sulfide based fiber, a temperature of 200 to 300° C. for a polycarbonate based fiber, or a temperature of 250 to 350° C. for an aramid fiber, in the same manner as the embodiment 2.

In this heat treatment, the raised temperature is preferably maintained for 5 to 200 minutes to ensure satisfactory softening of the fiber. If the heating temperature exceeds the melting temperature of the substrate fiber then the entire fiber melts, the crystallinity deteriorates, and the fiber can break and become incapable of supporting the metal coating, which is undesirable.

Furthermore, in a similar manner to the embodiment 1, by subjecting the metal coated fiber to heat treatment, the structure of the fiber can be arranged during the subsequent cooling process, thereby improving the coating strength. For example, the heating causes an alignment of the molecular orientation of the fibers and crystallization, and the fibers then contract while bound tightly to the metal coating, and during the gradual cooling process, the metal coating contracts while maintaining its integration with the fiber, causing an improvement in the coating strength. Furthermore this heat treatment improves the coating strength and imparts non-contraction characteristics. Generally, if a synthetic fiber is heated to a temperature greater than the crystallization temperature then the crystal structure changes, resulting in heat contraction in many cases, but if a heat treatment such as that described above is conducted, then the crystal structure of the substrate fiber is arranged, and is unlikely to undergo farther crystal structure changes even if heated, and displays almost no heat contraction. In addition, by conducting the heat treatment, a fiber with a lower electrical resistance can be produced.

Furthermore, in a similar manner to the embodiment 1, the heat treatment can utilize heating in a heating furnace, a hot blast furnace, or heating by infrared radiation. A heat treatment using pressurized steam within a plating tank is also suitable. The heat treatment atmosphere may be air, although in order to prevent discoloration of the metal coating arising from oxidation the heat treatment is preferably conducted under an atmosphere of an inert gas such as nitrogen or argon.

As a result of this type of heating and cooling treatment, metal coated short fibers according to the present embodiment can develop an adhesive strength of at least grade 4 in an adhesive strength test based on Japan Industrial Standards JIS L 0849, in a similar manner to the embodiment 1.

Long fibers can also be used as the substrate fiber for metal coated short fibers of the present embodiment, and in such a case, a metal coating such as that described above is provided on the substrate fiber, and the fiber is subjected to heat treatment and then cut to generate short fibers. Alternatively, the substrate fiber can utilize long fibers which have been precut to generate short fibers, and these short fibers are then provided with a metal coating and subjected to heat treatment. Specifically for example, a substrate fiber generated by cutting fibers to form short fibers is placed in an electroless plating tank, and electroless plating conducted with stirring. When a metal coating is provided on short fibers, the metal coating is even generated around the end surfaces of the fibers, and consequently the contact between metal coatings is good, and when the fibers are mixed into a resin, excellent conductivity can be achieved.

When mixed into a typical synthetic resin, the metal coated short fibers should typically have a fiber diameter of approximately 1 µm to 100 µm, and a fiber length of 0.1 mm to 10 cm, and preferably 1 mm to 10 mm. If the fiber length is less than 0.1 mm then contact between fibers lessens. In contrast, if the fiber length exceeds 10 cm, then when mixed into the resin, intertwining of the fibers becomes excessive, and dispersing the fibers uniformly within the resin becomes more difficult.

Fibers in which a rustproofing treatment or oil treatment (oiling) using paraffin or wax has been conducted on the surface of the metal coating may also be used as the metal coated short fibers. With this type of rustproofing treatment, even in cases in which the metal coated short fibers mixed into the substrate resin protrude partially from the resin, the metal coating is prevented from rusting, and consequently the conductivity can be maintained with good stability over an extended period. The quantity of surface treatment agent used varies depending on the type of metal and the conditions for the heating and cooling treatment, although typically quantities within a range from 0.1 to 20% are effective.

Furthermore, fibers in which a protective coating of silica or titania is provided on the surface of the metal coating can also be used for the metal coated short fibers. This surface protective coating can be formed by applying an alkoxide solution of silicon or titanium to the surface of the metal coating, and then drying and calcining the protective coating. In such a case, because the crystal structure of the substrate fiber has already been arranged through the heat treatment, even if the calcination is conducted at approximately the same temperature as the prior heat treatment, the crystal structure of the substrate fiber is not destroyed. For example, the calcination treatment can be performed at no more than approximately 240° C. for a polyester fiber, no more than approximately 180° C. for a nylon fiber, and no more than approximately 200° C. for an acrylic fiber. Alternatively, the silicon compound coating or titanium compound coating may also be provided after provision of the metal coating but prior to the heat treatment, and the heat treatment of the substrate fiber is then conducted simultaneously with the calcination treatment By providing a protective coating formed from silica or titania or the like on the surface of the metal coating, even in cases in which the metal coated short fibers protrude partially and are exposed externally, the metal coating is prevented from rusting by this protective coating, and consequently the conductivity can be maintained with good stability over an extended period. Even with the provision of this type of coating, provided the thickness of the coating is in the order of nanometers (nm), there is no effect on the electrical characteristics of the fiber.

A variety of resins can be used for the substrate resin into which the aforementioned metal coated short fibers are mixed, including acryl, nylon, polyester, polyolefin, polycarbonate, polyimide, phenol and melamine. The metal coated short fibers are mixed into this substrate resin. Specifically for example, the metal coated short fibers are kneaded into the substrate resin to produce a conductive resin composition. The metal coated short fibers are preferably mixed into the resin composition so as to retain mutual contact.

The quantity of metal coated short fibers mixed into the substrate resin varies depending on the fiber length and the desired level of conductivity, although quantities equivalent to 1 to 50% of the entire conductive resin composition are suitable, and typically a satisfactory conductivity can be obtained with a quantity of approximately 20%. If the quantity of added metal coated short fibers exceeds 80%, then tearing and separation become problematic. Furthermore, if a transparent resin is used as the substrate resin, then a conductive r sin composition can be produced in which the whiteness or metal color of the added metal coated short fibers can be seen through the resin. For example, by using fibers provided with a metal coating of a white gloss metal such as silver, platinum or nickel, a conductive resin composition with a high level of whiteness can be produced.

A conductive resin composition of the present invention may also contain other additives in addition to the metal coated short fibers. Examples of these other additives include silica powders for regulating the flexibility of the substrate resin, as well as other additives typically added to resins.

A conductive resin composition of the present invention can be molded into a variety of shapes and forms including conductive fibers, conductive paint films, conductive films, conductive nets, conductive pipes, conductive cases, or other molded products, laminated resins or resin masses. A conductive resin composition of the present invention can be used as the raw material for textile materials or knitting materials such as woven or nonwoven fabric, electromagnetic shielding materials, static prevention materials such as dust free garments, gloves, shoes, covers and work clothing, or as substitute materials for electrodes or electric wiring. For example, because a case formed by kneading metal coated short fibers into a substrate resin has conductivity, by using the case for the external frame of electronic equipment such as a PC, the case is able to exhibit electromagnetic shielding properties and a static prevention function. Furthermore, if processed into a thin film, then the conductive thin film can be used as an electromagnetic shielding material, a static prevention cover, or a packaging material.

EXAMPLES 10 TO 12

As follows is a more specific description of the present invention using a series of examples. In each of the examples below, a fiber (150 denier) formed from the polymer materials shown in each of ate tables was formed as short fibers by cutting to a length of 0.1 to 1.5 cm, and following completion of (a) degreasing treatment, (b) alkali treatment and neutralization, and (c) activation treatment in a similar manner to the example 1, the treatment steps (d2) to (e2) described below were performed, thereby producing metal coated short fibers.

(d2) Formation of a First Layer Metal Coating: Having bonded a catalyst to the surface of the short fibers via the pretreatment steps described above, a substrate first layer metal coating was formed by electroless plating, by immersing the short fibers in a plating liquid of silver, nickel or copper.

(d3) Formation of a Second Layer Metal Coating: A second layer metal coating was formed by electroless plating by immersing the short fibers with the first layer metal coating in a plating liquid of gold, silver, or copper.

(e2) Heat Treatment: A portion of the metal coated short fibers produced by the above treatments were placed in an electric furnace, and subjected to heat treatment at a temperature greater than the crystallization temperature but less than the melting temperature of the short fibers.

The metal coated short fibers shown in Table 7 to Table 9 were mixed into a substrate resin (polyester, acryl, nylon), yielding conductive resin compositions. For each of these conductive resin compositions, affinity with the substrate resin, the degree of separation of the metal coating, the level of corrosion, and the whiteness (L value) were measured, and these results are shown, together with the production conditions, in Table 7 through Table 9. In contrast, as a comparative standard, the results of measuring the same values for a conductive resin composition formed by mixing ITO powder into a substrate resin are also shown in Table 7 through Table 9. The values used to indicate the affinity with the substrate resin are recorded as either a "yes" or a "no" in relation to separation of the metal coating. This affinity varies depending on the shape, thickness and surface state of the metal coated short fibers, as well as on the production technique used, although in the examples presented, the surface state is either amorphous or crystallized, the thickness of the metal coated short fibers is within a range from 1 to 100 µm and is uniform, and the shapes are identical.

As is evident from Table 7 through Table 9, the conductive fibers of the present invention display markedly lower rates of separation of the metal coating, and consequently offer stable conductivity. Furthermore, they have low quantities of metal and are lightweight, while still displaying excellent long term corrosion resistance. In addition, in the comparison between amorphous (unheated) and crystallized (heat treated) samples, the crystallized fibers displayed higher affinity, and showed no separation. This finding is thought to indicate that the surface of the metal coating has improved affinity as a result of the heat treatment.

EXAMPLES 13 TO 16

With the exception of using a high strength nylon based fiber, a polyphenylene sulfide based fiber, a polycarbonate based fiber or an aramid fiber as the substrate fiber, metal coated short fibers were produced in the same manner as the examples 10 to 12, and these fibers were then mixed into a substrate resin (polyester, acryl, nylon) to generate conductive resin compositions. For each of these conductive resin compositions, the frequency of tearing from the substrate resin, the degree of separation of the metal coating, the level of corrosion, and the whiteness (L value) were measured, and these results are shown, together with the production conditions, in Table 10 through Table 13. These results displayed the same trends as those observed for the examples 10 to 12.

EXAMPLES 17 TO 23

The aforementioned plating treatment (a) to (e2) was performed on substrate fibers formed from the polymer materials shown in Table 14 through Table 20 to generate metal coated short fibers, and these metal coated short fibers were then nixed into a substrate resin (polyester, acryl, nylon), yielding conductive resin compositions. The surface electrical resistivity values for these conductive resin compositions were then measured. These results are shown, together with the production conditions, in Table 14 through Table 20. In contrast, as a comparative standard, the result of measuring the same value for a conductive resin composition formed by mixing ITO powder into a substrate resin is also shown in Table 14 through Table 20. As is evident from Table 14 through Table 20, the conductive resin compositions of the present invention display markedly superior conductivity to a conductive resin composition using a conventional metal oxide.

EXAMPLE 24

Using the substrate fibers shown in Table 21, metal coatings were provided and metal coated short fibers were produced in accordance with the conditions shown. Each of these metal coated short fibers were mixed with and dispersed in a substrate resin (polyethylene, polycarbonate) and then hot pressed to form a film. The surface electrical resistance for each film was then measured. Furthermore, the presence of metal separation or tearing was also investigated. The results are shown in Table 21.

As described above, a metal coated fiber of the present invention has excellent coating strength, and specifically has a standardized strength, as measured in a coating adhesive strength test, of at least grade 4. Furthermore, the fiber displays a small contraction ratio and excellent durability relative to external forces, even on heating. Accordingly, a metal coated fiber of the present invention can be used in applications which have conventionally been unavailable due to unsatisfactory adhesion or durability of the metal coating. In addition, a metal coated fiber of the present invention is produced by conducting a heating and gradual cooling treatment at a specific temperature following provision of the metal coating, and can consequently be produced with ease.

Furthermore, a metal coated fiber of the present invention has excellent corrosion resistance together with a high coating strength. Specifically, the fiber displays excellent chlorine corrosion resistance in a chlorine bleaching test. In addition, a standardized strength of at least grade 4 can be achieved in a coating adhesive strength test. Furthermore, the fiber displays a small contraction ratio and excellent durability relative to external forces, even on heating. Accordingly, a metal coated fiber of the present invention can be used in applications which have conventionally been unavailable due to unsatisfactory adhesion or durability of the metal coating.

In addition, a conductive resin composition of the present invention uses short fibers with a metal coating of excellent coating strength, with these fibers kneaded into a substrate resin, and consequently displays excellent conductivity, and moreover this high level of conductivity can be maintained with good stability over an extended period. Furthermore, because the short fibers become mutually intertwined and maintain contact within the resin, excellent conductivity can be achieved with a comparatively small quantity of fiber. Moreover, these metal coated short fibers have a stable metal coating and a small quantity of metal, and are also lightweight, while still displaying conductivity with excellent long term durability. In addition, separation of the metal coating during kneading of the metal coated short fibers into the substrate resin can be prevented, enabling a high quality product to be produced and the production costs to be suppressed. In particular, compositions in which a high strength nylon based fiber, a polyphenylene sulfide based fiber or a polycarbonate based fiber is used as the substrate fiber display excellent heat resistance and are consequently suitable for use under high temperature conditions. Furthermore, regardless of whether these metal coatings are one layer or two layers, conductivity in which the resistivity is no more than $9 \times 10^5$ Ω can be achieved.

TABLE 1

| No. | Fiber (diameter) | Metal Coating | Heating and Cooling Treatment | Adhesive Strength | Electrical Resistance |
|---|---|---|---|---|---|
| A1 | PET (150d) | Ni: 20% Ag: 20% Au: 20% | Heated to 180° C. and maintained for 120 minutes, removed flow furnace and allowed to cool naturally | Grade 5 Grade 5 Grade 4 | 5.1 0.9 1.5 |
| A2 | Nylon (150d) | Ni: 20% Ag: 20% Au: 20% | Heated to 140° C. and maintained for 5 minutes, removed from furnace and allowed to cool naturally | Grade 4 Grade 4 Grade 4 | 3.5 1.5 2.2 |
| A3 | Acrylic (150d) | Ni: 20% Ag: 20% Au: 20% | Heated to 160° C. and maintained for 30 minutes, removed from furnace and allowed to cool naturally | Grade 5 Grade 5 Grade 4 | 3.2 1.4 2.1 |
| B1 | PET (150d) | Ni: 20% Ag: 20% Au: 20% | No heat treatment | Grade 3 Grade 3 Grade 3 | >1M |
| B2 | Nylon (150d) | Ni: 20% Ag: 20% Au: 20% | No heat treatment | Grade 2 Grade 3 Grade 3 | >1M |
| B3 | Acrylic (150d) | Ni: 20% Ag: 20% Au: 20% | No heat treatment | Grade 2 Grade 2 Grade 3 | >1M |

Note:
A1 through A3 are the examples, and B1 through B3 are the comparative examples. d in the fiber column represents deniers. % in the metal coating column refers to % by weight, and the electrical resistance represents the value (Ω/cm · denier) obtained after the adhesion test.

TABLE 2

| No. | Fiber | Metal Coating | Heat treatment | Cooling treatment | Electrical Resistance (Ω/cm · denier) | | Contraction Ratio |
|---|---|---|---|---|---|---|---|
| | | | | | Initial Value | After Friction | |
| A20 | Acrylic (150d) | Ni 20 wt % | Heated to 150° C. in 30 minutes and maintained for 1 hour | Cooled to room temperature in 150 minutes | 15 Ω | 1000 Ω after 150 repetitions | +0.3% |
| B21 | | | | Cooled to room temperature in 30 minutes | 15 Ω | 1 MΩ after 50 repetitions | — |
| B22 | | | | No heating or cooling treatment | 15 Ω | 1 MΩ after 3 repetitions | −3.2% |
| B23 | | | No metal coating, no heat treatment | | | | −12% |
| A30 | Polyester (150d) | Ag 20 wt % | heated to 200° C. in 60 minutes and maintained for 1 hour | Cooled to room temperature in 300 minutes | 1 Ω | 25 Ω after 300 repetitions | +0.3% |
| B31 | | | | Cooled to room temperature in 30 minutes | 1 Ω | 180 Ω after 100 repetitions | — |
| B32 | | | | No heating or cooling treatment | 1 Ω | 1 MΩ after 5 repetitions | −3.3% |
| B33 | | | No metal coating, no heat treatment | | | | −11% |

Note:
The contraction ratio is a value measured under a temperature of 200° while applying a load of 1.5 g to a 150 denier fiber.
− indicates contraction, and + indicates expansion.

TABLE 3

| No. | Fiber | Metal Coating | Heating Temperature | Heating Hold Time | Coating Method | Adhesive Strength | Initial Electrical Resistance | Electrical Resistance after Friction | Contraction Ratio |
|---|---|---|---|---|---|---|---|---|---|
| A1 | High Strength Nylon (150d) | Ni 20% | 200 | 60 | natural cooling | Grade 5 | 80 | 78 | 0.50% |
|  |  | Ni 20% | 400 | 120 | natural cooling | Grade 5 | 83 | 80 | 0.35% |
|  |  | Ag 20% | 200 | 60 | natural cooling | Grade 5 | 72 | 73 | 0.56% |
|  |  | Ag 20% | 500 | 120 | water cooling | Grade 4 | 80 | 82 | 0.67% |
|  |  | Au 20% | 200 | 60 | natural cooling | Grade 4 | 45 | 45 | 0.35% |
|  |  | Au 20% | 400 | 120 | natural cooling | Grade 5 | 60 | 65 | 0.53% |
|  |  | Cu 20% | 200 | 60 | natural cooling | Grade 5 | 73 | 75 | 0.70% |
|  |  | Cu 20% | 500 | 120 | water cooling | Grade 5 | 88 | 80 | 0.68% |
| A2 | Polyphenylene sulfide (150d) | Ni 20% | 200 | 60 | natural cooling | Grade 4 | 80 | 78 | 0.56% |
|  |  | Ni 20% | 280 | 120 | natural cooling | Grade 4 | 82 | 80 | 0.34% |
|  |  | Ag 20% | 200 | 60 | natural cooling | Grade 5 | 72 | 73 | 0.65% |
|  |  | Ag 20% | 280 | 120 | water cooling | Grade 4 | 71 | 73 | 0.78% |
|  |  | Au 20% | 200 | 60 | natural cooling | Grade 4 | 45 | 48 | 0.72% |
|  |  | Au 20% | 300 | 120 | natural cooling | Grade 5 | 65 | 68 | 0.70% |
|  |  | Cu 20% | 200 | 60 | natural cooling | Grade 5 | 71 | 72 | 0.71% |
|  |  | Cu 20% | 300 | 120 | water cooling | Grade 4 | 85 | 88 | 0.90% |
| A3 | Polycarbonate (150d) | Ni 20% | 200 | 60 | natural cooling | Grade 4 | 76 | 78 | 0.62% |
|  |  | Ni 20% | 280 | 120 | natural cooling | Grade 5 | 73 | 70 | 0.62% |
|  |  | Ag 20% | 200 | 60 | natural cooling | Grade 5 | 73 | 77 | 0.63% |
|  |  | Ag 20% | 300 | 120 | water cooling | Grade 4 | 83 | 83 | 0.78% |
|  |  | Au 20% | 200 | 60 | natural cooling | Grade 5 | 62 | 65 | 0.35% |
|  |  | Au 20% | 280 | 120 | natural cooling | Grade 5 | 61 | 63 | 0.32% |
|  |  | Cu 20% | 200 | 60 | natural cooling | Grade 5 | 78 | 79 | 0.37% |
|  |  | Cu 20% | 300 | 120 | water cooling | Grade 4 | 90 | 92 | 0.70% |
| A4 | Aramid Fiber | Ni 20% | 200 | 60 | natural cooling | Grade 4 | 76 | 78 | 0.62% |
|  |  | Ni 20% | 280 | 120 | natural cooling | Grade 5 | 73 | 70 | 0.62% |
|  |  | Ag 20% | 200 | 60 | natural cooling | Grade 5 | 73 | 77 | 0.63% |
|  |  | Ag 20% | 300 | 120 | water cooling | Grade 4 | 83 | 83 | 0.78% |
| B1 | High Strength Nylon (150d) | Ni 20% | n/a | n/a | n/a | Grade 4 | 100 | >1M | −1.80% |
|  |  | Ag 20% | n/a | n/a | n/a | Grade 4 | 90 | >1M | −2.00% |
|  |  | Au 20% | n/a | n/a | n/a | Grade 3 | 95 | >1M | −1.80% |
|  |  | Cu 20% | n/a | n/a | n/a | Grade 3 | 100 | >1M | −2.30% |
| B2 | Polyphenylene sulfide (150d) | Ni 20% | n/a | n/a | n/a | Grade 3 | 100 | >1M | −2.10% |
|  |  | Ag 20% | n/a | n/a | n/a | Grade 3 | 89 | >1M | −2.20% |
|  |  | Au 20% | n/a | n/a | n/a | Grade 2 | 95 | >1M | −2.30% |
|  |  | Cu 20% | n/a | n/a | n/a | Grade 3 | 98 | >1M | −2.10% |
| B3 | Polycarbonate (150d) | Ni 20% | n/a | n/a | n/a | Grade 3 | 103 | >1M | −2.20% |
|  |  | Ag 20% | n/a | n/a | n/a | Grade 3 | 92 | >1M | −2.30% |
|  |  | Au 20% | n/a | n/a | n/a | Grade 3 | 98 | >1M | −2.10% |
|  |  | Cu 20% | n/a | n/a | n/a | Grade 3 | 102 | >1M | −2.20% |

The contraction ratio is a value measured under a temperature of 200° while applying a load of 1.5 g to a 150 denier fiber. − indicates contraction, and + indicates expansion. The electrical resistance represents the value (Ω/cm · denier) obtained after die adhesion test, and the value after friction is as measured after 100 friction repetitions. Natural cooling refers cooling to room temperature over approximately 30 to 150 minutes, and water cooling is the same as air cooling, but refers to rapid cooling over approximately 1 second to 5 minutes.

TABLE 4 (a)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| A1 | PET | Ag 20% | Au 1% | yes | 2 | Grade 4 | 1.2 | 55 | Δ | Δ |
| A2 | (150d) |  | Au 4% | yes | 10 | Grade 4 | 12 | 52 | ○ | ○ |
| A3 |  |  | Au 10% | yes | 25 | Grade 3 | 1.4 | 50 | ○ | ○ |
| A4 |  |  | Au 40% | yes | 100 | Grade 4 | 1.7 | 4 | ○ | ○ |
| A5 |  |  | Os 20% | yes | 50 | Grade 4 | 1.6 | 52 | ○ | ○ |
| A6 |  |  | Pt 20% | yes | 50 | Grade 4 | 1.8 | 51 | ○ | ○ |
| A7 |  |  | Pd 20% | yes | 50 | Grade 4 | 1.5 | 55 | ○ | ○ |
| A8 |  |  | Au 3.5% | no | 9 | Grade 1 | >1M | 50 | ○ | x |
| A9 |  |  | Heat treated silver coated fiber product (Ag thickness 100 nm) |  |  | Grade 4 | 1.2 | 51 | x | x |
| A10 |  |  | Rustproofed heat treated silver coated fiber |  |  | Grade 4 | 1.7 | 51 | Δ | Δ |
| A11 |  | Ni 20% | Au 3.5% | no | 9 | Grade 1 | >1M | 50 | ○ | x |
| A12 |  |  | Au 16% | yes | 30 | Grade 2 | 4.6 | 49 | ○ | Δ |
| A13 |  |  | Au 22% | yes | 55 | Grade 4 | 4.6 | 45 | ○ | Δ |
| A14 |  |  | Os 24% | yes | 60 | Grade 4 | 4.6 | 52 | ○ | Δ |
| A15 |  |  | Pt 22% | yes | 60 | Grade 4 | 4.5 | 51 | ○ | Δ |
| A16 |  |  | Pd 23% | yes | 60 | Grade 4 | 5.5 | 55 | ○ | Δ |
| A17 |  |  | Ag 23% (Comparative) | yes | 60 | Grade 3 | 3.1 | 55 | x | x |

TABLE 4 (a)-continued

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| A18 | | | Ni 16% (Comparative) | yes | 15 | Grade 3 | 5.1 | 46 | x | x |
| A19 | | Cu 20% | Au 3.5% | no | 9 | Grade 1 | >1M | 42 | ○ | x |
| A20 | | | Au 16% | yes | 30 | Grade 2 | 3.6 | 40 | ○ | ○ |
| A21 | | | Au 22% | yes | 55 | Grade 4 | 3.8 | 42 | ○ | ○ |
| A22 | | | Os 24% | yes | 60 | Grade 4 | 3.2 | 41 | ○ | ○ |
| | | | Pt 22% | yes | 60 | Grade 4 | 3.3 | 46 | ○ | ○ |
| | | | Pd 23% | yes | 60 | Grade 4 | 3.7 | 45 | ○ | ○ |
| A25 | | | Ag 23% (Comparative) | yes | 60 | Grade 4 | 2.9 | 44 | x | x |
| A26 | | | Cu 16% (Comparative) | yes | 38 | Grade 4 | 3.5 | 44 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred, in the evaluation column, ○ means excellent, Δ means acceptable, and x means unacceptable. The electrical resistance valves are for a 150 denier fiber bundle.

TABLE 4 (b)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| B1 | Nylon | Ag 20% | Au 1% | yes | 2 | Grade 4 | 1.2 | 55 | Δ | Δ |
| B2 | (150d) | | Au 4% | yes | 10 | Grade 4 | 1.3 | 52 | ○ | ○ |
| B3 | | | Au 10% | yes | 25 | Grade 4 | 1.4 | 50 | ○ | ○ |
| B4 | | | Au 40% | yes | 100 | Grade 3 | 1.7 | 40 | ○ | ○ |
| B5 | | | Os 20% | yes | 50 | Grade 4 | 1.6 | 52 | ○ | ○ |
| B6 | | | Pt 20% | yes | 50 | Grade 4 | 1.8 | 51 | ○ | ○ |
| B7 | | | Pd 20% | yes | 50 | Grade 4 | 1.5 | 55 | ○ | ○ |
| B8 | | | Au 16% | no | 38 | Grade 2 | >1M | 50 | ○ | x |
| B9 | | | Silver Coated Fiber Heat Treated Product (Ag thickness 100 nm) | | | Grade 4 | 1.2 | 51 | x | x |
| B10 | | | Rustproofed heat treated silver coated fiber | | | Grade 4 | 1.7 | 51 | Δ | Δ |
| B11 | | Ni 20% | Au 3.5% | yes | 9 | Grade 4 | 4.6 | 55 | ○ | Δ |
| B12 | | | Au 16% | no | 30 | Grade 2 | >1M | 50 | ○ | x |
| B13 | | | Au 22% | yes | 55 | Grade 3 | 4.2 | 45 | ○ | Δ |
| B14 | | | Os 24% | yes | 60 | Grade 3 | 4.1 | 52 | ○ | Δ |
| B15 | | | Pt 22% | yes | 60 | Grade 4 | 4.8 | 52 | ○ | Δ |
| B16 | | | Pd 23% | yes | 60 | Grade 3 | 4.7 | 51 | ○ | Δ |
| B17 | | | Ag 23% (Comparative) | yes | 60 | Grade 3 | 4.8 | 55 | x | x |
| B18 | | | Ni 16% (Comparative) | yes | 38 | Grade 4 | 5.5 | 55 | x | x |
| B19 | | Cu 20% | Au 3.5% | no | 9 | Grade 1 | >1M | 42 | ○ | x |
| B20 | | | Au 16% | yes | 30 | Grade 2 | 3.6 | 40 | ○ | ○ |
| B21 | | | Au 22% | yes | 55 | Grade 4 | 3.8 | 42 | ○ | ○ |
| B22 | | | Os 24% | yes | 60 | Grade 4 | 3.2 | 41 | ○ | ○ |
| B23 | | | Pt 22% | yes | 60 | Grade 4 | 3.3 | 46 | ○ | ○ |
| B24 | | | Pd 23% | yes | 60 | Grade 4 | 3.7 | 45 | ○ | ○ |
| B25 | | | Ag 23% (Comparative) | yes | 60 | Grade 4 | 2.9 | 44 | x | x |
| B26 | | | Cu 16% (Comparative) | Yes | 38 | Grade 4 | 3.5 | 44 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 4 (c)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| C1 | Acrylic | Ag 20% | Au 1% | yes | 2 | Grade 4 | 1.2 | 55 | Δ | Δ |
| C2 | (150d) | | Au 4% | yes | 10 | Grade 4 | 1.3 | 52 | ○ | ○ |
| C3 | | | Au 10% | yes | 25 | Grade 4 | 1.4 | 50 | ○ | ○ |
| C4 | | | Au 40% | yes | 100 | Grade 3 | 1.7 | 45 | ○ | ○ |

TABLE 4 (c)-continued

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| C5 | | | Os 20% | yes | 50 | Grade 4 | 1.6 | 52 | ○ | ○ |
| C6 | | | Pt 20% | yes | 50 | Grade 4 | 1.8 | 51 | ○ | ○ |
| C7 | | | Pd 20% | yes | 50 | Grade 4 | 1.5 | 55 | ○ | ○ |
| C8 | | | Au 16% | no | 38 | Grade 3 | >1M | 50 | ○ | x |
| C9 | | | Silver Coated Fiber Heat Treated Product (Ag thickness 100 nm) | | | Grade 4 | 1.2 | 51 | x | x |
| C10 | | | Rustproofed heat treated silver coated fiber | | | Grade 4 | 1.7 | 51 | Δ | Δ |
| C11 | | Ni 20% | Au 3.5% | yes | 9 | Grade 4 | 4.4 | 55 | ○ | Δ |
| C12 | | | Au 16% | no | 30 | Grade 2 | >1M | 50 | ○ | x |
| C13 | | | Au 22% | yes | 55 | Grade 3 | 4.3 | 45 | ○ | Δ |
| C14 | | | Os 24% | yes | 60 | Grade 3 | 4.1 | 52 | ○ | Δ |
| C15 | | | Pt 22% | yes | 60 | Grade 4 | 4.9 | 52 | ○ | Δ |
| C16 | | | Pd 23% | yes | 60 | Grade 4 | 4.7 | 51 | ○ | Δ |
| C17 | | | Ag 23% (Comparative) | yes | 60 | Grade 3 | 3.8 | 55 | x | x |
| C18 | | | Ni 16% (Comparative) | yes | 38 | Grade 4 | 5.5 | 55 | x | x |
| C19 | | Cu 20% | Au 3.5% | yes | 9 | Grade 4 | 3.4 | 40 | ○ | ○ |
| C20 | | | Au 16% | no | 30 | Grade 2 | >1M | 37 | ○ | x |
| C21 | | | Au 22% | yes | 55 | Grade 3 | 3.7 | 34 | ○ | ○ |
| C22 | | | Os 24% | yes | 60 | Grade 4 | 3.7 | 40 | ○ | ○ |
| C23 | | | Pt 22% | yes | 60 | Grade 4 | 3.6 | 42 | ○ | ○ |
| C24 | | | Pd 23% | yes | 60 | Grade 4 | 3.7 | 44 | ○ | ○ |
| C25 | | | Ag 23% (Comparative) | yes | 60 | Grade 3 | 2.9 | 40 | x | x |
| C26 | | | Cu 16% (Comparative) | yes | 38 | Grade 4 | 3.7 | 38 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 5 (a)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| A1 | PET | Ag 20% | Au 1% | yes | 2 | Grade 4 | 1.2 | 55 | Δ | Δ |
| A2 | (150d) | | Au 4% | yes | 10 | Grade 4 | 1.3 | 52 | ○ | ○ |
| A3 | | | Au 10% | yes | 25 | Grade 4 | 1.4 | 50 | ○ | ○ |
| A4 | | | Au 40% | yes | 100 | Grade 3 | 1.7 | 40 | ○ | ○ |
| A5 | | | Os 20% | yes | 50 | Grade 4 | 1.6 | 52 | ○ | ○ |
| A6 | | | Pt 20% | yes | 50 | Grade 4 | 1.8 | 51 | ○ | ○ |
| A7 | | | Pd 20% | yes | 50 | Grade 4 | 1.5 | 55 | ○ | ○ |
| A8 | | | Au 16% | no | 38 | Grade 1 | >1M | 50 | ○ | x |
| A9 | | | Silver Coated Fiber Heat Treated Product (Ag thickness 100 nm) | | | Grade 4 | 1.2 | 51 | x | x |
| A10 | | | Rustproofed heat treated silver coated fiber | | | Grade 4 | 1.7 | 51 | Δ | Δ |
| A11 | | Ni 20% | Au 3.5% | yes | 9 | Grade 2 | 4.4 | 52 | ○ | Δ |
| A12 | | | Au 16% | no | 30 | Grade 5 | >1M | 48 | ○ | x |
| A13 | | | Au 22% | yes | 55 | Grade 4 | 4.8 | 40 | ○ | Δ |
| A14 | | | Os 24% | yes | 60 | Grade 5 | 4.9 | 50 | ○ | Δ |
| A15 | | | Pt 22% | yes | 60 | Grade 4 | 4.6 | 52 | ○ | Δ |
| A16 | | | Pd 23% | yes | 60 | Grade 5 | 4.5 | 50 | ○ | Δ |
| A17 | | | Ag 23% (Comparative) | yes | 60 | Grade 5 | 3.5 | 53 | x | x |
| A18 | | | Ni 16% (Comparative) | yes | 38 | Grade 5 | 5.1 | 52 | x | x |
| A19 | | Cu 20% | Au 3.5% | yes | 9 | Grade 5 | 3.1 | 45 | ○ | ○ |
| A20 | | | Au 16% | no | 30 | Grade 5 | >1M | 44 | ○ | x |
| A21 | | | Au 22% | yes | 55 | Grade 4 | 3.6 | 42 | ○ | ○ |
| A22 | | | Os 24% | yes | 60 | Grade 5 | 3.4 | 47 | ○ | ○ |
| A23 | | | Pt 22% | yes | 60 | Grade 4 | 3.2 | 47 | ○ | ○ |
| A24 | | | Pd 23% | yes | 60 | Grade 5 | 3.3 | 46 | ○ | ○ |
| A25 | | | Ag 23% (Comparative) | yes | 60 | Grade 5 | 2.7 | 47 | x | x |

TABLE 5 (a)-continued

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| A26 | | | Cu 16% (Comparative) | yes | 38 | Grade 4 | 3.5 | 44 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 5 (b)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| B1 | Nylon (150d) | Ag 20% | Au 1% | yes | 2 | Grade 4 | 1.2 | 55 | Δ | Δ |
| B2 | | | Au 4% | yes | 10 | Grade 4 | 1.3 | 52 | ○ | ○ |
| B3 | | | Au 10% | yes | 25 | Grade 4 | 1.4 | 50 | ○ | ○ |
| B4 | | | Au 40% | yes | 100 | Grade 3 | 1.7 | 40 | ○ | ○ |
| B5 | | | Os 20% | yes | 50 | Grade 4 | 1.6 | 52 | ○ | ○ |
| B6 | | | Pt 20% | yes | 50 | Grade 4 | 1.8 | 51 | ○ | ○ |
| B7 | | | Pd 20% | yes | 50 | Grade 4 | 1.9 | 50 | ○ | ○ |
| B8 | | | Au 16% | no | 38 | Grade 1 | >1M | 48 | ○ | x |
| B9 | | | Silver Coated Fiber Heat Treated Product (Ag thickness 100 nm) | | | Grade 4 | 1.2 | 51 | x | x |
| B10 | | | Rustproofed heat treated silver coated fiber | | | Grade 4 | 1.7 | 51 | Δ | Δ |
| B11 | | Ni 20% | Au 3.5% | yes | 9 | Grade 4 | 4.6 | 50 | ○ | Δ |
| B12 | | | Au 16% | no | 30 | Grade 2 | >1M | 47 | ○ | x |
| B13 | | | Au 22% | yes | 55 | Grade 3 | 4.2 | 38 | ○ | Δ |
| B14 | | | Os 24% | yes | 60 | Grade 3 | 4.1 | 50 | ○ | Δ |
| B15 | | | Pt 22% | yes | 60 | Grade 4 | 4.8 | 51 | ○ | Δ |
| B16 | | | Pd 23% | yes | 60 | Grade 3 | 4.7 | 50 | ○ | Δ |
| B17 | | | Ag 23% (Comparative) | yes | 60 | Grade 4 | 4.8 | 52 | x | x |
| B18 | | | Ni 16% (Comparative) | yes | 38 | Grade 4 | 5.5 | 51 | x | x |
| B19 | | Cu 20% | Au 3.5% | no | 9 | Grade 4 | 3.3 | 42 | ○ | ○ |
| B20 | | | Au 16% | yes | 30 | Grade 2 | >1M | 43 | ○ | x |
| B21 | | | Au 22% | yes | 55 | Grade 4 | 3.8 | 42 | ○ | ○ |
| B22 | | | Os 24% | yes | 60 | Grade 3 | 3.6 | 40 | ○ | ○ |
| B23 | | | Pt 22% | yes | 60 | Grade 4 | 3.5 | 44 | ○ | ○ |
| B24 | | | Pd 23% | yes | 60 | Grade 3 | 3.7 | 42 | ○ | ○ |
| B25 | | | Ag 23% (Comparative) | yes | 60 | Grade 4 | 2.9 | 44 | x | x |
| B26 | | | Cu 16% (Comparative) | yes | 38 | Grade 3 | 3.7 | 40 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 5 (c)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| C1 | Acrylic (150d) | Ag 20% | Au 1% | yes | 2 | Grade 4 | 1.2 | 55 | Δ | Δ |
| C2 | | | Au 4% | yes | 10 | Grade 4 | 1.3 | 52 | ○ | ○ |
| C3 | | | Au 10% | yes | 25 | Grade 4 | 1.4 | 50 | ○ | ○ |
| C4 | | | Au 40% | yes | 100 | Grade 3 | 1.8 | 38 | ○ | ○ |
| C5 | | | Os 20% | yes | 50 | Grade 4 | 1.9 | 50 | ○ | ○ |
| C6 | | | Pt 20% | yes | 50 | Grade 4 | 1.8 | 51 | ○ | ○ |
| C7 | | | Pd 20% | yes | 50 | Grade 4 | 1.8 | 48 | ○ | ○ |
| C8 | | | Au 16% | no | 38 | Grade 1 | >1M | 48 | ○ | x |
| C9 | | | Silver Coated Fiber Heat Treated Product (Ag thickness 100 nm) | | | Grade 4 | 1.2 | 51 | x | x |
| C10 | | | Rustproofed heat treated silver coated fiber | | | Grade 4 | 1.7 | 51 | Δ | Δ |
| C11 | | Ni 20% | Au 3.5% | yes | 9 | Grade 5 | 4.4 | 50 | ○ | Δ |
| C12 | | | Au 16% | no | 30 | Grade 2 | >1M | 48 | ○ | x |

TABLE 5 (c)-continued

| No. | Substrate fiber | First layer metal | Second layer metal mass % in fiber | Crystallization Heating | Thickness of Second Layer Metal (nm) | Coating Strength of Second Layer | Electrical Resistance ($\Omega/cm^3$) | Brightness | Presence of Corrosion | Product Evaluation |
|---|---|---|---|---|---|---|---|---|---|---|
| C13 | | | Au 22% | yes | 55 | Grade 5 | 4.3 | 36 | o | Δ |
| C14 | | | Os 24% | yes | 60 | Grade 4 | 5.1 | 50 | o | Δ |
| C15 | | | Pt 22% | yes | 60 | Grade 5 | 4.9 | 51 | o | Δ |
| C16 | | | Pd 23% | yes | 60 | Grade 4 | 4.7 | 48 | o | Δ |
| C17 | | | Ag 23% (Comparative) | yes | 60 | Grade 5 | 4.8 | 52 | x | x |
| C18 | | | Ni 16% (Comparative) | yes | 38 | Grade 5 | 5.5 | 51 | x | x |
| C19 | | Cu 20% | Au 3.5% | yes | 9 | Grade 5 | 3.4 | 40 | o | o |
| C20 | | | Au 16% | no | 30 | Grade 2 | >1M | 42 | o | x |
| C21 | | | Au 22% | yes | 55 | Grade 5 | 3.7 | 42 | o | o |
| C22 | | | Os 24% | yes | 60 | Grade 4 | 3.7 | 44 | o | o |
| C23 | | | Pt 22% | yes | 60 | Grade 5 | 3.6 | 44 | o | o |
| C24 | | | Pd 23% | yes | 60 | Grade 4 | 3.7 | 45 | o | o |
| C25 | | | Ag 23% (Comparative) | yes | 60 | Grade 5 | 2.8 | 44 | x | x |
| C26 | | | Cu 16% (Comparative) | yes | 38 | Grade 5 | 3.7 | 42 | x | x |

The first layer and second layer metal columns show the weight % in the fiber, the brightness column shows the L value, and in the presence of corrosion column, o indicates almost no visible variation. When the value is Δ, some slight bubbling was confirmed. For x, considerable bubbling occurred. In the evaluation column, o means excellent, Δ means acceptable, and x means unacceptable. The electrical resistance values are for a 150 denier fiber bundle.

TABLE 6 (a)

| No. | Substrate fiber | First layer metal | Second layer metal mass % in fiber | Crystallization Heating | Thickness of Second Layer Metal (nm) | Coating Strength of Second Layer | Electrical Resistance ($\Omega/cm^3$) | Brightness | Presence of Corrosion | Product Evaluation |
|---|---|---|---|---|---|---|---|---|---|---|
| A1 | PET | Ag 20% | Au 1% | yes | 2 | Grade 4 | 1.2 | 55 | Δ | Δ |
| A2 | (150d) | | Au 4% | yes | 10 | Grade 4 | 1.3 | 52 | o | o |
| A3 | | | Au 10% | yes | 25 | Grade 4 | 1.4 | 50 | o | o |
| A4 | | | Au 40% | yes | 100 | Grade 3 | 1.8 | 40 | o | o |
| A5 | | | Os 20% | yes | 50 | Grade 4 | 1.6 | 48 | o | o |
| A6 | | | Pt 20% | yes | 50 | Grade 4 | 1.8 | 50 | o | o |
| A7 | | | Pd 20% | yes | 50 | Grade 4 | 1.5 | 53 | o | o |
| A8 | | | Au 16% | no | 38 | Grade 1 | >1M | 47 | o | x |
| A9 | | | Silver Coated Fiber Heat Treated Product (Ag thickness 100 nm) | | | Grade 4 | 1.2 | 51 | x | x |
| A10 | | | Rustproofed heat treated silver coated fiber | | | Grade 4 | 1.7 | 51 | Δ | Δ |
| A11 | | Ni 20% | Au 3.5% | no | 9 | Grade 2 | >1M | 48 | o | x |
| A12 | | | Au 16% | yes | 30 | Grade 4 | 4.1 | 40 | o | Δ |
| A13 | | | Au 22% | yes | 55 | Grade 4 | 4.9 | 50 | o | Δ |
| A14 | | | Os 24% | yes | 60 | Grade 4 | 4.6 | 52 | o | Δ |
| A15 | | | Pt 22% | yes | 60 | Grade 4 | 4.5 | 50 | o | Δ |
| A16 | | | Pd 23% | yes | 60 | Grade 3 | 5.5 | 53 | o | Δ |
| A17 | | | Ag 23% (Comparative) | yes | 60 | Grade 3 | 3.9 | 52 | x | x |
| A18 | | | Ni 16% (Comparative) | yes | 38 | Grade 4 | 4.1 | 44 | x | x |
| A19 | | Cu 20% | Au 3.5% | yes | 9 | Grade 5 | >1M | 38 | o | x |
| A20 | | | Au 16% | no | 30 | Grade 5 | 3.6 | 36 | o | o |
| A21 | | | Au 22% | yes | 55 | Grade 4 | 3.4 | 33 | o | o |
| A22 | | | Os 24% | yes | 60 | Grade 5 | 3.2 | 42 | o | o |
| A23 | | | Pt 22% | yes | 60 | Grade 4 | 3.3 | 44 | o | o |
| A24 | | | Pd 23% | yes | 60 | Grade 5 | 3.7 | 42 | o | o |
| A25 | | | Ag 23% (comparative) | yes | 60 | Grade 5 | 2.5 | 44 | x | x |
| A26 | | | Cu 16% (Comparative) | yes | 38 | Grade 4 | 3.5 | 38 | x | x |

The first layer and second layer metal columns show the weight % in the fiber, the brightness column shows the L value, and in the presence of corrosion column, o indicates almost no visible variation. When the value is Δ, some slight bubbling was confirmed. For x, considerable bubbling occurred. In the evaluation column, o means excellent, Δ means acceptable, and x means unacceptable. The electrical resistance values are for a 150 denier fiber bundle.

TABLE 6 (b)

| No. | Substrate fiber | First layer metal | Second layer metal mass % in fiber | Crystallization Heating | Thickness of Second Layer Metal (nm) | Coating Strength of Second Layer | Electrical Resistance (Ω/cm²) | Brightness | Presence of Corrosion | Product Evaluation |
|---|---|---|---|---|---|---|---|---|---|---|
| B1 | Nylon | Ag 20% | Au 1% | yes | 2 | Grade 4 | 1.2 | 55 | Δ | Δ |
| B2 | (150d) | | Au 4% | yes | 10 | Grade 4 | 1.3 | 52 | ○ | ○ |
| B3 | | | Au 10% | yes | 25 | Grade 4 | 1.4 | 50 | ○ | ○ |
| B4 | | | Au 40% | yes | 100 | Grade 3 | 1.7 | 38 | ○ | Δ |
| B5 | | | Os 20% | yes | 50 | Grade 4 | 1.8 | 50 | ○ | Δ |
| B6 | | | Pt 20% | yes | 50 | Grade 4 | 1.8 | 51 | ○ | ○ |
| B7 | | | Pd 20% | yes | 50 | Grade 4 | 1.9 | 50 | ○ | Δ |
| B8 | | | Au 16% | no | 38 | Grade 1 | >1M | 48 | ○ | x |
| B9 | | | Silver Coated Fiber Heat Treated Product (Ag thickness 100 mm) | | | Grade 4 | 1.2 | 51 | x | x |
| B10 | | | Rustproofed heat treated silver coated fiber | | | Grade 4 | 1.7 | 51 | Δ | Δ |
| B11 | | Ni 20% | Au 3.5% | yes | 9 | Grade 4 | 4.6 | 50 | ○ | Δ |
| B12 | | | Au 16% | no | 30 | Grade 2 | >1M | 47 | ○ | Δ |
| B13 | | | Au 22% | yes | 55 | Grade 3 | 4.2 | 38 | ○ | Δ |
| B14 | | | Os 24% | yes | 60 | Grade 3 | 4.1 | 50 | ○ | Δ |
| B15 | | | Pt 22% | yes | 60 | Grade 4 | 4.8 | 51 | ○ | Δ |
| B16 | | | Pd 23% | yes | 60 | Grade 3 | 4.7 | 50 | ○ | Δ |
| B17 | | | Ag 23% (Comparative) | yes | 60 | Grade 3 | 4.8 | 52 | x | x |
| B18 | | | Ni 16% (Comparative) | yes | 38 | Grade 4 | 5.5 | 51 | x | x |
| B19 | | Cu 20% | Au 3.5% | no | 9 | Grade 4 | 3.3 | 42 | ○ | ○ |
| B20 | | | Au 16% | yes | 30 | Grade 2 | >1M | 40 | ○ | x |
| B21 | | | Au 22% | yes | 55 | Grade 3 | 3.8 | 38 | ○ | ○ |
| B22 | | | Os 24% | yes | 60 | Grade 3 | 3.6 | 42 | ○ | ○ |
| B23 | | | Pt 22% | yes | 60 | Grade 4 | 3.5 | 42 | ○ | ○ |
| B24 | | | Pd 23% | yes | 60 | Grade 3 | 3.7 | 40 | ○ | ○ |
| B25 | | | Ag 23% (Comparative) | yes | 60 | Grade 4 | 2.9 | 44 | x | x |
| B26 | | | Cu 16% (Comparative) | yes | 38 | Grade 3 | 3.7 | 38 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 6 (c)

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| C1 | Acrylic | Ag 20% | Au 1% | yes | 2 | Grade 4 | 1.2 | 52 | Δ | Δ |
| C2 | (150d) | | Au 4% | yes | 10 | Grade 4 | 1.3 | 51 | ○ | ○ |
| C3 | | | Au 10% | yes | 25 | Grade 4 | 1.4 | 50 | ○ | ○ |
| C4 | | | Au 40% | yes | 100 | Grade 3 | 1.7 | 38 | ○ | ○ |
| C5 | | | Os 20% | yes | 50 | Grade 4 | 2.1 | 50 | ○ | ○ |
| C6 | | | Pt 20% | yes | 50 | Grade 4 | 1.8 | 51 | ○ | ○ |
| C7 | | | Pd 20% | yes | 50 | Grade 4 | 1 | 48 | ○ | ○ |
| C8 | | | Au 16% | no | 38 | Grade 1 | >1M | 48 | ○ | x |
| C9 | | | Silver Coated Fiber Heat Treated Product (Ag thickness 100 nm) | | | Grade 4 | 1.2 | 51 | x | x |
| C10 | | | Rustproofed heat treated silver coated fiber | | | Grade 4 | 1.7 | 51 | Δ | Δ |
| C11 | | Ni 20% | Au 3.5% | yes | 9 | Grade 4 | 4.4 | 50 | ○ | Δ |
| C12 | | | Au 16% | no | 30 | Grade 2 | >1M | 48 | ○ | x |
| C13 | | | Au 22% | yes | 55 | Grade 4 | 4.3 | 36 | ○ | Δ |
| C14 | | | Os 24% | yes | 60 | Grade 4 | 5.1 | 50 | ○ | Δ |
| C15 | | | Pt 22% | yes | 60 | Grade 4 | 4.9 | 51 | ○ | Δ |
| C16 | | | Pd 23% | yes | 60 | Grade 4 | 4.7 | 48 | ○ | Δ |
| C17 | | | Ag 23% (Comparative) | yes | 60 | Grade 3 | 4.8 | 52 | x | x |
| C18 | | | Ni 16% (Comparative) | yes | 38 | Grade 4 | 5.5 | 51 | x | x |
| C19 | | Cu 20% | Au 3.5% | yes | 9 | Grade 4 | 3.4 | 42 | ○ | ○ |
| C20 | | | Au 16% | no | 30 | Grade 2 | >1M | 40 | ○ | ○ |
| C21 | | | Au 22% | yes | 55 | Grade 3 | 3.7 | 42 | ○ | x |
| C22 | | | Os 24% | yes | 60 | Grade 4 | 3.7 | 44 | ○ | ○ |
| C23 | | | Pt 22% | yes | 60 | Grade 4 | 3.6 | 42 | ○ | ○ |
| C24 | | | Pd 23% | yes | 60 | Grade 4 | 3.7 | 42 | ○ | ○ |

TABLE 6 (c)-continued

| No. | Substrate fiber | First layer metal | Second layer metal mass % in fiber | Crystallization Heating | Thickness of Second Layer Metal (nm) | Coating Strength of Second Layer | Electrical Resistance (Ω/cm³) | Brightness | Presence of Corrosion | Product Evaluation |
|---|---|---|---|---|---|---|---|---|---|---|
| C25 | | | Ag 23% (Comparative) | yes | 60 | Grade 3 | 2.9 | 42 | x | x |
| C26 | | | Cu 16% (Comparative) | yes | 38 | Grade 4 | 3.7 | 38 | x | x |

The first layer and second layer metal columns show the weight % in the fiber, the brightness column shows the L value, and in the presence of corrosion column, ○ indicates almost no visible variation. When the value is Δ, some slight bubbling was confirmed. For x, considerable bubbling occurred. In the evaluation column, ○ means excellent, Δ means acceptable, and x means unacceptable. The electrical resistance values are for a 150 denier fiber bundle.

TABLE 7 (a)

Substrate fiber: Polyester

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Presence of Corrosion | Long Term Corrosion Characteristics | Weight Ratio | Brightness | Performance Evaluation |
| ITO mixed fiber | 30 | ○ | ○ | 140 | 46 | x |
| silver 20% (single fiber) | 40 | ○ | ○ | 100 | 50 | Δ |
| silver 20% (single fiber) | 60 | ○ | ○ | 95 | 51 | ○ |
| silver 20% (single fiber) | 80 | ○ | ○ | 96 | 50 | ○ |
| silver 20% (single fiber) | 40 | ○ | ○ | 100 | 50 | Δ |
| silver 20% (single fiber) | 60 | ○ | ○ | 95 | 51 | ○ |
| silver 20% (single fiber) | 80 | ○ | ○ | 96 | 50 | ○ |
| silver 20% (single fiber) | 40 | ○ | ○ | 100 | 48 | Δ |
| silver 20% (single fiber) | 60 | ○ | ○ | 96 | 49 | ○ |
| silver 20% (single fiber) | 80 | ○ | ○ | 98 | 50 | ○ |
| silver 20% (single fiber) | 40 | ○ | ○ | 97 | 48 | Δ |
| silver 20% (single fiber) | 60 | ○ | ○ | 96 | 49 | ○ |
| silver 20% (single fiber) | 80 | ○ | ○ | 98 | 50 | ○ |
| silver 20% (single fiber) | 40 | ○ | ○ | 99 | 52 | Δ |
| silver 20% (single fiber) | 60 | ○ | ○ | 98 | 50 | ○ |
| silver 20% (single fiber) | 80 | ○ | ○ | 97 | 51 | ○ |
| silver 20% (single fiber) | 40 | ○ | ○ | 99 | 51 | Δ |
| silver 20% (single fiber) | 60 | ○ | ○ | 98 | 51 | ○ |
| silver 20% (single fiber) | 80 | ○ | ○ | 97 | 50 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 7 (b)

Substrate fiber: Polyester

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Presence of Corrosion | Long Term Corrosion Characteristics | Weight Ratio | Brightness | Performance Evaluation |
| ITO mixed fiber | 30 | ○ | ○ | 140 | 46 | x |
| Ni 20% (single fiber) | 40 | ○ | ○ | 96 | 50 | Δ |
| Ni 20% (single fiber) | 60 | ○ | ○ | 97 | 51 | ○ |
| Ni 20% (single fiber) | 80 | ○ | ○ | 98 | 50 | ○ |
| Ni 20% (single fiber) | 40 | ○ | ○ | 96 | 49 | Δ |
| Ni 20% (single fiber) | 60 | ○ | ○ | 98 | 51 | ○ |
| Ni 20% (single fiber) | 80 | ○ | ○ | 97 | 50 | ○ |
| Ni 20% (single fiber) | 40 | ○ | ○ | 98 | 48 | Δ |
| Ni 20% (single fiber) | 60 | ○ | ○ | 96 | 48 | ○ |
| Ni 20% (single fiber) | 80 | ○ | ○ | 98 | 49 | ○ |
| Ni 20% (single fiber) | 40 | ○ | ○ | 98 | 48 | Δ |
| Ni 20% (single fiber) | 60 | ○ | ○ | 99 | 47 | ○ |
| Ni 20% (single fiber) | 80 | ○ | ○ | 96 | 49 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 96 | 51 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 95 | 51 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 7 (c)

Substrate fiber: Polyester

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |

TABLE 7 (c)-continued

Substrate fiber: Polyester

| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

| Metal Coated Short Fibers First Layer Metal type/content | Conductive Resin Composition | | | | |
|---|---|---|---|---|---|
| | Quantity of Mixed Fiber | Presence of Corrosion | Long Term Corrosion Characteristics | Weight Ratio | Brightness | Performance Evaluation |

| Metal Coated Short Fibers First Layer Metal type/content | Quantity of Mixed Fiber | Presence of Corrosion | Long Term Corrosion Characteristics | Weight Ratio | Brightness | Performance Evaluation |
|---|---|---|---|---|---|---|
| ITO mixed fiber | 30 | ○ | ○ | 140 | 46 | x |
| Cu 20% (single fiber) | 40 | ○ | ○ | 96 | 49 | Δ |
| Cu 20% (single fiber) | 60 | ○ | ○ | 97 | 49 | ○ |
| Cu 20% (single fiber) | 80 | ○ | ○ | 98 | 50 | ○ |
| Cu 20% (single fiber) | 40 | ○ | ○ | 96 | 49 | Δ |
| Cu 20% (single fiber) | 60 | ○ | ○ | 98 | 49 | ○ |
| Cu 20% (single fiber) | 80 | ○ | ○ | 97 | 48 | ○ |
| Cu 20% (single fiber) | 40 | ○ | ○ | 98 | 49 | Δ |
| Cu 20% (single fiber) | 60 | ○ | ○ | 95 | 50 | ○ |
| Cu 20% (single fiber) | 80 | ○ | ○ | 96 | 50 | ○ |
| Cu 20% (single fiber) | 40 | ○ | ○ | 95 | 50 | Δ |
| Cu 20% (single fiber) | 60 | ○ | ○ | 97 | 50 | ○ |
| Cu 20% (single fiber) | 80 | ○ | ○ | 95 | 50 | ○ |
| Cu 20% (single fiber) | 40 | ○ | ○ | 94 | 49 | Δ |
| Cu 20% (single fiber) | 60 | ○ | ○ | 96 | 49 | ○ |
| Cu 20% (single fiber) | 80 | ○ | ○ | 96 | 51 | ○ |
| Cu 20% (single fiber) | 40 | ○ | ○ | 96 | 49 | Δ |
| Cu 20% (single fiber) | 60 | ○ | ○ | 95 | 50 | ○ |
| Cu 20% (single fiber) | 80 | ○ | ○ | 94 | 50 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 8 (a)

Substrate fiber: Acryl

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |

TABLE 8 (a)-continued

Substrate fiber: Acryl

| | | | | | | |
|---|---|---|---|---|---|---|
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition ||||||
|---|---|---|---|---|---|---|
| | Quantity of Mixed Fiber | Presence of Corrosion | Long Term Corrosion Characteristics | Weight Ratio | Bright-ness | Performance Evaluation |
| ITO mixed fiber | 30 | ○ | ○ | 140 | 45 | x |
| silver 20% (single fiber) | 40 | ○ | ○ | 100 | 50 | Δ |
| silver 20% (single fiber) | 60 | ○ | ○ | 95 | 51 | ○ |
| silver 20% (single fiber) | 80 | ○ | ○ | 96 | 49 | ○ |
| silver 20% (single fiber) | 40 | ○ | ○ | 100 | 50 | Δ |
| silver 20% (single fiber) | 60 | ○ | ○ | 95 | 50 | ○ |
| silver 20% (single fiber) | 80 | ○ | ○ | 96 | 50 | ○ |
| silver 20% (single fiber) | 40 | ○ | ○ | 100 | 48 | Δ |
| silver 20% (single fiber) | 60 | ○ | ○ | 96 | 48 | ○ |
| silver 20% (single fiber) | 80 | ○ | ○ | 98 | 50 | ○ |
| silver 20% (single fiber) | 40 | ○ | ○ | 97 | 48 | Δ |
| silver 20% (single fiber) | 60 | ○ | ○ | 96 | 49 | ○ |
| silver 20% (single fiber) | 80 | ○ | ○ | 98 | 50 | ○ |
| silver 20% (single fiber) | 40 | ○ | ○ | 99 | 50 | Δ |
| silver 20% (single fiber) | 60 | ○ | ○ | 98 | 50 | ○ |
| silver 20% (single fiber) | 80 | ○ | ○ | 97 | 51 | ○ |
| silver 20% (single fiber) | 40 | ○ | ○ | 99 | 50 | Δ |
| silver 20% (single fiber) | 60 | ○ | ○ | 98 | 51 | ○ |
| silver 20% (single fiber) | 80 | ○ | ○ | 97 | 50 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 8 (b)

Substrate fiber: Acryl

| Metal Coated Short Fibers |||||||
|---|---|---|---|---|---|---|
| First Layer || Second Layer |||||
| Metal type/content | Thick-ness | Metal type/content | Thick-ness | Treatment | Method of Production | Metal layer detachment |
| ITO mixed fiber | — | — | — | heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | hot heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition ||||||
|---|---|---|---|---|---|---|
| | Quantity of Mixed Fiber | Presence of Corrosion | Long Term Corrosion Characteristics | Weight Ratio | Bright-ness | Performance Evaluation |
| ITO mixed fiber | 30 | ○ | ○ | 140 | 45 | x |
| Ni 20% (single fiber) | 40 | ○ | ○ | 96 | 50 | Δ |
| Ni 20% (single fiber) | 60 | ○ | ○ | 97 | 51 | ○ |
| Ni 20% (single fiber) | 80 | ○ | ○ | 98 | 50 | ○ |

TABLE 8 (b)-continued

| Substrate fiber: Acryl | | | | | | |
|---|---|---|---|---|---|---|
| Ni 20% (single fiber) | 40 | ○ | ○ | 96 | 49 | Δ |
| Ni 20% (single fiber) | 60 | ○ | ○ | 98 | 51 | ○ |
| Ni 20% (single fiber) | 80 | ○ | ○ | 97 | 50 | ○ |
| Ni 20% (single fiber) | 40 | ○ | ○ | 98 | 48 | Δ |
| Ni 20% (single fiber) | 60 | ○ | ○ | 96 | 48 | ○ |
| Ni 20% (single fiber) | 80 | ○ | ○ | 98 | 49 | ○ |
| Ni 20% (single fiber) | 40 | ○ | ○ | 98 | 48 | Δ |
| Ni 20% (single fiber) | 60 | ○ | ○ | 99 | 47 | ○ |
| Ni 20% (single fiber) | 80 | ○ | ○ | 96 | 49 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 96 | 51 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 95 | 51 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 8 (c)

| Substrate fiber: Acyl | | | | | | |
|---|---|---|---|---|---|---|
| Metal Coated Short Fibers | | | | | | |
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Presence of Corrosion | Long Term Corrosion Characteristics | Weight Ratio | Brightness | Performance Evaluation |
| ITO mixed fiber | 30 | ○ | ○ | 140 | 45 | x |
| Cu 20% (single fiber) | 40 | ○ | ○ | 96 | 49 | Δ |
| Cu 20% (single fiber) | 60 | ○ | ○ | 97 | 49 | ○ |
| Cu 20% (single fiber) | 80 | ○ | ○ | 98 | 50 | ○ |
| Cu 20% (single fiber) | 40 | ○ | ○ | 96 | 49 | Δ |
| Cu 20% (single fiber) | 60 | ○ | ○ | 98 | 49 | Δ |
| Cu 20% (single fiber) | 80 | ○ | ○ | 97 | 48 | Δ |
| Cu 20% (single fiber) | 40 | ○ | ○ | 98 | 49 | Δ |
| Cu 20% (single fiber) | 60 | ○ | ○ | 95 | 50 | ○ |
| Cu 20% (single fiber) | 80 | ○ | ○ | 96 | 50 | ○ |
| Cu 20% (single fiber) | 40 | ○ | ○ | 95 | 50 | Δ |
| Cu 20% (single fiber) | 60 | ○ | ○ | 97 | 50 | ○ |
| Cu 20% (single fiber) | 80 | ○ | ○ | 95 | 50 | ○ |
| Cu 20% (single fiber) | 40 | ○ | ○ | 94 | 49 | Δ |
| Cu 20% (single fiber) | 60 | ○ | ○ | 96 | 48 | Δ |
| Cu 20% (single fiber) | 80 | ○ | ○ | 96 | 51 | ○ |

TABLE 8 (c)-continued

| Substrate fiber: Acyl | | | | | | |
|---|---|---|---|---|---|---|
| Cu 20% (single fiber) | 40 | ○ | ○ | 96 | 49 | Δ |
| Cu 20% (single fiber) | 60 | ○ | ○ | 95 | 50 | ○ |
| Cu 20% (single fiber) | 80 | ○ | ○ | 94 | 51 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 9 (a)

Substrate fiber: Nylon

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Presence of Corrosion | Long Term Corrosion Characteristics | Weight Ratio | Brightness | Performance Evaluation |
| ITO mixed fiber | 30 | ○ | ○ | 140 | 45 | x |
| silver 20% (single fiber) | 40 | ○ | ○ | 100 | 50 | Δ |
| silver 20% (single fiber) | 60 | ○ | ○ | 95 | 51 | ○ |
| silver 20% (single fiber) | 80 | ○ | ○ | 96 | 49 | ○ |
| silver 20% (single fiber) | 40 | ○ | ○ | 100 | 50 | Δ |
| silver 20% (single fiber) | 60 | ○ | ○ | 95 | 50 | ○ |
| silver 20% (single fiber) | 80 | ○ | ○ | 96 | 50 | ○ |
| silver 20% (single fiber) | 40 | ○ | ○ | 100 | 48 | Δ |
| silver 20% (single fiber) | 60 | ○ | ○ | 96 | 48 | ○ |
| silver 20% (single fiber) | 80 | ○ | ○ | 98 | 50 | ○ |
| silver 20% (single fiber) | 40 | ○ | ○ | 97 | 48 | Δ |
| silver 20% (single fiber) | 60 | ○ | ○ | 96 | 49 | ○ |
| silver 20% (single fiber) | 80 | ○ | ○ | 98 | 50 | ○ |
| silver 20% (single fiber) | 40 | ○ | ○ | 99 | 50 | Δ |
| silver 20% (single fiber) | 60 | ○ | ○ | 98 | 50 | ○ |
| silver 20% (single fiber) | 80 | ○ | ○ | 97 | 51 | ○ |
| silver 20% (single fiber) | 40 | ○ | ○ | 99 | 50 | Δ |
| silver 20% (single fiber) | 60 | ○ | ○ | 98 | 51 | ○ |
| silver 20% (single fiber) | 80 | ○ | ○ | 97 | 50 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 9 (b)

Substrate fiber: Nylon

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| ITO mixed fiber | — | — | — | heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Presence of Corrosion | Long Term Corrosion Characteristics | Weight Ratio | Brightness | Performance Evaluation |
| ITO mixed fiber | 30 | ○ | ○ | 140 | 45 | x |
| Ni 20% (single fiber) | 40 | ○ | ○ | 96 | 50 | Δ |
| Ni 20% (single fiber) | 60 | ○ | ○ | 97 | 51 | ○ |
| Ni 20% (single fiber) | 80 | ○ | ○ | 98 | 50 | ○ |
| Ni 20% (single fiber) | 40 | ○ | ○ | 96 | 49 | Δ |
| Ni 20% (single fiber) | 60 | ○ | ○ | 98 | 51 | ○ |
| Ni 20% (single fiber) | 80 | ○ | ○ | 97 | 50 | ○ |
| Ni 20% (single fiber) | 40 | ○ | ○ | 98 | 48 | Δ |
| Ni 20% (single fiber) | 60 | ○ | ○ | 96 | 48 | ○ |
| Ni 20% (single fiber) | 80 | ○ | ○ | 98 | 49 | ○ |
| Ni 20% (single fiber) | 40 | ○ | ○ | 98 | 48 | Δ |
| Ni 20% (single fiber) | 60 | ○ | ○ | 99 | 47 | ○ |
| Ni 20% (single fiber) | 80 | ○ | ○ | 96 | 49 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 96 | 51 | ○ |
| Ni 20% (single fiber) | 40 | ○ | ○ | 98 | 50 | Δ |
| Ni 20% (single fiber) | 60 | ○ | ○ | 99 | 51 | ○ |
| Ni 20% (single fiber) | 80 | ○ | ○ | 95 | 51 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 9 (c)

Substrate fiber: Nylon

| Metal Coated Short Fibers | | | | | | |
|---|---|---|---|---|---|---|
| First layer | | Second layer | | | | |
| Metal type/content | Thickness | Metal type/content | Thickness | Treatment | Method of Production | Metal layer detachment |
| ITO mixed fiber | — | — | — | heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |

TABLE 9 (c)-continued

Substrate fiber: Nylon

| Metal Coated Short Fibers First Layer Metal type/content | Thickness | Second layer Metal type/content | Thickness | Treatment | Method of Production | Metal layer detachment |
|---|---|---|---|---|---|---|
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

| Metal Coated Short Fibers First Layer Metal type/content | Quantity of Mixed Fiber | Pressure of Corrosion | Long Term Corrosion Characteristics | Weight Ratio | Brightness | Performance Evaluation |
|---|---|---|---|---|---|---|
| ITO mixed fiber | 30 | ○ | ○ | 140 | 45 | x |
| Cu 20% (single fiber) | 40 | ○ | ○ | 96 | 49 | Δ |
| Cu 20% (single fiber) | 60 | ○ | ○ | 97 | 49 | ○ |
| Cu 20% (single fiber) | 80 | ○ | ○ | 98 | 50 | ○ |
| Cu 20% (single fiber) | 40 | ○ | ○ | 96 | 49 | Δ |
| Cu 20% (single fiber) | 60 | ○ | ○ | 98 | 49 | Δ |
| Cu 20% (single fiber) | 80 | ○ | ○ | 97 | 48 | Δ |
| Cu 20% (single fiber) | 40 | ○ | ○ | 98 | 49 | Δ |
| Cu 20% (single fiber) | 60 | ○ | ○ | 95 | 50 | ○ |
| Cu 20% (single fiber) | 80 | ○ | ○ | 96 | 50 | ○ |
| Cu 20% (single fiber) | 40 | ○ | ○ | 95 | 50 | Δ |
| Cu 20% (single fiber) | 60 | ○ | ○ | 97 | 50 | ○ |
| Cu 20% (single fiber) | 80 | ○ | ○ | 95 | 50 | ○ |
| Cu 20% (single fiber) | 40 | ○ | ○ | 94 | 49 | Δ |
| Cu 20% (single fiber) | 60 | ○ | ○ | 96 | 48 | Δ |
| Cu 20% (single fiber) | 80 | ○ | ○ | 96 | 51 | ○ |
| Cu 20% (single fiber) | 40 | ○ | ○ | 96 | 49 | Δ |
| Cu 20% (single fiber) | 60 | ○ | ○ | 95 | 50 | ○ |
| Cu 20% (single fiber) | 80 | ○ | ○ | 94 | 51 | ○ |

Note:
Corrosion is evaluated after 100 hours of a chlorine test, and ○ indicates no corrosion, the long term corrosion characteristics refer to the state after one month has passed, the weight ratio is a % value per 150 deniers, and the ITO mixed resin is a comparative example.

TABLE 10(a)

Substrate fiber: High Strength Nylon

| Metal Coated Short Fibers First layer Metal type/content | Thickness | Second layer Metal type/content | Thickness | Treatment | Method of Production | Metal layer detachment |
|---|---|---|---|---|---|---|
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

TABLE 10(a)-continued

Substrate fiber: High Strength Nylon

| Metal Coated Short Fibers First Layer Metal type/content | Conductive Resin Composition ||||||
|---|---|---|---|---|---|---|
| | Quantity of Mixed Fiber | Metal Content Mass % | Pressure of Corrosion | Long Term Corrosion Characteristics | Weight Ratio | Bright-ness | Performance Evaluation |

| Metal type/content | Quantity of Mixed Fiber | Metal Content Mass % | Pressure of Corrosion | Long Term Corrosion Characteristics | Weight Ratio | Brightness | Performance Evaluation |
|---|---|---|---|---|---|---|---|
| Cu 20% (single fiber) | 60 | 8.00 | ○ | ○ | 100 | 50 | Δ |
| Cu 20% (single fiber) | 80 | 4.00 | ○ | ○ | 95 | 51 | ○ |
| Cu 20% (single fiber) | 90 | 2.00 | ○ | ○ | 96 | 51 | ○ |
| Cu 20% (single fiber) | 60 | 8.00 | ○ | ○ | 100 | 50 | Δ |
| Cu 20% (single fiber) | 80 | 4.00 | ○ | ○ | 95 | 51 | ○ |
| Cu 20% (single fiber) | 90 | 2.00 | ○ | ○ | 96 | 51 | ○ |
| Cu 20% (single fiber) | 60 | 8.92 | ○ | ○ | 103 | 48 | Δ |
| Cu 20% (single fiber) | 80 | 4.46 | ○ | ○ | 102 | 49 | ○ |
| Cu 20% (single fiber) | 90 | 2.23 | ○ | ○ | 98 | 51 | ○ |
| Cu 20% (single fiber) | 60 | 8.92 | ○ | ○ | 102 | 48 | Δ |
| Cu 20% (single fiber) | 80 | 4.46 | ○ | ○ | 102 | 49 | ○ |
| Cu 20% (single fiber) | 90 | 2.23 | ○ | ○ | 98 | 51 | ○ |
| Cu 20% (single fiber) | 60 | 8.88 | ○ | ○ | 104 | 50 | Δ |
| Cu 20% (single fiber) | 80 | 4.44 | ○ | ○ | 102 | 51 | ○ |
| Cu 20% (single fiber) | 90 | 2.22 | ○ | ○ | 99 | 52 | ○ |
| Cu 20% (single fiber) | 60 | 8.88 | ○ | ○ | 104 | 51 | Δ |
| Cu 20% (single fiber) | 80 | 4.44 | ○ | ○ | 102 | 52 | ○ |
| Cu 20% (single fiber) | 90 | 2.22 | ○ | ○ | 99 | 53 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 10 (b)

Substrate fiber: High Strength Nylon

| Metal Coated Short Fibers ||||||
|---|---|---|---|---|---|
| First layer || Second layer |||||
| Metal type/content | Thickness | Metal type/content | Thickness | Treatment | Method of Production | Metal layer detachment |

| Metal type/content | Thickness | Metal type/content | Thickness | Treatment | Method of Production | Metal layer detachment |
|---|---|---|---|---|---|---|
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (slngle fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition |||||||
|---|---|---|---|---|---|---|---|
| | Quantity of Mixed Fiber | Metal Content Mass % | Pressure of Corrosion | Long Term Corrosion Characteristics | Weight Ratio | Brightness | Performance Evaluation |
| Ni 20% (single fiber) | 60 | 8.00 | ○ | ○ | 99 | 50 | Δ |
| Ni 20% (single fiber) | 80 | 4.00 | ○ | ○ | 98 | 52 | ○ |
| Ni 20% (single fiber) | 90 | 2.00 | ○ | ○ | 96 | 53 | ○ |
| Ni 20% (single fiber) | 60 | 8.00 | ○ | ○ | 99 | 49 | Δ |
| Ni 20% (slngle fiber) | 80 | 4.00 | ○ | ○ | 98 | 51 | ○ |
| Ni 20% (single fiber) | 90 | 2.00 | ○ | ○ | 96 | 52 | ○ |
| Ni 20% (single fiber) | 60 | 8.92 | ○ | ○ | 102 | 48 | Δ |
| Ni 20% (single fiber) | 80 | 4.46 | ○ | ○ | 100 | 50 | ○ |
| Ni 20% (single fiber) | 90 | 2.23 | ○ | ○ | 98 | 51 | ○ |
| Ni 20% (single fiber) | 60 | 8.92 | ○ | ○ | 102 | 47 | Δ |

TABLE 10 (b)-continued

| Substrate fiber: High Strength Nylon | | | | | | | |
|---|---|---|---|---|---|---|---|
| Ni 20% (single fiber) | 80 | 4.46 | ○ | ○ | 100 | 49 | ○ |
| Ni 20% (single fiber) | 90 | 2.23 | ○ | ○ | 98 | 50 | ○ |
| Ni 20% (single fiber) | 60 | 8.88 | ○ | ○ | 104 | 49 | Δ |
| Ni 20% (single fiber) | 80 | 4.44 | ○ | ○ | 102 | 51 | ○ |
| Ni 20% (single fiber) | 90 | 2.22 | ○ | ○ | 99 | 52 | ○ |
| Ni 20% (single fiber) | 60 | 8.88 | ○ | ○ | 104 | 49 | Δ |
| Ni 20% (single fiber) | 80 | 4.44 | ○ | ○ | 102 | 51 | ○ |
| Ni 20% (single fiber) | 90 | 2.22 | ○ | ○ | 99 | 52 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 10 (c)

Substrate fiber: High Strength Nylon

Metal Coated Short Fibers

| First layer | | Second layer | | | | |
|---|---|---|---|---|---|---|
| Metal type/content | Thickness | Metal type/content | Thickness | Treatment | Method of Production | Metal layer detachment |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | healed | kneading | no |

| Metal Coated Short Fibers First Layer Metal type/content | Conductive Resin Composition | | | | | |
|---|---|---|---|---|---|---|
| | Quantity of Mixed Fiber | Metal Content Mass % | Pressure of Corrosion | Long Term Corrosion Characteristics | Weight Ratio | Brightness | Performance Evaluation |
| Cu 20% (single fiber) | 60 | 8.00 | ○ | ○ | 99 | 46 | Δ |
| Cu 20% (single fiber) | 80 | 4.00 | ○ | ○ | 98 | 58 | ○ |
| Cu 20% (single fiber) | 90 | 2.00 | ○ | ○ | 97 | 49 | ○ |
| Cu 20% (single fiber) | 60 | 8.00 | ○ | ○ | 99 | 46 | Δ |
| Cu 20% (single fiber) | 80 | 4.00 | ○ | ○ | 98 | 48 | ○ |
| Cu 20% (single fiber) | 90 | 2.00 | ○ | ○ | 97 | 49 | ○ |
| Cu 20% (single fiber) | 60 | 8.92 | ○ | ○ | 100 | 46 | Δ |
| Cu 20% (single fiber) | 80 | 4.46 | ○ | ○ | 98 | 47 | ○ |
| Cu 20% (single fiber) | 90 | 2.23 | ○ | ○ | 97 | 49 | ○ |
| Cu 20% (single fiber) | 60 | 8.92 | ○ | ○ | 100 | 46 | Δ |
| Cu 20% (single fiber) | 80 | 4.46 | ○ | ○ | 98 | 47 | ○ |
| Cu 20% (single fiber) | 90 | 2.23 | ○ | ○ | 97 | 49 | ○ |
| Cu 20% (single fiber) | 60 | 8.88 | ○ | ○ | 102 | 46 | Δ |
| Cu 20% (single fiber) | 80 | 4.44 | ○ | ○ | 101 | 47 | ○ |
| Cu 20% (single fiber) | 90 | 2.22 | ○ | ○ | 98 | 48 | ○ |
| Cu 20% (single fiber) | 60 | 8.88 | ○ | ○ | 101 | 46 | Δ |
| Cu 20% (single fiber) | 80 | 4.44 | ○ | ○ | 100 | 47 | ○ |
| Cu 20% (single fiber) | 90 | 2.22 | ○ | ○ | 99 | 48 | 0 |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 11 (a)

Substrate fiber: Polyphenylene Sulfide Fiber

| Metal Coated Short Fibers | | | | | | |
|---|---|---|---|---|---|---|
| First layer | | Second layer | | | | |
| Metal type/content | Thickness | Metal type/content | Thickness | Treatment | Method of Production | Metal layer detachment |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (slngle fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nn | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Metal Content Mass % | Pressure of Corrosion | Long Term Corrosion Characteristics | Weight Ratio | Brightness | Performance Evaluation |
| silver 20% (single fiber) | 60 | 8.00 | ○ | ○ | 104 | 50 | Δ |
| silver 20% (single fiber) | 80 | 4.00 | ○ | ○ | 102 | 51 | ○ |
| silver 20% (single fiber) | 90 | 2.00 | ○ | ○ | 100 | 53 | ○ |
| silver 20% (single fiber) | 60 | 8.00 | ○ | ○ | 104 | 50 | Δ |
| silver 20% (single fiber) | 80 | 4.00 | ○ | ○ | 102 | 52 | Δ |
| silver 20% (single fiber) | 90 | 2.00 | ○ | ○ | 100 | 53 | ○ |
| silver 20% (single fiber) | 60 | 8.92 | ○ | ○ | 104 | 48 | Δ |
| silver 20% (single fiber) | 80 | 4.46 | ○ | ○ | 101 | 52 | ○ |
| silver 20% (slngle fiber) | 90 | 2.23 | ○ | ○ | 99 | 53 | ○ |
| silver 20% (single fiber) | 60 | 8.92 | ○ | ○ | 104 | 48 | Δ |
| silver 20% (single fiber) | 80 | 4.46 | ○ | ○ | 101 | 51 | ○ |
| silver 20% (single fiber) | 90 | 2.23 | ○ | ○ | 99 | 52 | ○ |
| silver 20% (single fiber) | 60 | 8.88 | ○ | ○ | 106 | 48 | Δ |
| silver 20% (single fiber) | 80 | 4.44 | ○ | ○ | 104 | 50 | ○ |
| silver 20% (single fiber) | 90 | 2.22 | ○ | ○ | 100 | 50 | ○ |
| silver 20% (single fiber) | 60 | 8.88 | ○ | ○ | 106 | 48 | Δ |
| silver 20% (single fiber) | 80 | 4.44 | ○ | ○ | 104 | 50 | ○ |
| silver 20% (single fiber) | 90 | 2.22 | ○ | ○ | 100 | 50 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 11 (b)

Substrate fiber: Polyphenylene Sulfide Fiber

| Metal Coated Short Fibers | | | | | | |
|---|---|---|---|---|---|---|
| First layer | | Second layer | | | | |
| Metal type/content | Thickness | Metal type/content | Thickness | Treatment | Method of Production | Metal layer detachment |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |

TABLE 11 (b)-continued

Substrate fiber: Polyphenylene Sulfide Fiber

| | | | | | | |
|---|---|---|---|---|---|---|
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Metal Content Mass % | Pressure of Corrosion | Long Term Corrosion Characteristics | Weight Ratio | Bright-ness | Performance Evaluation |
| Ni 20% (single fiber) | 60 | 8.00 | ○ | ○ | 97 | 48 | Δ |
| Ni 20% (single fiber) | 80 | 4.00 | ○ | ○ | 95 | 50 | ○ |
| Ni 20% (single fiber) | 90 | 2.00 | ○ | ○ | 94 | 50 | ○ |
| Ni 20% (single fiber) | 60 | 8.00 | ○ | ○ | 97 | 48 | Δ |
| Ni 20% (single fiber) | 80 | 4.00 | ○ | ○ | 95 | 50 | ○ |
| Ni 20% (single fiber) | 90 | 2.00 | ○ | ○ | 94 | 50 | ○ |
| Ni 20% (single fiber) | 60 | 8.92 | ○ | ○ | 100 | 46 | Δ |
| Ni 20% (single fiber) | 80 | 4.46 | ○ | ○ | 99 | 48 | ○ |
| Ni 20% (single fiber) | 90 | 2.23 | ○ | ○ | 96 | 48 | ○ |
| Ni 20% (single fiber) | 60 | 8.92 | ○ | ○ | 100 | 46 | Δ |
| Ni 20% (single fiber) | 80 | 4.46 | ○ | ○ | 99 | 48 | ○ |
| Ni 20% (single fiber) | 90 | 2.23 | ○ | ○ | 96 | 48 | ○ |
| Ni 20% (single fiber) | 60 | 8.88 | ○ | ○ | 101 | 48 | Δ |
| Ni 20% (single fiber) | 80 | 4.44 | ○ | ○ | 100 | 49 | ○ |
| Ni 20% (single fiber) | 90 | 2.22 | ○ | ○ | 97 | 49 | ○ |
| Ni 20% (single fiber) | 60 | 8.88 | ○ | ○ | 101 | 48 | Δ |
| Ni 20% (single fiber) | 80 | 4.44 | ○ | ○ | 100 | 49 | ○ |
| Ni 20% (single fiber) | 90 | 2.22 | ○ | ○ | 97 | 49 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 11 (c)

Substrate fiber: Polyphenylene Sulfide Fiber

| Metal Coated Short Fibers | | | | | | |
|---|---|---|---|---|---|---|
| First layer | | Second layer | | | | |
| Metal type/content | Thick-ness | Metal type/content | Thick-ness | Treatment | Method of Production | Metal layer detachment |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

TABLE 11 (c)-continued

Substrate fiber: Polyphenylene Sulfide Fiber

| Metal Coated Short Fibers First Layer Metal type/content | Conductive Resin Composition ||||||
|---|---|---|---|---|---|---|
| | Quantity of Mixed Fiber | Metal Content Mass % | Pressure of Corrosion | Long Term Corrosion Characteristics | Weight Ratio | Bright-ness | Performance Evaluation |
| Cu 20% (single fiber) | 60 | 8.88 | ○ | ○ | 99 | 48 | Δ |
| Cu 20% (single fiber) | 80 | 4.00 | ○ | ○ | 97 | 49 | ○ |
| Cu 20% (single fiber) | 90 | 2.00 | ○ | ○ | 96 | 49 | ○ |
| Cu 20% (single fiber) | 60 | 8.00 | ○ | ○ | 99 | 48 | Δ |
| Cu 20% (single fiber) | 80 | 4.00 | ○ | ○ | 97 | 49 | Δ |
| Cu 20% (single fiber) | 90 | 2.00 | ○ | ○ | 96 | 49 | Δ |
| Cu 20% (single fiber) | 60 | 8.92 | ○ | ○ | 102 | 49 | Δ |
| Cu 20% (single fiber) | 80 | 4.46 | ○ | ○ | 100 | 50 | ○ |
| Cu 20% (single fiber) | 90 | 2.23 | ○ | ○ | 99 | 50 | ○ |
| Cu 20% (single fiber) | 60 | 8.92 | ○ | ○ | 102 | 49 | Δ |
| Cu 20% (single fiber) | 80 | 4.46 | ○ | ○ | 100 | 50 | ○ |
| Cu 20% (single fiber) | 90 | 2.23 | ○ | ○ | 99 | 50 | ○ |
| Cu 20% (single fiber) | 60 | 8.88 | ○ | ○ | 104 | 47 | Δ |
| Cu 20% (single fiber) | 80 | 4.44 | ○ | ○ | 102 | 48 | Δ |
| Cu 20% (single fiber) | 90 | 2.22 | ○ | ○ | 100 | 49 | ○ |
| Cu 20% (single fiber) | 60 | 8.88 | ○ | ○ | 104 | 46 | Δ |
| Cu 20% (single fiber) | 80 | 4.44 | ○ | ○ | 102 | 48 | ○ |
| Cu 20% (single fiber) | 90 | 2.22 | ○ | ○ | 100 | 49 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 12 (a)

Substrate fiber: Polycarbonate Fiber

| Metal Coated Short Fibers ||||| | | |
|---|---|---|---|---|---|---|
| First layer || Second layer ||| | |
| Metal type/content | Thickness | Metal type/content | Thickness | Treatment | Method of Production | Metal layer detachment |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition ||||||
|---|---|---|---|---|---|---|
| | Quantity of Mixed Fiber | Metal Content Mass % | Pressure of Corrosion | Long Term Corrosion Characteristics | Weight Ratio | Bright-ness | Performance Evaluation |
| silver 20% (single fiber) | 60 | 8.00 | ○ | ○ | 104 | 50 | Δ |
| silver 20% (single fiber) | 80 | 4.00 | ○ | ○ | 103 | 52 | ○ |
| silver 20% (single fiber) | 90 | 2.00 | ○ | ○ | 100 | 52 | ○ |
| silver 20% (single fiber) | 60 | 8.00 | ○ | ○ | 104 | 50 | Δ |
| silver 20% (single fiber) | 80 | 4.00 | ○ | ○ | 103 | 52 | ○ |
| silver 20% (single fiber) | 90 | 2.00 | ○ | ○ | 100 | 52 | ○ |
| silver 20% (single fiber) | 60 | 8.92 | ○ | ○ | 104 | 45 | Δ |
| silver 20% (single fiber) | 80 | 4.46 | ○ | ○ | 103 | 48 | ○ |
| silver 20% (single fiber) | 90 | 2.23 | ○ | ○ | 102 | 50 | ○ |
| silver 20% (single fiber) | 60 | 8.92 | ○ | ○ | 107 | 46 | Δ |

TABLE 12 (a)-continued

| Substrate fiber: Polycarbonate Fiber | | | | | | | |
|---|---|---|---|---|---|---|---|
| silver 20% (single fiber) | 80 | 4.46 | ○ | ○ | 106 | 48 | ○ |
| silver 20% (single fiber) | 90 | 2.23 | ○ | ○ | 105 | 50 | ○ |
| silver 20% (single fiber) | 60 | 8.88 | ○ | ○ | 109 | 50 | Δ |
| silver 20% (single fiber) | 80 | 4.44 | ○ | ○ | 105 | 51 | ○ |
| silver 20% (single fiber) | 90 | 2.22 | ○ | ○ | 102 | 52 | ○ |
| silver 20% (single fiber) | 60 | 8.88 | ○ | ○ | 109 | 50 | Δ |
| silver 20% (single fiber) | 80 | 4.44 | ○ | ○ | 105 | 51 | ○ |
| silver 20% (single fiber) | 90 | 2.22 | ○ | ○ | 102 | 52 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 12 (b)

Substrate fiber: Polycarbonate Fiber

Metal Coated Short Fibers

| First layer | | Second layer | | | | |
|---|---|---|---|---|---|---|
| Metal type/content | Thickness | Metal type/content | Thickness | Treatment | Method of Production | Metal layer detachment |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

| Metal Coated Short Fibers First Layer Metal type/content | Conductive Resin Composition | | | | | |
|---|---|---|---|---|---|---|
| | Quantity of Mixed Fiber | Metal Content Mass % | Pressure of Corrosion | Long Term Corrosion Characteristics | Weight Ratio | Brightness | Performance Evaluation |
| Ni 20% (single fiber) | 60 | 8.00 | ○ | ○ | 98 | 48 | Δ |
| Ni 20% (single fiber) | 80 | 4.00 | ○ | ○ | 97 | 50 | ○ |
| Ni 20% (single fiber) | 90 | 2.00 | ○ | ○ | 96 | 51 | ○ |
| Ni 20% (single fiber) | 60 | 8.00 | ○ | ○ | 98 | 48 | Δ |
| Ni 20% (single fiber) | 80 | 4.00 | ○ | ○ | 97 | 50 | ○ |
| Ni 20% (single fiber) | 90 | 2.00 | ○ | ○ | 96 | 51 | ○ |
| Ni 20% (single fiber) | 60 | 8.92 | ○ | ○ | 102 | 44 | Δ |
| Ni 20% (single fiber) | 80 | 4.46 | ○ | ○ | 100 | 48 | ○ |
| Ni 20% (single fiber) | 90 | 2.23 | ○ | ○ | 98 | 49 | ○ |
| Ni 20% (single fiber) | 60 | 8.92 | ○ | ○ | 102 | 44 | Δ |
| Ni 20% (single fiber) | 80 | 4.46 | ○ | ○ | 100 | 48 | ○ |
| Ni 20% (single fiber) | 90 | 2.23 | ○ | ○ | 98 | 49 | ○ |
| Ni 20% (single fiber) | 60 | 8.88 | ○ | ○ | 105 | 47 | Δ |
| Ni 20% (single fiber) | 80 | 4.44 | ○ | ○ | 103 | 49 | ○ |
| Ni 20% (single fiber) | 90 | 2.22 | ○ | ○ | 101 | 49 | ○ |
| Ni 20% (single fiber) | 60 | 8.88 | ○ | ○ | 105 | 47 | Δ |
| Ni 20% (single fiber) | 80 | 4.44 | ○ | ○ | 103 | 49 | ○ |
| Ni 20% (single fiber) | 90 | 2.22 | ○ | ○ | 101 | 49 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 12 (c)

Substrate fiber: Polycarbonate Fiber

| | Metal Coated Short Fibers | | | | | |
|---|---|---|---|---|---|---|
| First layer | | Second layer | | | | |
| Metal type/content | Thickness | Metal type/content | Thickness | Treatment | Method of Production | Metal layer detachment |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

| Metal Coated Short Fibers First Layer Metal type/content | Conductive Resin Composition | | | | | | |
|---|---|---|---|---|---|---|---|
| | Quantity of Mixed Fiber | Metal Content Mass % | Pressure of Corrosion | Long Term Corrosion Characteristics | Weight Ratio | Brightness | Performance Evaluation |
| Cu 20% (single fiber) | 60 | 8.88 | ○ | ○ | 99 | 44 | Δ |
| Cu 20% (single fiber) | 80 | 4.00 | ○ | ○ | 97 | 48 | ○ |
| Cu 20% (single fiber) | 90 | 2.00 | ○ | ○ | 96 | 49 | ○ |
| Cu 20% (single fiber) | 60 | 8.00 | ○ | ○ | 99 | 45 | Δ |
| Cu 20% (single fiber) | 80 | 4.00 | ○ | ○ | 97 | 47 | Δ |
| Cu 20% (single fiber) | 90 | 2.00 | ○ | ○ | 96 | 47 | Δ |
| Cu 20% (single fiber) | 60 | 8.92 | ○ | ○ | 102 | 46 | Δ |
| Cu 20% (single fiber) | 80 | 4.46 | ○ | ○ | 101 | 48 | ○ |
| Cu 20% (single fiber) | 90 | 2.23 | ○ | ○ | 100 | 49 | ○ |
| Cu 20% (single fiber) | 60 | 8.92 | ○ | ○ | 102 | 44 | Δ |
| Cu 20% (single fiber) | 80 | 4.46 | ○ | ○ | 101 | 48 | ○ |
| Cu 20% (single fiber) | 90 | 2.23 | ○ | ○ | 100 | 49 | ○ |
| Cu 20% (single fiber) | 60 | 8.88 | ○ | ○ | 104 | 46 | Δ |
| Cu 20% (single fiber) | 80 | 4.44 | ○ | ○ | 103 | 48 | Δ |
| Cu 20% (single fiber) | 90 | 2.22 | ○ | ○ | 101 | 50 | ○ |
| Cu 20% (single fiber) | 60 | 8.88 | ○ | ○ | 104 | 45 | Δ |
| Cu 20% (single fiber) | 80 | 4.44 | ○ | ○ | 103 | 48 | ○ |
| Cu 20% (single fiber) | 90 | 2.22 | ○ | ○ | 101 | 50 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 13 (a)

Substrate fiber: Aramid Fiber

| | Metal Coated Short Fibers | | | | | |
|---|---|---|---|---|---|---|
| First Layer | | Second Layer | | | | |
| Metal type/content | Thickness | Metal type/content | Thickness | Treatment | Method of Production | Metal layer detachment |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | not heated | kneading | yes |
| silver 20% (single fiber) | 600 nm | none | — | heated | kneading | no |
| silver 20% (single fiber) | 600 nm | none | — | heated | kneading | no |
| silver 20% (single fiber) | 600 nm | none | — | heated | kneading | no |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |
| silver 20% (single fiber) | 600 nm | copper 2.3% | 60 nm | not heated | kneading | yes |

TABLE 13 (a)-continued

Substrate fiber: Aramid Fiber

| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | copper 2.3% | 60 nm | heated | kneading | no |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | not heated | kneading | yes |
| silver 20% (single fiber) | 600 nm | gold 2.2% | 60 nm | heated | kneading | no |
| silver 20% (single fiber) | 600 nm | gold 2.2% | 60 nm | heated | kneading | no |
| silver 20% (single fiber) | 600 nm | gold 2.2% | 60 nm | heated | kneading | no |

| Metal Coated Short Fibers First Layer Metal type/content | Conductive Resin Composition | | | | | | |
|---|---|---|---|---|---|---|---|
| | Quantity of Mixed Fiber | Metal Content Mass % | Presence of Corrosion | Long Term Corrosion Characteristics | Weight Ratio | Brightness | Performance Evaluation |
| silver 20% (single fiber) | 60 | 8.00 | ○ | ○ | 104 | 50 | Δ |
| silver 20% (single fiber) | 80 | 4.00 | ○ | ○ | 103 | 52 | ○ |
| silver 20% (single fiber) | 90 | 2.00 | ○ | ○ | 100 | 52 | ○ |
| silver 20% (single fiber) | 60 | 8.00 | ○ | ○ | 104 | 50 | Δ |
| silver 20% (single fiber) | 80 | 4.00 | ○ | ○ | 103 | 52 | ○ |
| silver 20% (single fiber) | 90 | 2.00 | ○ | ○ | 100 | 52 | ○ |
| silver 20% (single fiber) | 60 | 8.92 | ○ | ○ | 104 | 45 | Δ |
| silver 20% (single fiber) | 80 | 4.46 | ○ | ○ | 103 | 48 | ○ |
| silver 20% (single fiber) | 90 | 2.23 | ○ | ○ | 102 | 50 | ○ |
| silver 20% (single fiber) | 60 | 8.92 | ○ | ○ | 107 | 46 | Δ |
| silver 20% (single fiber) | 80 | 4.46 | ○ | ○ | 106 | 48 | ○ |
| silver 20% (single fiber) | 90 | 2.23 | ○ | ○ | 105 | 50 | ○ |
| silver 20% (single fiber) | 60 | 8.88 | ○ | ○ | 109 | 50 | Δ |
| silver 20% (single fiber) | 80 | 4.44 | ○ | ○ | 105 | 51 | ○ |
| silver 20% (single fiber) | 90 | 2.22 | ○ | ○ | 102 | 52 | ○ |
| silver 20% (single fiber) | 60 | 8.88 | ○ | ○ | 109 | 50 | Δ |
| silver 20% (single fiber) | 80 | 4.44 | ○ | ○ | 105 | 51 | ○ |
| silver 20% (single fiber) | 90 | 2.22 | ○ | ○ | 102 | 52 | ○ |

Note
Corrosion is evaluated after 100 hours of a chlorine test, and ○ indicates no corrosion, the long term corrosion characteristics refer to the state after one month has passed, and the weight ratio is a % value per 150 deniers.

TABLE 13 (b)

Substrate fiber: Aramid Fiber

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | not heated | kneading | yes |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | none | — | heated | kneading | no |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | not heated | kneading | yes |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | copper 2.3% | 60 nm | heated | kneading | no |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | not heated | kneading | yes |
| Ni 20% (single fiber) | 600 nm | gold 2.2% | 60 nm | heated | kneading | no |
| Ni 20% (single fiber) | 600 nm | gold 2.2% | 60 nm | heated | kneading | no |
| Ni 20% (single fiber) | 600 nm | gold 2.2% | 60 nm | heated | kneading | no |

TABLE 13 (b)-continued

Substrate fiber: Aramid Fiber

| Metal Coated Short Fibers First Layer Metal type/content | Conductive Resin Composition | | | | | | |
|---|---|---|---|---|---|---|---|
| | Quantity of Mixed Fiber | Metal Content Mass % | Presence of Corrosion | Long Term Corrosion Characteristics | Weight Ratio | Brightness | Performance Evaluation |
| Ni 20% (single fiber) | 60 | 8.00 | ○ | ○ | 98 | 48 | Δ |
| Ni 20% (single fiber) | 80 | 4.00 | ○ | ○ | 97 | 50 | ○ |
| Ni 20% (single fiber) | 90 | 2.00 | ○ | ○ | 96 | 51 | ○ |
| Ni 20% (single fiber) | 60 | 8.00 | ○ | ○ | 98 | 48 | Δ |
| Ni 20% (single fiber) | 80 | 4.00 | ○ | ○ | 97 | 50 | ○ |
| Ni 20% (single fiber) | 90 | 2.00 | ○ | ○ | 96 | 51 | ○ |
| Ni 20% (single fiber) | 60 | 8.92 | ○ | ○ | 102 | 44 | Δ |
| Ni 20% (single fiber) | 80 | 4.46 | ○ | ○ | 100 | 48 | ○ |
| Ni 20% (single fiber) | 90 | 2.23 | ○ | ○ | 98 | 49 | ○ |
| Ni 20% (single fiber) | 60 | 8.92 | ○ | ○ | 102 | 44 | Δ |
| Ni 20% (single fiber) | 80 | 4.46 | ○ | ○ | 100 | 48 | ○ |
| Ni 20% (single fiber) | 90 | 2.23 | ○ | ○ | 98 | 49 | ○ |
| Ni 20% (single fiber) | 60 | 8.88 | ○ | ○ | 105 | 47 | Δ |
| Ni 20% (single fiber) | 80 | 4.44 | ○ | ○ | 103 | 49 | ○ |
| Ni 20% (single fiber) | 90 | 2.22 | ○ | ○ | 101 | 49 | ○ |
| Ni 20% (single fiber) | 60 | 8.88 | ○ | ○ | 105 | 47 | Δ |
| Ni 20% (single fiber) | 80 | 4.44 | ○ | ○ | 103 | 49 | ○ |
| Ni 20% (single fiber) | 90 | 2.22 | ○ | ○ | 101 | 49 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 13 (c)

Substrate fiber: Aramid Fiber

| Metal Coated Short Fibers | | | | | | |
|---|---|---|---|---|---|---|
| First Layer | | Second Layer | | | | |
| Metal type/content | Thickness | Metal type/content | Thickness | Treatment | Method of Production | Metal layer detachment |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | not heated | kneading | yes |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | none | — | heated | kneading | no |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | not heated | kneading | yes |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | silver 2.3% | 60 nm | heated | kneading | no |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | not heated | kneading | yes |
| Cu 20% (single fiber) | 600 nm | gold 2.2% | 60 nm | heated | kneading | no |
| Cu 20% (single fiber) | 600 nm | gold 2.2% | 60 nm | heated | kneading | no |
| Cu 20% (single fiber) | 600 nm | gold 2.2% | 60 nm | heated | kneading | no |

| Metal Coated Short Fibers First Layer Metal type/content | Conductive Resin Composition | | | | | | |
|---|---|---|---|---|---|---|---|
| | Quantity of Mixed Fiber | Metal Content Mass % | Presence of Corrosion | Long Term Corrosion Characteristics | Weight Ratio | Brightness | Performance Evaluation |
| Cu 20% (single fiber) | 60 | 8.88 | ○ | ○ | 99 | 44 | Δ |
| Cu 20% (single fiber) | 80 | 4.00 | ○ | ○ | 97 | 48 | ○ |
| Cu 20% (single fiber) | 90 | 2.00 | ○ | ○ | 96 | 49 | ○ |
| Cu 20% (single fiber) | 60 | 8.00 | ○ | ○ | 99 | 45 | Δ |
| Cu 20% (single fiber) | 80 | 4.00 | ○ | ○ | 97 | 47 | Δ |
| Cu 20% (single fiber) | 90 | 2.00 | ○ | ○ | 96 | 47 | ○ |
| Cu 20% (single fiber) | 60 | 8.92 | ○ | ○ | 102 | 46 | Δ |
| Cu 20% (single fiber) | 80 | 4.46 | ○ | ○ | 101 | 48 | ○ |
| Cu 20% (single fiber) | 90 | 2.23 | ○ | ○ | 100 | 49 | ○ |
| Cu 20% (single fiber) | 60 | 8.92 | ○ | ○ | 102 | 44 | Δ |

TABLE 13 (c)-continued

Substrate fiber: Aramid Fiber

| | | | | | | | |
|---|---|---|---|---|---|---|---|
| Cu 20% (single fiber) | 80 | 4.46 | ○ | ○ | 101 | 48 | ○ |
| Cu 20% (single fiber) | 90 | 2.23 | ○ | ○ | 100 | 49 | ○ |
| Cu 20% (single fiber) | 60 | 8.88 | ○ | ○ | 104 | 46 | Δ |
| Cu 20% (single fiber) | 80 | 4.44 | ○ | ○ | 103 | 48 | Δ |
| Cu 20% (single fiber) | 90 | 2.22 | ○ | ○ | 101 | 50 | ○ |
| Cu 20% (single fiber) | 60 | 8.88 | ○ | ○ | 104 | 45 | Δ |
| Cu 20% (single fiber) | 80 | 4.44 | ○ | ○ | 103 | 48 | ○ |
| Cu 20% (single fiber) | 90 | 2.22 | ○ | ○ | 101 | 50 | ○ |

Note:
Corrosion is evaluated after 100 hours of a chlorine test, and ○ indicates no corrosion, the long term corrosion characteristics refer to the state after one month has passed, and the weight ratio is a % value per 150 deniers.

TABLE 14

Substrate fiber: Polyester

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity (Ω/cm$^2$) |
| none | none | not heated | — | kneading | no | 0 | $1 \times 10^{15}$ |
| ITO Mixed Fiber | — | heated | 130 | kneading | no | 20 | $6 \times 10^7$ |
| silver 20% (single fiber) | 600 nm | not heated | — | kneading | yes | 20 | $7 \times 10^4$ |
| silver 20% (single fiber) | 600 nm | not heated | — | kneading | yes | 50 | $6 \times 10^4$ |
| silver 20% (single fiber) | 600 nm | heated | 120 | kneading | no | 1 | $5 \times 10^4$ |
| silver 20% (single fiber) | 600 nm | heated | 120 | kneading | no | 20 | $4 \times 10^4$ |
| silver 20% (single fiber) | 600 nm | heated | 120 | kneading | no | 40 | $3 \times 10^4$ |
| silver 20% (single fiber) | 600 nm | heated | 120 | kneading | no | 50 | $2 \times 10^4$ |
| silver 20% (single fiber) | 600 nm | heated | 120 | kneading | yes | 80 | $1 \times 10^4$ |
| Ni 20% (single fiber) | 600 nm | not heated | — | kneading | yes | 20 | $7 \times 10^4$ |
| Ni 20% (single fiber) | 600 nm | heated | 270 | kneading | no | 50 | $3 \times 10^4$ |
| Ni 20% (single fiber) | 600 nm | heated | 290 | kneading | yes | 20 | $4 \times 10^4$ |
| Cu 20% (single fiber) | 600 nm | not heated | — | kneading | yes | 20 | $8 \times 10^4$ |
| Cu 20% (single fiber) | 600 nm | heated | 280 | kneading | no | 20 | $5 \times 10^4$ |
| Cu 20% (single fiber) | 600 nm | heated | 300 | kneading | yes | 50 | $3 \times 10^4$ |

Note:
'none' and ITO fiber are comparative examples.

TABLE 15

Substrate fiber: Acryl

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity (Ω/cm$^2$) |
| none | none | not heated | — | kneading | no | 0 | $1 \times 10^{15}$ |
| ITO Mixed Fiber | — | heated | 130 | kneading | no | 20 | $6 \times 10^7$ |
| silver 20% (single fiber) | 600 nm | not heated | — | kneading | yes | 20 | $8 \times 10^4$ |
| silver 20% (single fiber) | 600 nm | not heated | — | kneading | yes | 50 | $7 \times 10^4$ |
| silver 20% (single fiber) | 600 nm | heated | 120 | kneading | no | 1 | $5 \times 10^4$ |
| silver 20% (single fiber) | 600 nm | heated | 120 | kneading | no | 20 | $3 \times 10^4$ |
| silver 20% (single fiber) | 600 nm | heated | 120 | kneading | no | 40 | $3 \times 10^4$ |
| silver 20% (single fiber) | 600 nm | heated | 120 | kneading | no | 50 | $2 \times 10^4$ |
| silver 20% (single fiber) | 600 nm | heated | 120 | kneading | yes | 80 | $2 \times 10^4$ |
| Ni 20% (single fiber) | 600 nm | not heated | — | kneading | yes | 20 | $6 \times 10^4$ |
| Ni 20% (single fiber) | 600 nm | heated | 270 | kneading | no | 50 | $3 \times 10^4$ |
| Ni 20% (single fiber) | 600 nm | heated | 290 | kneading | yes | 20 | $4 \times 10^4$ |
| Cu 20% (single fiber) | 600 nm | not heated | — | kneading | yes | 20 | $8 \times 10^4$ |
| Cu 20% (single fiber) | 600 nm | heated | 280 | kneading | no | 20 | $5 \times 10^4$ |
| Cu 20% (single fiber) | 600 nm | heated | 300 | kneading | yes | 50 | $4 \times 10^4$ |

Note:
'none' and ITO fiber are comparative examples.

TABLE 16

Substrate fiber: Nylon

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| none | none | not heated | — | kneading | no | 0 | $1 \times 10^{15}$ |
| ITO Mixed Fiber | — | heated | 130 | kneading | no | 20 | $6 \times 10^7$ |
| silver 20% (single fiber) | 600 nm | not heated | — | kneading | yes | 20 | $8 \times 10^4$ |
| silver 20% (single fiber) | 600 nm | not heated | — | kneading | yes | 50 | $6 \times 10^4$ |
| silver 20% (single fiber) | 600 nm | heated | 120 | kneading | no | 1 | $3 \times 10^4$ |
| silver 20% (single fiber) | 600 nm | heated | 120 | kneading | no | 20 | $2 \times 10^4$ |
| silver 20% (single fiber) | 600 nm | heated | 120 | kneading | no | 40 | $3 \times 10^4$ |
| silver 20% (single fiber) | 600 nm | heated | 120 | kneading | no | 50 | $2 \times 10^4$ |
| silver 20% (single fiber) | 600 nm | heated | 120 | kneading | yes | 80 | $1 \times 10^4$ |
| Ni 20% (single fiber) | 600 nm | not heated | — | kneading | yes | 20 | $6 \times 10^4$ |
| Ni 20% (single fiber) | 600 nm | heated | 120 | kneading | no | 50 | $3 \times 10^4$ |
| Ni 20% (single fiber) | 600 nm | heated | 290 | kneading | yes | 20 | $4 \times 10^4$ |
| Cu 20% (single fiber) | 600 nm | not heated | — | kneading | yes | 20 | $6 \times 10^4$ |
| Cu 20% (single fiber) | 600 nm | heated | 280 | kneading | no | 20 | $4 \times 10^4$ |
| Cu 20% (single fiber) | 600 nm | heated | 300 | kneading | yes | 50 | $3 \times 10^4$ |

Note:
'none' and ITO fiber are comparative examples.

TABLE 17

Substrate fiber: High Strength Nylon

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| none | none | not heated | — | kneading | no | 0 | $1 \times 10^{15}$ |
| ITO Mixed Fiber | — | heated | 200 | kneading | no | 20 | $6 \times 10^7$ |
| silver 20% (single fiber) | 600 nm | not heated | — | kneading | yes | 20 | $7 \times 10^4$ |
| silver 20% (single fiber) | 600 nm | not heated | — | kneading | yes | 50 | $6 \times 10^4$ |
| silver 20% (single fiber) | 600 nm | heated | 200 | kneading | no | 1 | $4 \times 10^4$ |
| silver 20% (single fiber) | 600 nm | heated | 150 | kneading | no | 20 | $3 \times 10^4$ |
| silver 20% (single fiber) | 600 nm | heated | 200 | kneading | no | 40 | $2 \times 10^4$ |
| silver 20% (single fiber) | 600 nm | heated | 200 | kneading | no | 50 | $1 \times 10^4$ |
| silver 20% (single fiber) | 600 nm | heated | 200 | kneading | yes | 80 | $0.8 \times 10^4$ |
| Ni 20% (single fiber) | 600 nm | not heated | — | kneading | yes | 20 | $6 \times 10^4$ |
| Ni 20% (single fiber) | 600 nm | heated | 200 | kneading | no | 50 | $2 \times 10^4$ |
| Ni 20% (single fiber) | 600 nm | heated | 530 | kneading | yes | 20 | $3 \times 10^4$ |
| Cu 20% (single fiber) | 600 nm | not heated | — | kneading | yes | 20 | $6 \times 10^4$ |
| Cu 20% (single fiber) | 600 nm | heated | 230 | kneading | no | 20 | $3 \times 10^4$ |
| Cu 20% (single fiber) | 600 nm | heated | 500 | kneading | yes | 50 | $2 \times 10^4$ |

Note:
'none' and ITO fiber are comparative examples.

TABLE 18

Substrate fiber: Polyphenylene Sulfide Fiber

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| none | none | not heated | — | kneading | no | 0 | $1 \times 10^{15}$ |
| TTO Mixed Fiber | — | heated | 200 | kneading | no | 20 | $6 \times 10^7$ |
| silver 20% (single fiber) | 600 nm | not heated | — | kneading | yes | 20 | $8 \times 10^4$ |
| silver 20% (single fiber) | 600 nm | not heated | — | kneading | yes | 50 | $7 \times 10^4$ |
| silver 20% (single fiber) | 600 nm | heated | 200 | kneading | no | 1 | $5 \times 10^4$ |
| silver 20% (single fiber) | 600 nm | heated | 200 | kneading | no | 20 | $3 \times 10^4$ |
| silver 20% (single fiber) | 600 nm | heated | 150 | kneading | no | 40 | $3 \times 10^4$ |

TABLE 18-continued

Substrate fiber: Polyphenylene Sulfide Fiber

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| silver 20% (single fiber) | 600 nm | heated | 200 | kneading | no | 50 | $2 \times 10^4$ |
| silver 20% (single fiber) | 600 nm | heated | 200 | kneading | yes | 80 | $2 \times 10^4$ |
| Ni 20% (single fiber) | 600 nm | not heated | — | kneading | yes | 20 | $5 \times 10^4$ |
| Ni 20% (single fiber) | 600 nm | heated | 200 | kneading | no | 50 | $3 \times 10^4$ |
| Ni 20% (single fiber) | 600 nm | heated | 330 | kneading | yes | 20 | $4 \times 10^4$ |
| Cu 20% (single fiber) | 600 nm | not heated | — | kneading | yes | 20 | $7 \times 10^4$ |
| Cu 20% (single fiber) | 600 nm | heated | 250 | kneading | no | 20 | $4 \times 10^4$ |
| Cu 20% (single fiber) | 600 nm | heated | 300 | kneading | no | 50 | $3 \times 10^4$ |

Note:
'none' and ITO fiber are comparative examples.

TABLE 19

Substrate fiber: Polycarbonate Fiber

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| none | none | not heated | — | kneading | no | 0 | $1 \times 10^{15}$ |
| ITO Mixed Fiber | — | heated | 200 | kneading | no | 20 | $6 \times 10^7$ |
| silver 20% (single fiber) | 600 nm | not heated | — | kneading | yes | 20 | $6 \times 10^4$ |
| silver 20% (single fiber) | 600 nm | not heated | — | kneading | yes | 50 | $5 \times 10^4$ |
| silver 20% (single fiber) | 600 nm | heated | 200 | kneading | no | 1 | $5 \times 10^4$ |
| silver 20% (single fiber) | 600 nm | heated | 200 | kneading | no | 20 | $4 \times 10^4$ |
| silver 20% (single fiber) | 600 nm | heated | 150 | kneading | no | 40 | $3 \times 10^4$ |
| silver 20% (single fiber) | 600 nm | heated | 200 | kneading | no | 50 | $2 \times 10^4$ |
| silver 20% (single fiber) | 600 nm | heated | 200 | kneading | yes | 80 | $1 \times 10^4$ |
| Ni 20% (single fiber) | 600 nm | not heated | — | kneading | yes | 20 | $5 \times 10^4$ |
| Ni 20% (single fiber) | 600 nm | heated | 200 | kneading | no | 50 | $3 \times 10^4$ |
| Ni 20% (single fiber) | 600 nm | heated | 330 | kneading | yes | 20 | $3 \times 10^4$ |
| Cu 20% (single fiber) | 600 nm | not heated | — | kneading | yes | 20 | $6 \times 10^4$ |
| Cu 20% (single fiber) | 600 nm | heated | 250 | kneading | no | 20 | $4 \times 10^4$ |
| Cu 20% (single fiber) | 600 nm | heated | 300 | kneading | no | 50 | $3 \times 10^4$ |

Note:
'none' and ITO fiber are comparative examples.

TABLE 20

Substrate fiber: Aramid Fiber

| Metal Coated Short Fibers First Layer | | | Treatment | Method of | Metal layer | Conductive Resin Composition | |
|---|---|---|---|---|---|---|---|
| Metal type/content | Thickness | Heat Treatment | Temperature (° C.) | Production | Detachment | Conductive Fiber Content (%) | Surface Electrical Resistivity ($\Omega/cm^2$) |
| none | none | not heated | — | kneading | no | 0 | $1 \times 10^{15}$ |
| ITO Mixed Fiber | — | heated | 250 | kneading | no | 20 | $6 \times 10^7$ |
| silver 20% (single fiber) | 600 nm | not heated | — | kneading | yes | 20 | $7 \times 10^4$ |
| silver 20% (single fiber) | 600 nm | not heated | — | kneading | yes | 50 | $6 \times 10^4$ |
| silver 20% (single fiber) | 600 nm | heated | 250 | kneading | no | 1 | $4 \times 10^4$ |
| silver 20% (single fiber) | 600 nm | heated | 250 | kneading | no | 20 | $3.5 \times 10^4$ |
| silver 20% (single fiber) | 600 nm | heated | 200 | kneading | no | 40 | $3 \times 10^4$ |
| silver 20% (single fiber) | 600 nm | heated | 250 | kneading | no | 50 | $2 \times 10^4$ |
| silver 20% (single fiber) | 600 nm | heated | 250 | kneading | yes | 80 | $1.6 \times 10^4$ |
| Ni 20% (single fiber) | 600 nm | not heated | — | kneading | yes | 20 | $6 \times 10^4$ |
| Ni 20% (single fiber) | 600 nm | heated | 250 | kneading | no | 50 | $3 \times 10^4$ |
| Ni 20% (single fiber) | 600 nm | heated | 380 | kneading | yes | 20 | $4 \times 10^4$ |
| Cu 20% (single fiber) | 600 nm | not heated | — | kneading | yes | 20 | $6 \times 10^4$ |

TABLE 20-continued

Substrate fiber: Aramid Fiber

| Metal Coated Short Fibers First Layer | | | | Method of | Metal layer | Conductive Resin Composition | |
|---|---|---|---|---|---|---|---|
| Metal type/content | Thickness | Heat Treatment | Treatment Temperature (° C.) | Production | Detachment | Conductive Fiber Content (%) | Surface Electrical Resistivity ($\Omega/cm^2$) |
| Cu 20% (single fiber) | 600 nm | heated | 250 | kneading | no | 20 | $4 \times 10^4$ |
| Cu 20% (single fiber) | 600 nm | heated | 350 | kneading | no | 50 | $3 \times 10^4$ |

Note:
'none' and ITO fiber are comparative examples.

TABLE 21

Heat Treatment Temperatures

| Fiber Substrate | Metal Type | Metal Coating Wt % | Coating Thickness | Heating Temperature (° C.) | Heating Time (Min.) | Fiber Sample No. |
|---|---|---|---|---|---|---|
| Polyester | Ag | 20 | 60 nm | Room Temp. | — | 1 |
| | Cu | 20 | 60 nm | 100 | 10 | 2 |
| | Ag | 20 | 60 nm | 120 | 10 | 3 |
| | Cu | 10 | 30 nm | 250 | 5 | 4 |
| | Ni | 20 | 60 nm | 300 | 5 | 5 |
| Acryl | Ag | 20 | 60 nm | Room Temp. | — | 6 |
| | Cu | 20 | 60 nm | 100 | 30 | 7 |
| | Ag | 20 | 60 nm | 120 | 10 | 8 |
| | Cu | 10 | 60 nm | 160 | 30 | 9 |
| | Ag | 20 | 60 nm | 250 | 30 | 10 |
| | Ni | 20 | 60 nm | 300 | 20 | 11 |
| High Strength Nylon | Au | 20 | 60 nm | Room Temp. | — | 12 |
| | Ag | 20 | 60 nm | 100 | 60 | 13 |
| | Au | 10 | 30 nm | 200 | 60 | 14 |
| | Ag | 20 | 60 nm | 300 | 60 | 15 |
| | Cu | 20 | 60 nm | 350 | 60 | 16 |
| Polyphenylene sulfide | Ag | 20 | 60 nm | Room Temp. | — | 17 |
| | Au | 5 | 15 nm | 200 | 60 | 18 |
| | Ag | 20 | 60 nm | 300 | 60 | 19 |
| | Au | 20 | 60 nm | 350 | 60 | 20 |
| Comparative Example: ITO Kneaded Polyester Resin | 0 | 20 | 60 nm | 200 | 10 | Comparative Example |

The invention claimed is:

1. A metal coated fiber produced by a process comprising heat treating a substrate fiber provided with a metal coating at a first temperature greater than a crystallization temperature but less than a melting temperature of the substrate fiber, wherein
the metal coated fiber has an expansion ratio, under no applied load, at a second temperature greater than the crystallization temperature but less than the melting temperature of the substrate fiber, and relative to room temperature, that is no more than ±4%; and
in a coating adhesion test the metal coating has a standardized strength of at least grade 4.

2. The metal coated fiber according to claim 1, wherein the process for producing the metal coated fiber further comprises, following the heat treating, cooling gradually the substrate fiber provided with the metal coating.

3. The metal coated fiber according to claim 1, wherein, at the second temperature, or at room temperature, the metal coated fiber has an expansion ratio under a g load equivalent to 1/100th of the denier value for the metal coated fiber that is no more than ±2%.

4. The metal coated fiber according to claim 1, wherein 1 cm of the metal coated fiber has an electrical resistance per 1 denier that is no more than 1000 $\Omega$/cm·denier.

5. The metal coated fiber according to claim 1, wherein the metal coating is a conductive metal comprising at least one selected from the group consisting of silver, gold, platinum, copper, nickel, tin, zinc and palladium.

6. The metal coated fiber according to claim 1, wherein the substrate fiber comprises at least one selected from the group consisting of polyester based fibers, nylon based fibers, and acrylic based fibers.

7. The metal coated fiber according to claim 1, wherein the metal coating has been subjected to surface treatment.

8. A fiber mixture comprising the metal coated fiber of claim 1 mixed with at least one of a synthetic fiber and a natural fiber.

9. The fiber mixture according to claim 8, wherein
the synthetic fiber is a composite of two or more synthetic fibers; and
the natural fiber is a composite of two or more natural fibers.

10. The fiber mixture according to claim 8, wherein the fiber mixture comprises from 0.1 to 50% of the metal coated fiber.

11. The fiber mixture according to claim 10, wherein 1 cm of the fiber mixture has an electrical resistance per 1 denier that is no more than 10,000 $\Omega$/cm·denier.

12. A yarn comprising the metal coated fiber of claim 1.

13. A woven or nonwoven fabric comprising the metal coated fiber of claim 1.

14. The metal coated fiber according to claim 1, wherein the metal coated fiber has an expansion ratio, under no applied load, at a second temperature greater than the crystallization temperature but less than the melting temperature of the substrate fiber, and relative to room temperature, that is no more than ±0.90%.

15. The metal coated fiber according to claim 1, wherein the metal coated fiber comprises an additional corrosion resistant metal coating on the substrate fiber.

16. A metal coated fiber produced by a process comprising heat treating a substrate fiber provided with a metal coating at a first temperature greater than a crystallization temperature but less than a melting temperature of the substrate fiber, wherein
the metal coated fiber has an expansion ratio, under no applied load, at a second temperature greater than the crystallization temperature but less than the melting temperature of the substrate fiber, and relative to room temperature, that is no more than ±4%; and the metal coating has an orange peel texture.

17. The metal coated fiber according to claim 16, wherein the substrate fiber comprises at least one selected from the group consisting of nylon based fibers, polyphenylene sulfide based fibers, polycarbonate based fibers, and aramid fibers.

18. A metal coated fiber produced by a process comprising heat treating a substrate fiber provided with a metal coating at a first temperature greater than a crystallization temperature but less than a melting temperature of the substrate fiber, wherein the substrate fiber comprises at least one selected from the group consisting of nylon based fibers, polyphenylene sulfide based fibers, polycarbonate based fibers, and aramid fibers;

the metal coated fiber has an expansion ratio, under no applied load, at a second temperature greater than the crystallization temperature but less than the melting temperature of the substrate fiber, and relative to room temperature, that is no more than ±4%; and in a coating adhesion test, the metal coating has a standardized strength of at least grade 4.

19. The metal coated fiber according to claim 18, wherein, at the second temperature, or at room temperature, the metal coated fiber has an expansion ratio under a g load equivalent to $\frac{1}{100}$th of the denier value for the metal coated fiber that is no more than ±2%.

20. The metal coated fiber according to claim 18, wherein 1 cm of the metal coated fiber has an electrical resistance per 1 denier that is no more than 1000 Ω/cm·denier.

21. A yarn comprising the metal coated fiber of claim 18.

22. The metal coated fiber according to claim 18, wherein the metal coating is a conductive metal comprising at least one selected from the group consisting of silver, gold, platinum, copper, nickel, tin, zinc and palladium.

23. A fiber mixture comprising the metal coated fiber of claim 18 mixed with at least one of a synthetic fiber and a natural fiber.

24. A woven or nonwoven fabric comprising the metal coated fiber of claim 18.

25. The metal coated fiber according to claim 18, wherein the metal coated fiber has an expansion ratio, under no applied load, at a second temperature greater than the crystallization temperature but less than the melting temperature of the substrate fiber, and relative to room temperature, that is no more than ±0.90%.

26. A metal coated fiber comprising
a substrate fiber;
a conductive metal coating on the substrate fiber; and
an additional corrosion resistant metal coating on the conductive metal coating, wherein
in a coating adhesion test the conductive metal coating has a standardized strength of at least grade 4.

27. The metal coated fiber according to claim 26, wherein at least one of the conductive metal coating and the corrosion resistant metal coating comprises a plurality of layers.

28. The metal coated fiber according to claim 26, wherein the metal coated fiber is produced by a process comprising
providing on the substrate fiber at least one of the conductive metal coating and the corrosion resistant metal coating; and
then heat treating the substrate fiber at a temperature greater than a crystallization temperature but less than a melting temperature of the substrate fiber.

29. The metal coated fiber according to claim 26, wherein
the conductive metal coating comprises at least one selected from the group consisting of silver, copper, nickel, tin and zinc; and
the corrosion resistant metal coating comprises at least one selected from the group consisting of gold, platinum, palladium, osmium and rhodium.

30. The metal coated fiber according to claim 26, wherein the conductive metal coating has an orange peel texture.

31. The metal coated fiber according to claim 26, wherein the corrosion resistant metal coating is from 1 nm to 500 nm thick.

32. The metal coated fiber according to claim 26, further comprising a paraffin layer or a wax layer on the corrosion resistant metal coating.

33. The metal coated fiber according to claim 26, wherein the substrate fiber is a synthetic single fiber of polyester fiber, nylon fiber or acrylic fiber, or a composite fiber formed from two or more synthetic fiber components.

34. A method of producing a mixed fiber, the method comprising mixing a metal coated fiber with a synthetic fiber or a natural fiber, wherein the metal coated fiber is produced by heat treating a substrate fiber provided with a metal coating at a first temperature greater than a crystallization temperature but less than a melting temperature of the substrate fiber;

an expansion ratio of the metal coated fiber, under no applied load, at a second temperature greater than the crystallization temperature but less than the melting temperature of the substrate fiber, and relative to room temperature, is no more than ±4%; and a standard strength of the metal coating in a coating adhesion test is at least grade 4.

35. A conductive resin composition comprising a resin; and metal coated fibers mixed in the resin and imparting electrical conductivity to the conductive resin composition, wherein the metal coated fibers are produced by a process comprising heat treating a substrate fiber provided with a metal coating at a temperature greater than a crystallization temperature but less than a melting temperature of the substrate fiber;

wherein
the substrate fiber is a nylon based fiber and the temperature is in a range of from 200 to 500° C.,
the substrate fiber is a polyphenylene sulfide based fiber and the temperature is in a range of from 200 to 300° C.,
the substrate fiber is a polycarbonate based fiber and the temperature is in a range of from 200 to 300° C., or
the substrate fiber is an aramid fiber and the temperature is in a range of from 250 to 350° C.; and
wherein in a coating adhesion test of one of the metal coated fibers the metal coating has a standardized strength of at least grade 4.

36. The conductive resin composition according to claim 35, wherein the conductive resin composition comprises from 1 mass % to 50 mass % of the metal coated fibers.

37. The conductive resin composition according to claim 35, wherein the metal coated fibers in the resin are in mutual contact.

38. The conductive resin composition according to claim 35, wherein the process further comprises, after the heat treating, cutting the substrate fiber provided with the metal coating.

39. The conductive resin composition according to claim 35, wherein a length of the metal coated fibers is in a range of from 0.1 mm to 10 cm.

40. The conductive resin composition according to claim 35, further comprising a silica powder additive.

41. The conductive resin composition according to claim 35, wherein the metal coated fibers include a coating layer of a silicon compound or a titanium compound on the metal coating.

42. A conductive fiber, conductive paint film, conductive film, conductive net, conductive case, or conductive molded product produced using the conductive resin composition of claim 35.

43. A method of producing a conductive resin composition, the method comprising kneading metal coated fibers into a resin; and producing the conductive resin composition of claim 35.

44. The method according to claim 43, wherein the conductive resin composition is produced in a shape of a conductive fiber, a film, a net or a case.

* * * * *